(12) United States Patent
Crowley et al.

(10) Patent No.: US 11,567,650 B1
(45) Date of Patent: Jan. 31, 2023

(54) USER INTERFACES FOR MANAGING EXPOSURE NOTIFICATIONS

(71) Applicant: Apple Inc., Cupertino, CA (US)

(72) Inventors: Matthew W. Crowley, San Francisco, CA (US); Heather E. Daniel, San Jose, CA (US); Kevin Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/326,952

(22) Filed: May 21, 2021

Related U.S. Application Data

(60) Provisional application No. 63/149,580, filed on Feb. 15, 2021, provisional application No. 63/073,411, filed on Sep. 1, 2020, provisional application No. 63/014,959, filed on Jun. 21, 2020.

(51) Int. Cl.
| | | |
|---|---|---|
| *G06F 3/04847* | (2022.01) | |
| *G06F 3/0481* | (2022.01) | |
| *G06F 3/04842* | (2022.01) | |
| *H04L 67/52* | (2022.01) | |

(52) U.S. Cl.
CPC ........ *G06F 3/04847* (2013.01); *G06F 3/0481* (2013.01); *G06F 3/04842* (2013.01); *H04L 67/52* (2022.05)

(58) Field of Classification Search
CPC .............. G06F 3/04847; G06F 3/0481; G06F 3/04842; H04L 67/18
See application file for complete search history.

(56) References Cited

U.S. PATENT DOCUMENTS

| | | | | |
|---|---|---|---|---|
| 2013/0339345 | A1* | 12/2013 | Soto Matamala | .... G06F 16/248 707/722 |
| 2014/0123157 | A1* | 5/2014 | Keskitalo | ............. G06Q 10/107 719/328 |
| 2015/0325102 | A1* | 11/2015 | Mondal | .................. G08B 25/10 340/539.11 |
| 2015/0350349 | A1* | 12/2015 | Kao | .................... G06Q 30/0282 709/204 |
| 2015/0350827 | A1* | 12/2015 | Birch | .................... H04W 4/021 455/456.1 |
| 2015/0378558 | A1* | 12/2015 | Smith | ................ G06Q 30/0207 715/777 |
| 2016/0182707 | A1* | 6/2016 | Gabel | .................... G06Q 10/10 455/404.2 |
| 2018/0367629 | A1* | 12/2018 | Slosar | ..................... H04L 67/26 |

* cited by examiner

*Primary Examiner* — John T Repsher, III
(74) *Attorney, Agent, or Firm* — Dentons US LLP

(57) ABSTRACT

The present disclosure generally relates to user interfaces for managing exposure notifications. In some embodiments, after enabling exposure notifications, an exposure notification is received; upon interacting with the notification: if an associated application is installed, a user interface of that application is displayed; if the associated application is not installed, a user interface object associated with a process to install the application is displayed. In some embodiments, an exposure notification management interface is displayed that includes a plurality of entities that have been authorized to provide notifications, along with a user interface object to disable transmission of data to those entities and to disable notifications from those entities.

51 Claims, 41 Drawing Sheets

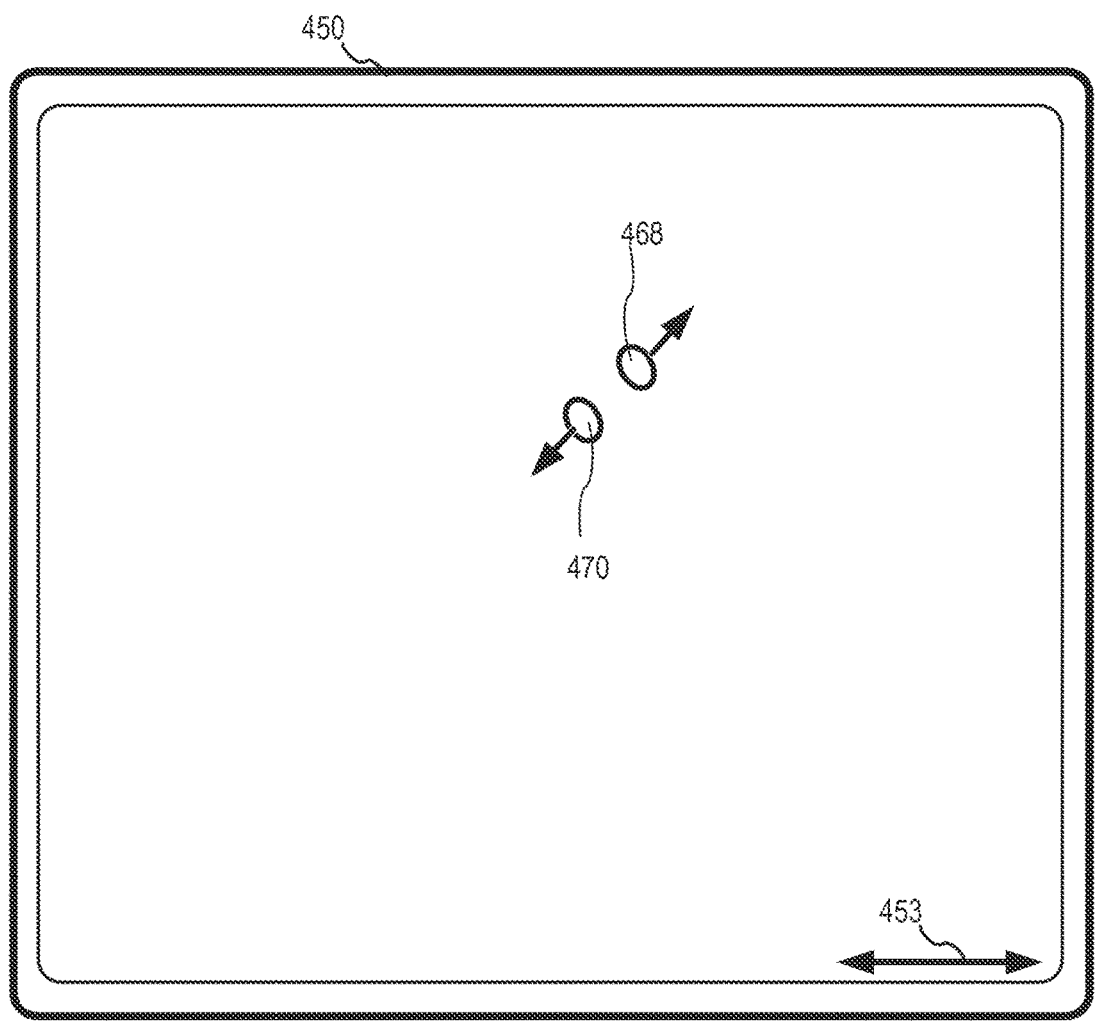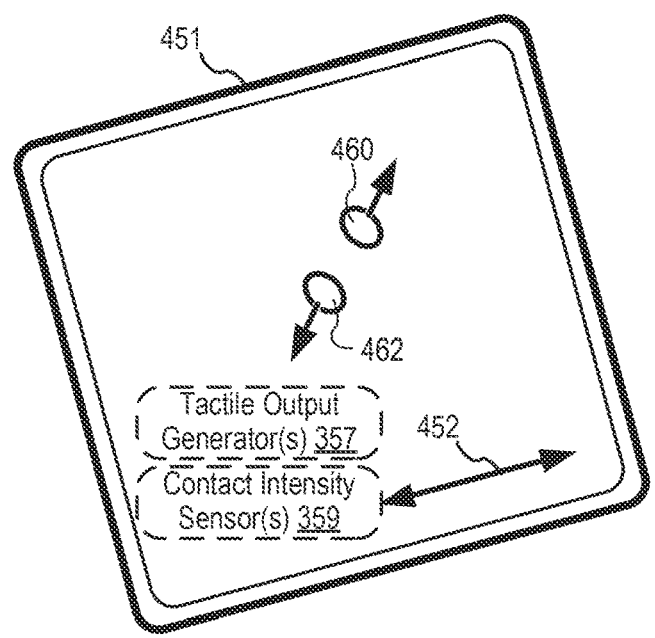
FIG. 4B

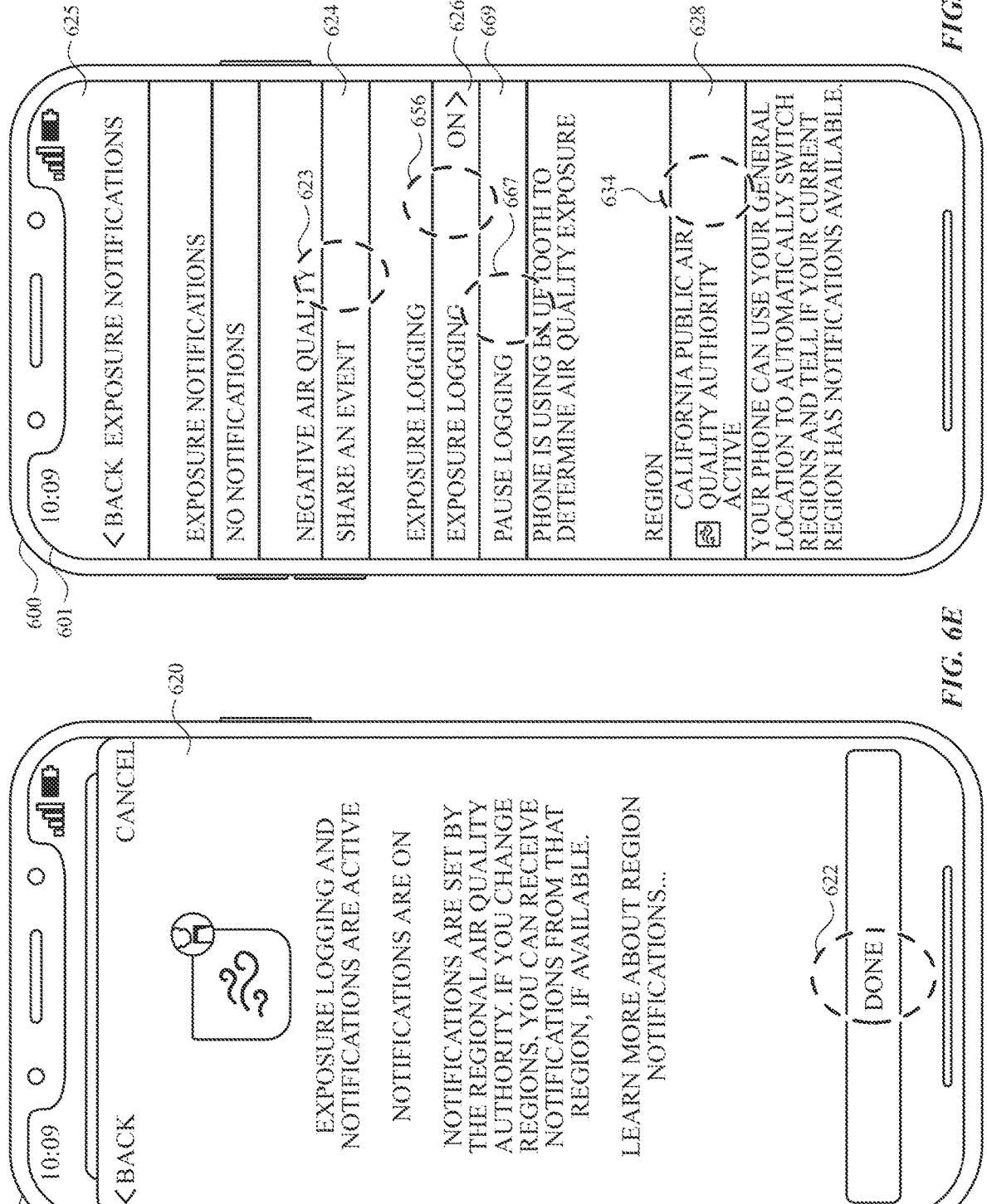

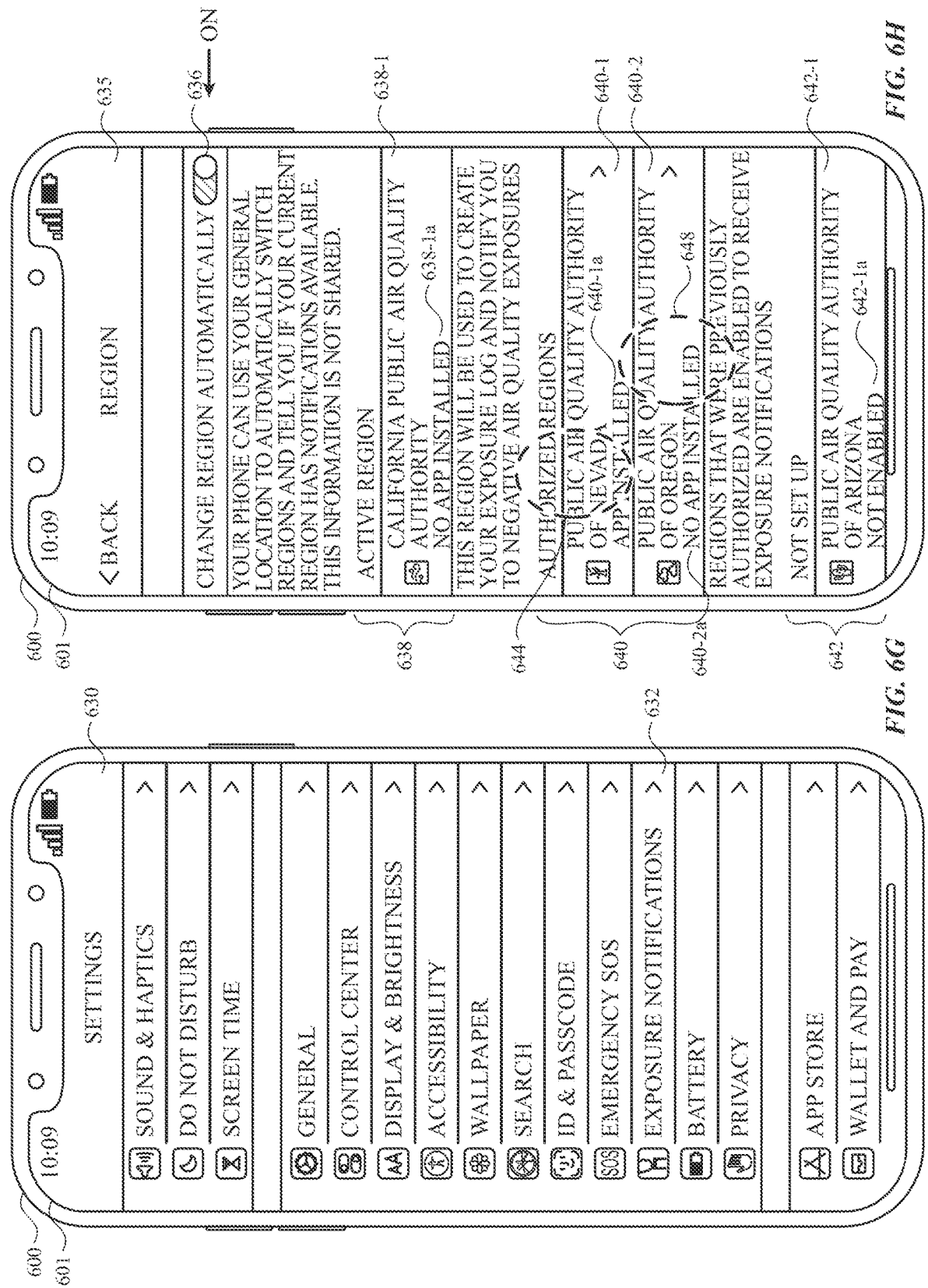

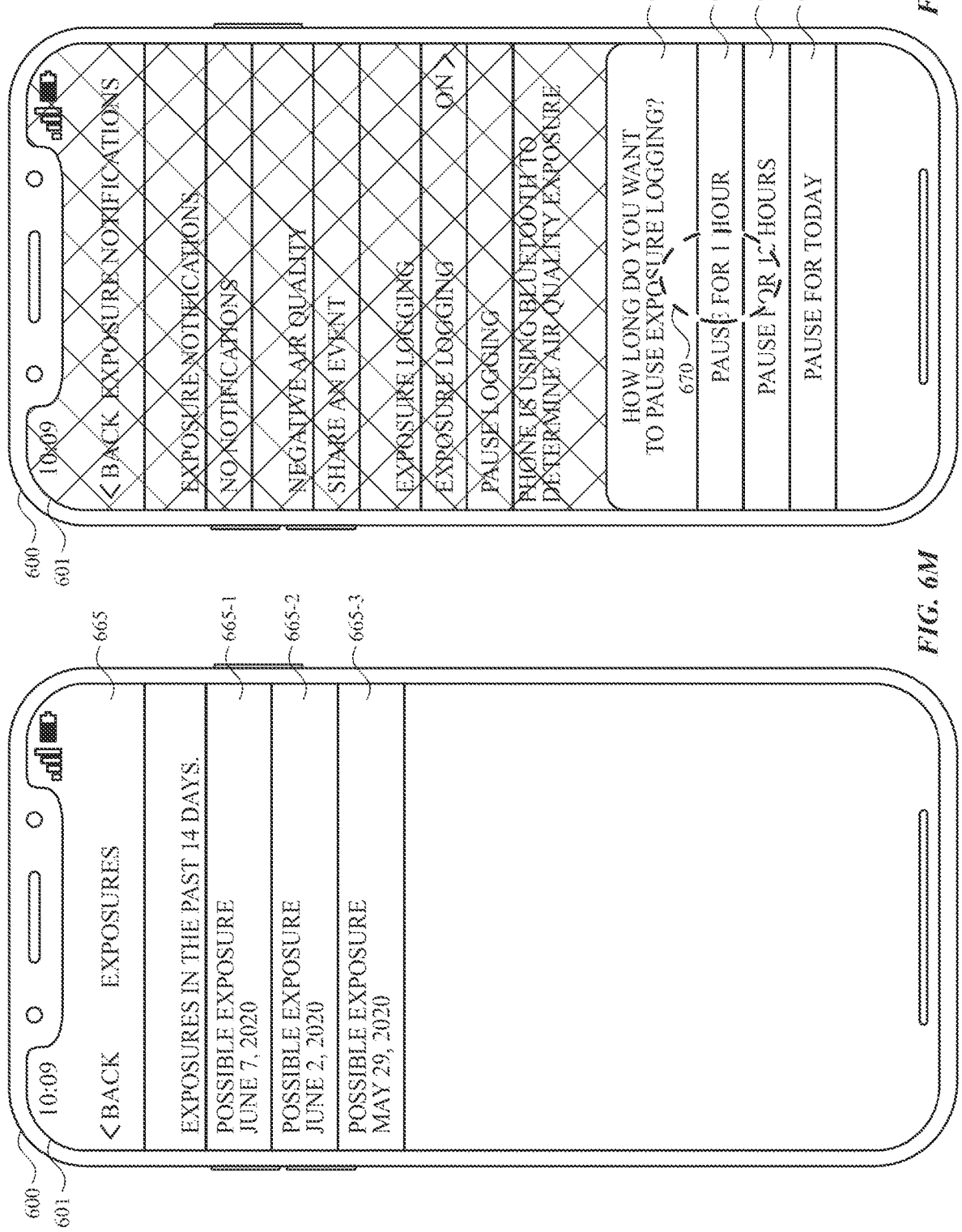

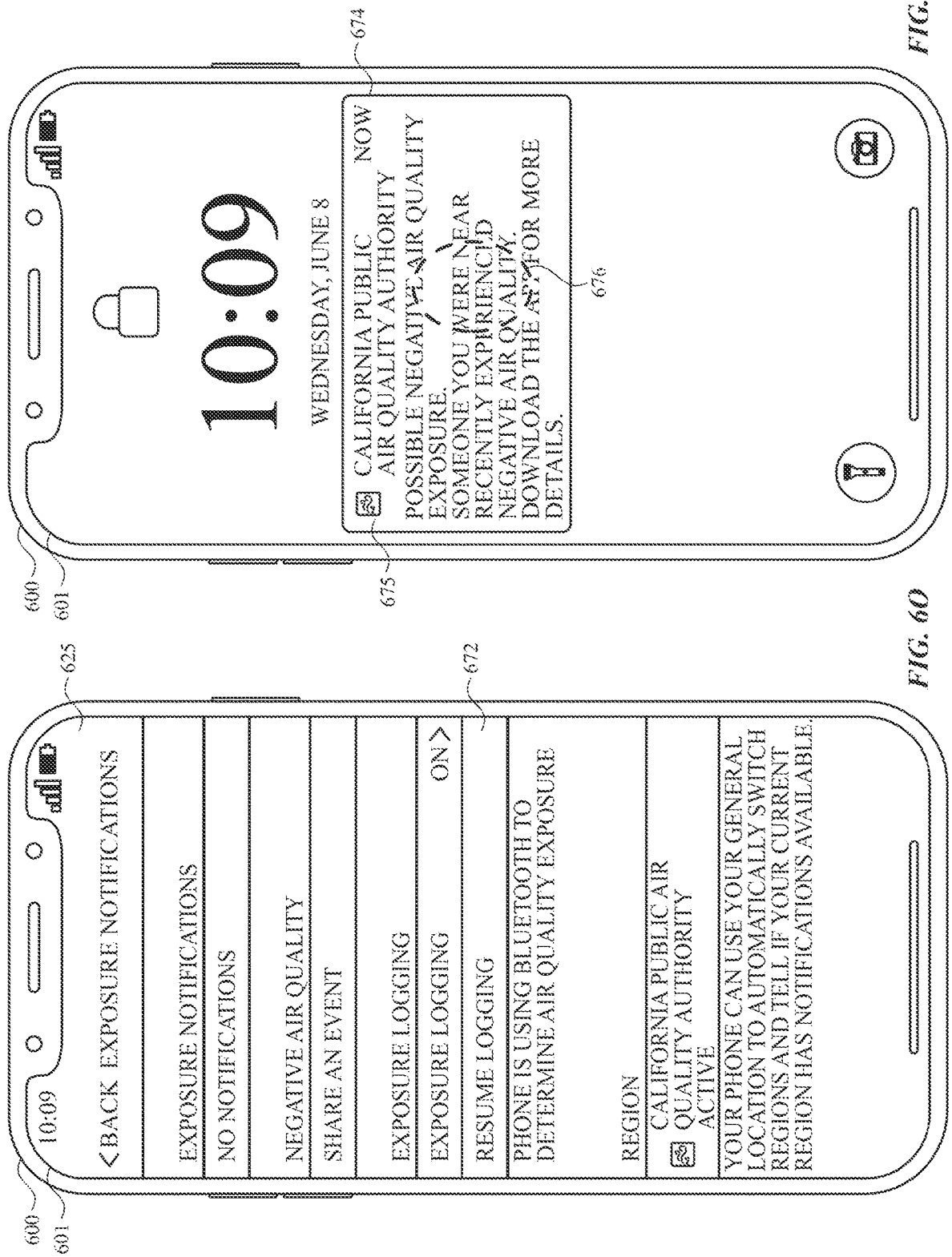

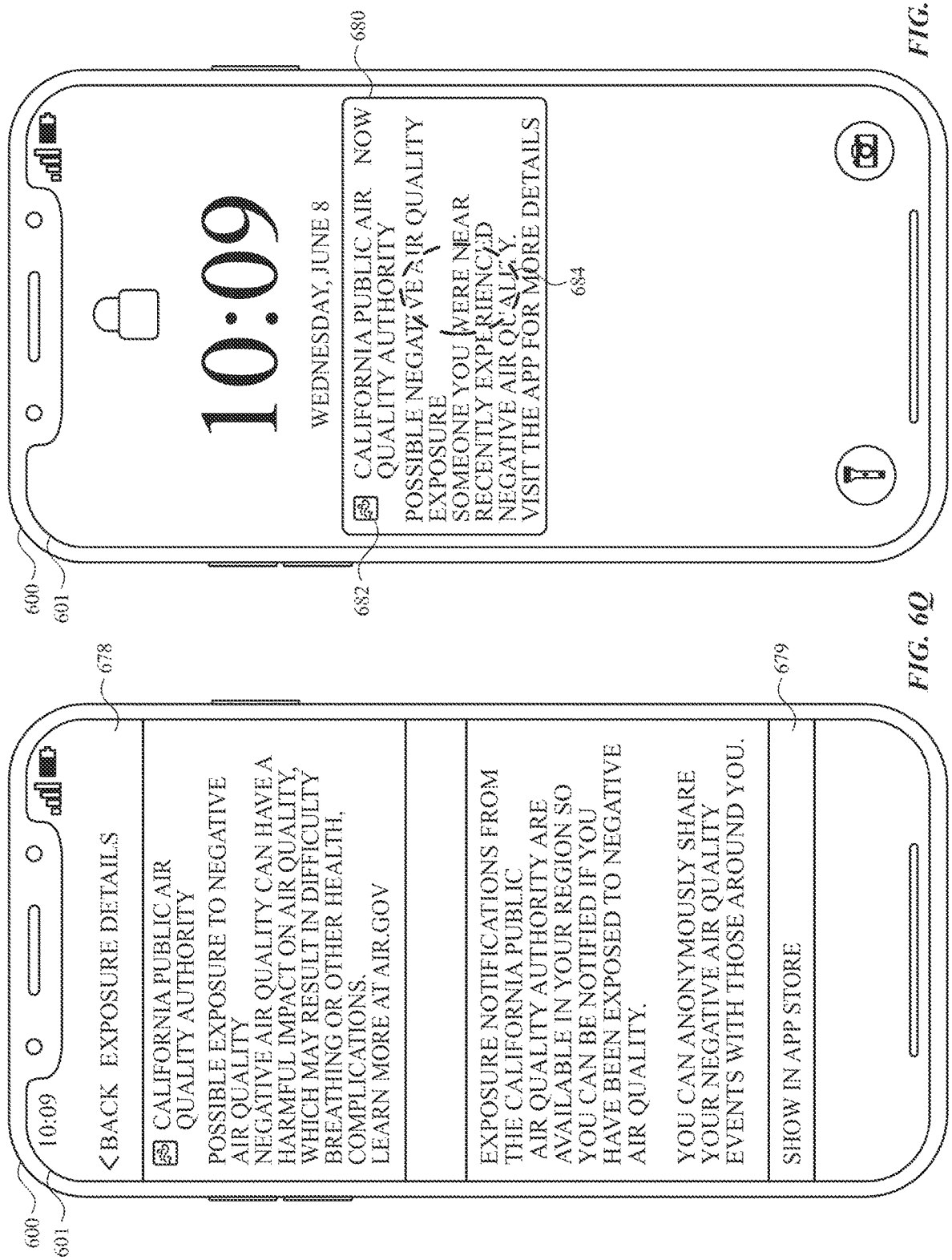

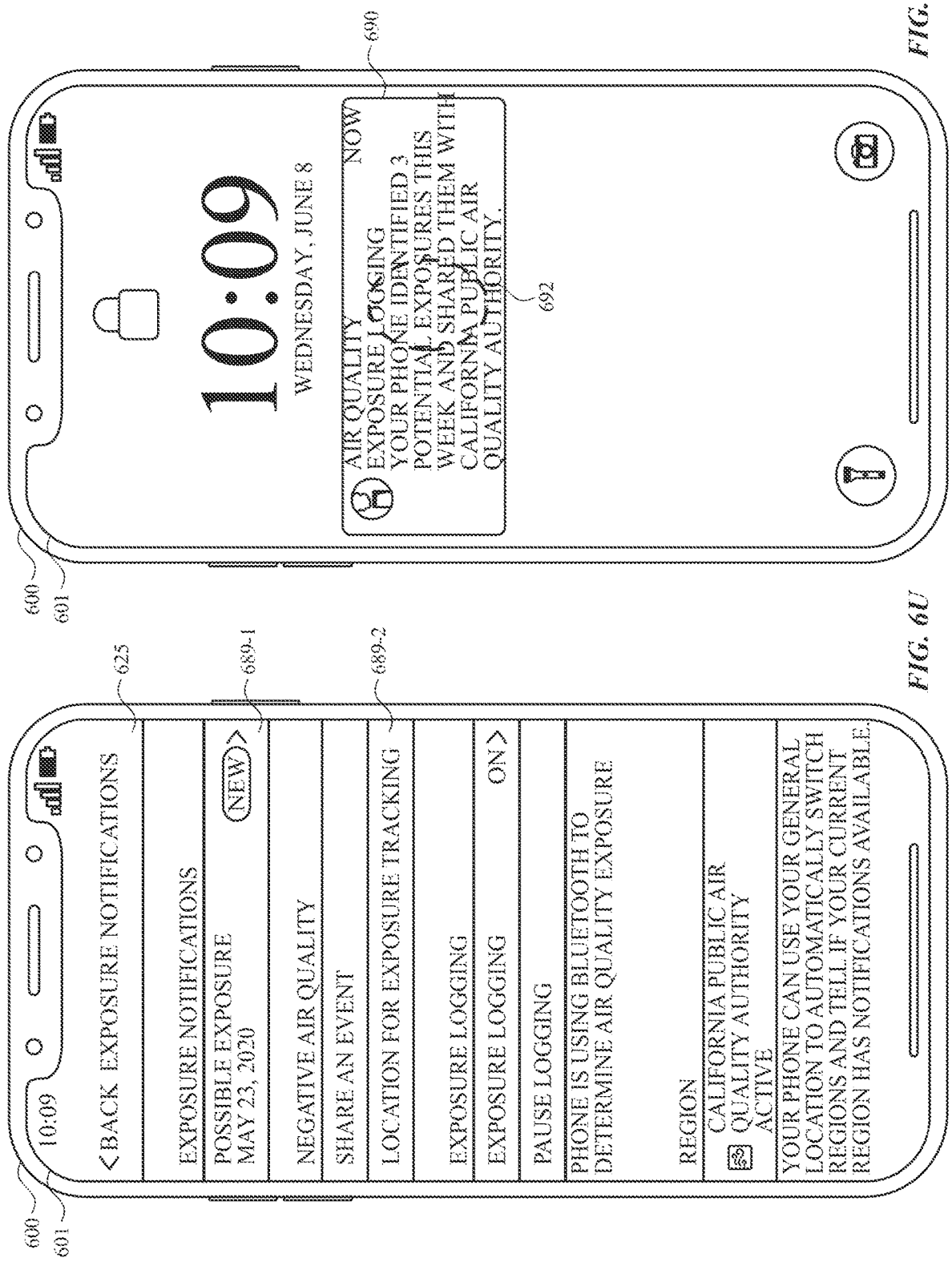

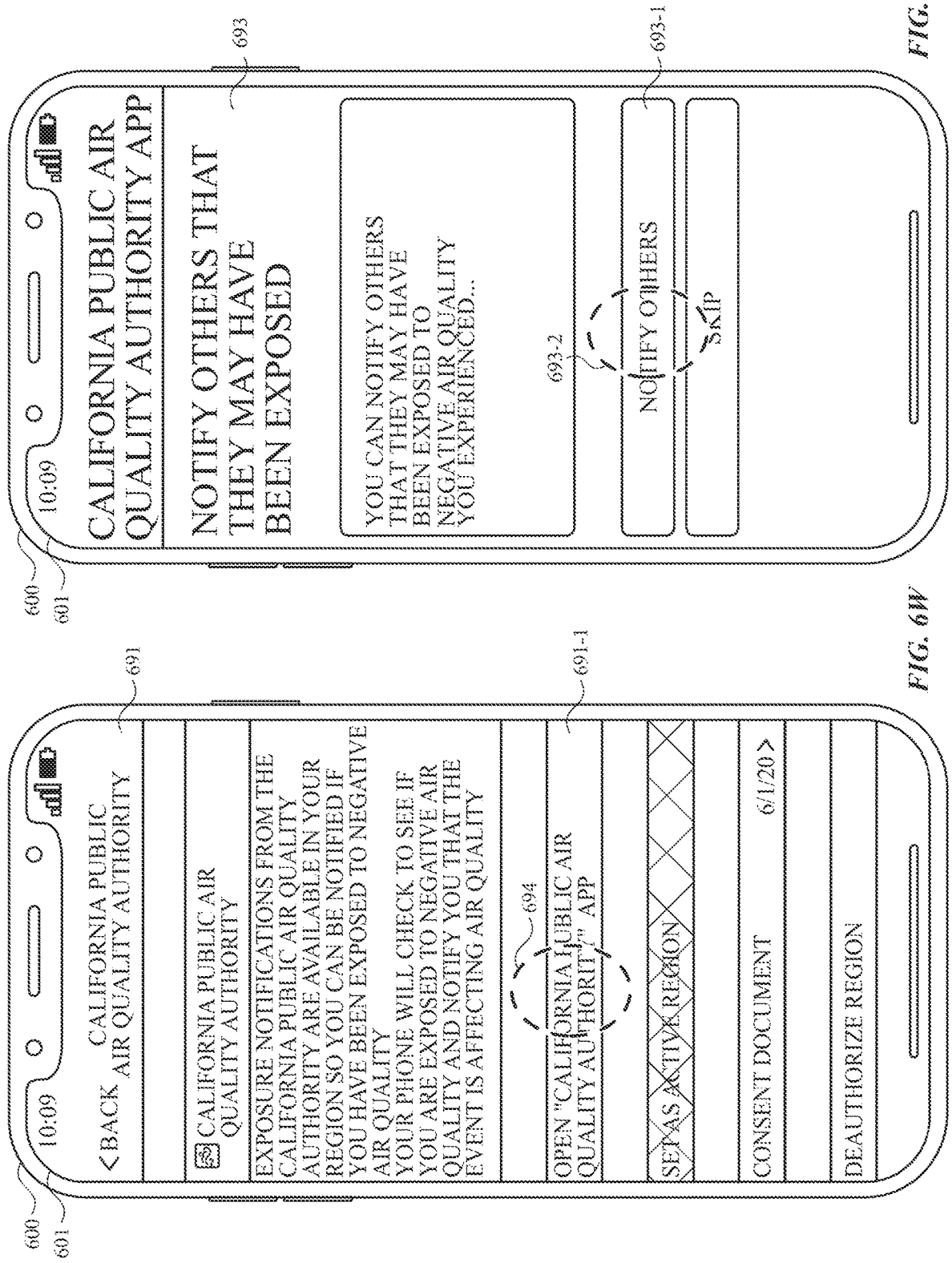

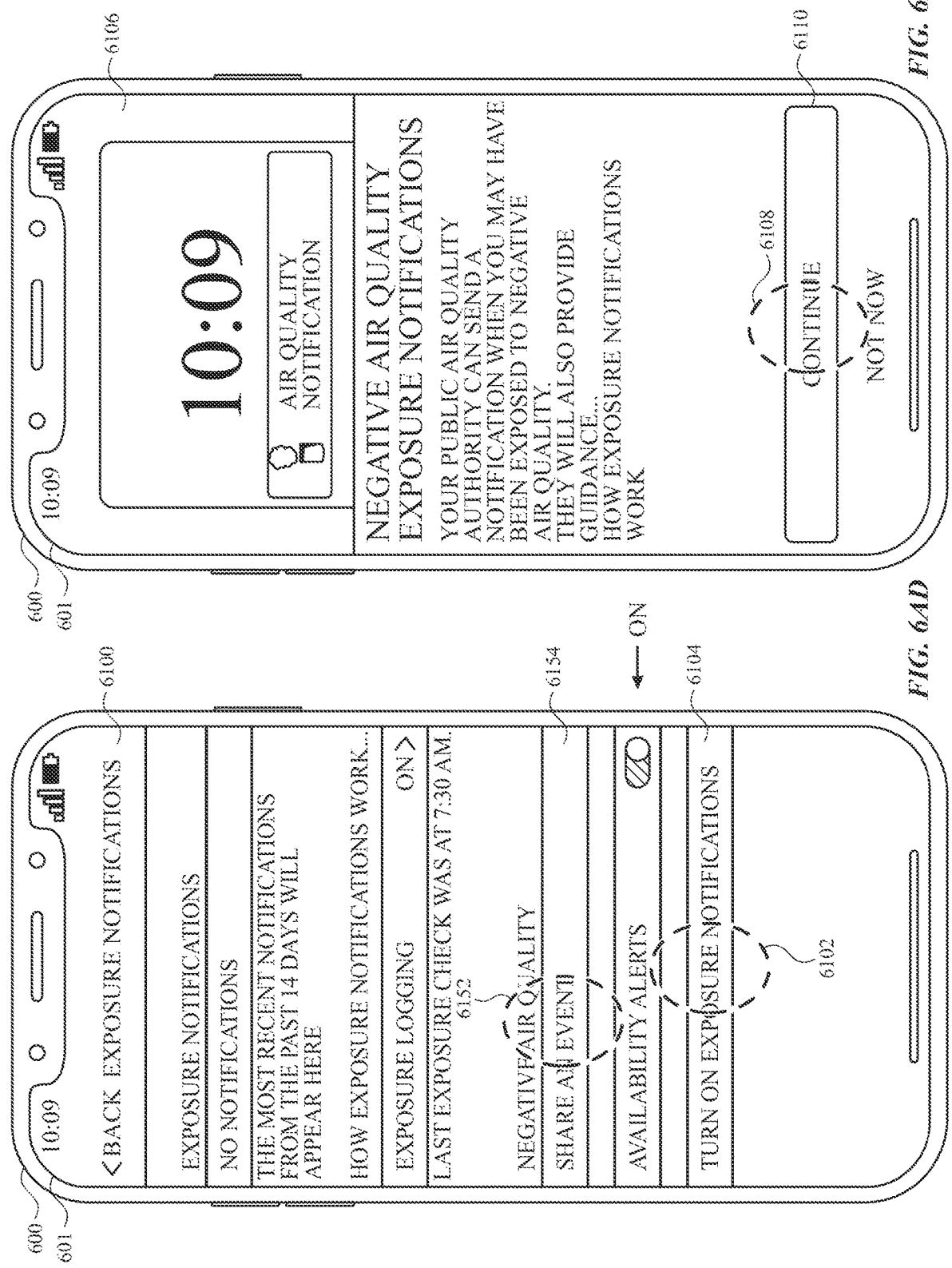

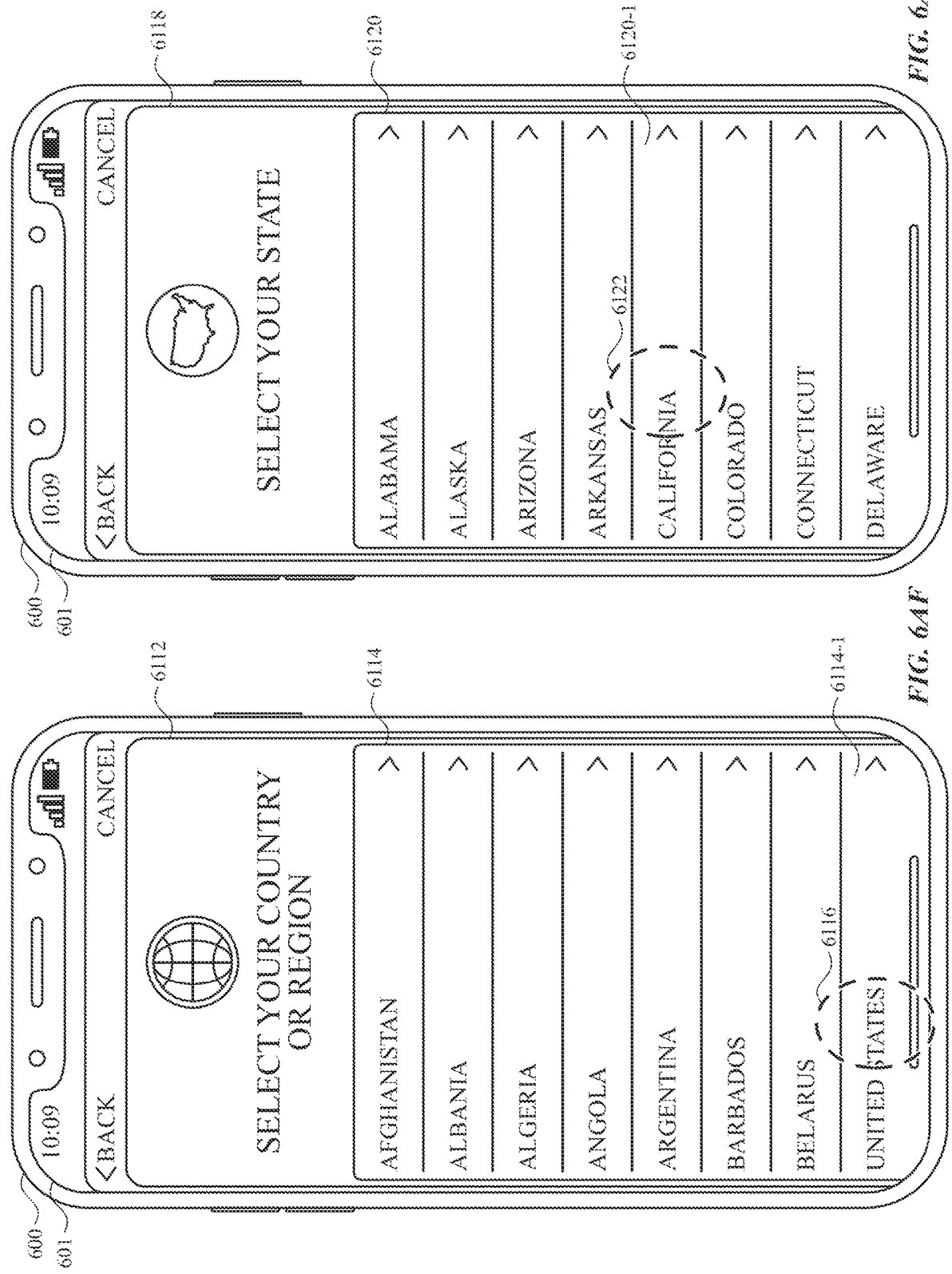

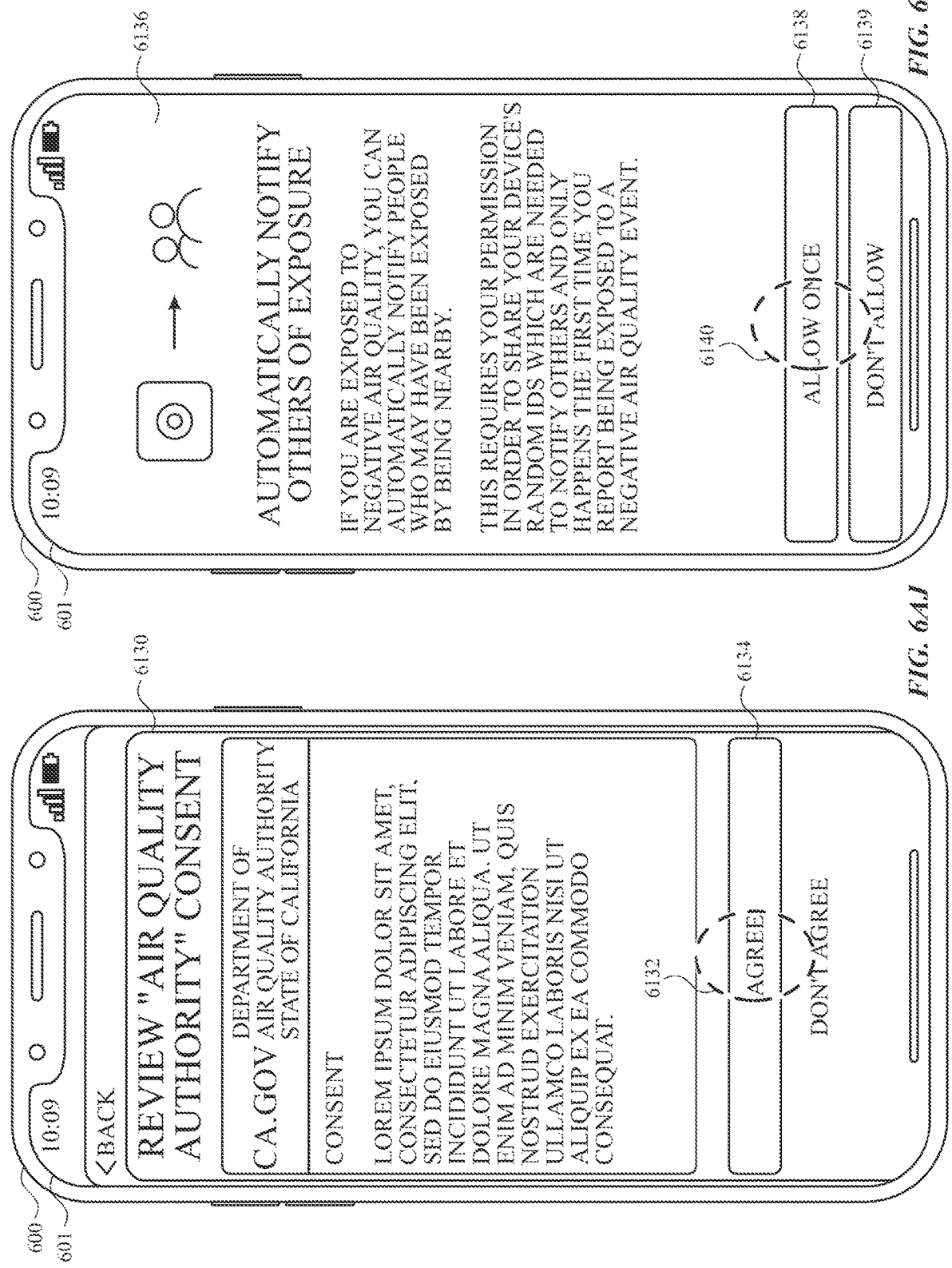

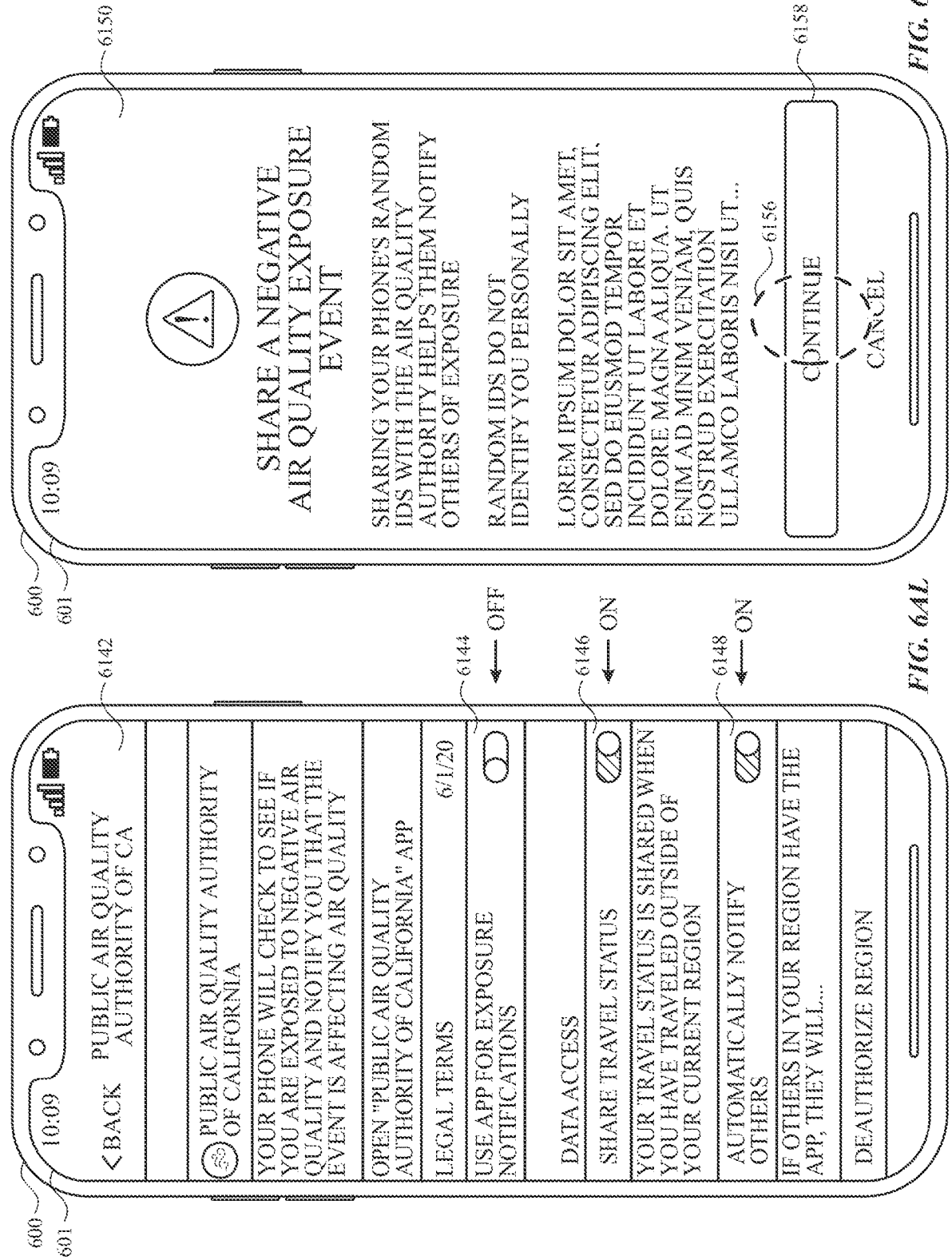

FIG. 6AN

DEPARTMENT OF
CA.GOV AIR QUALITY AUTHORITY
STATE OF CALIFORNIA

VERIFY YOUR NEGATIVE
AIR QUALITY EVENT
PIN

ONE TIME VERIFICATION
CODE

[0] [1] [2] [3] [4] [5] [6] [7]

SUBMIT

NOT NOW

FIG. 6AO

DEPARTMENT OF
CA.GOV AIR QUALITY AUTHORITY
STATE OF CALIFORNIA

WHEN DID CONDITIONS
BEGIN?

(POOR VISIBILITY,
HAZE, SMOKE, FIRE)

CONDITIONS BEGAN ON    MM/DD/YY

I HAVEN'T EXPERIENCED ANY    ✓
CONDITIONS

CONTINUE

SKIP

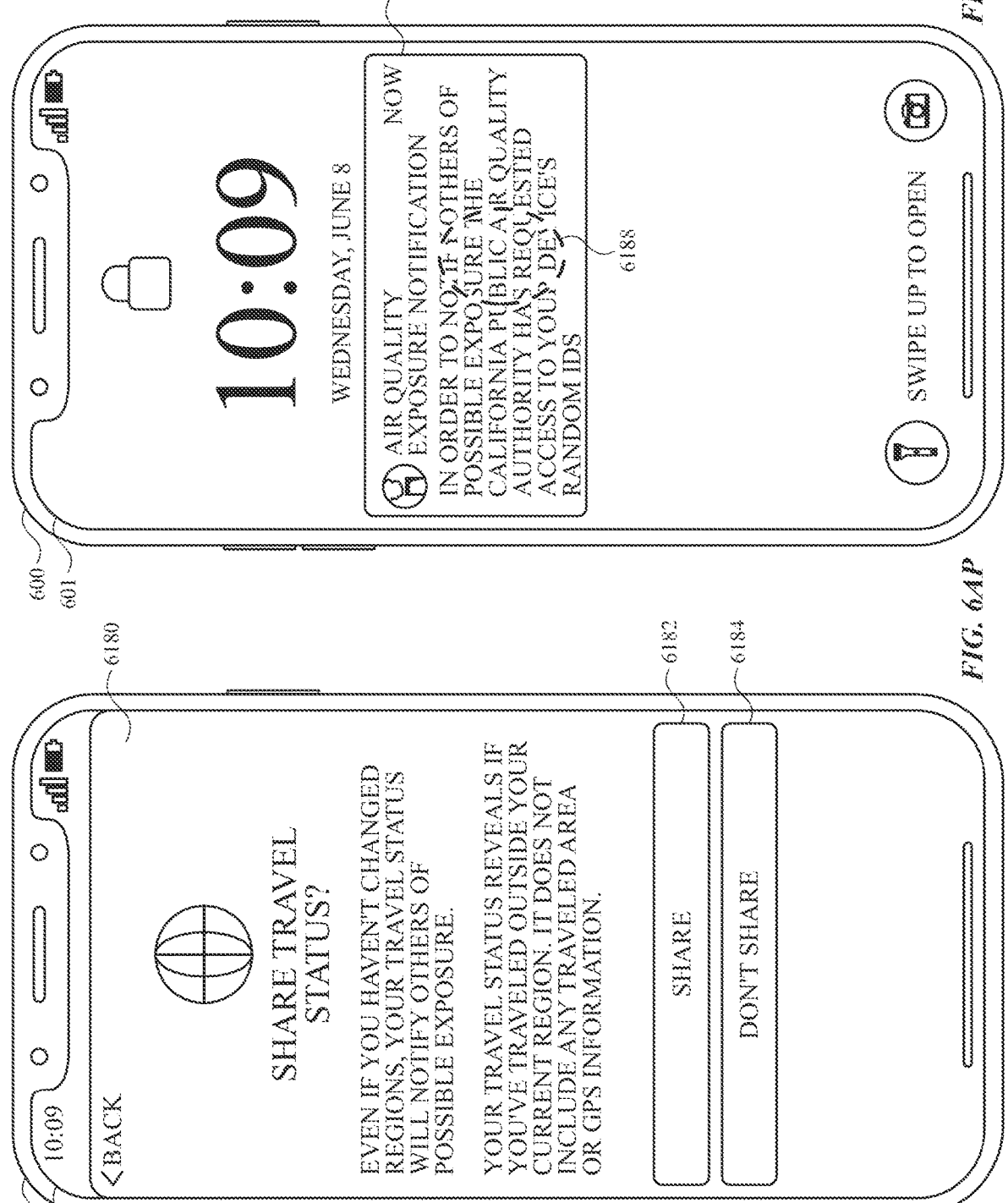

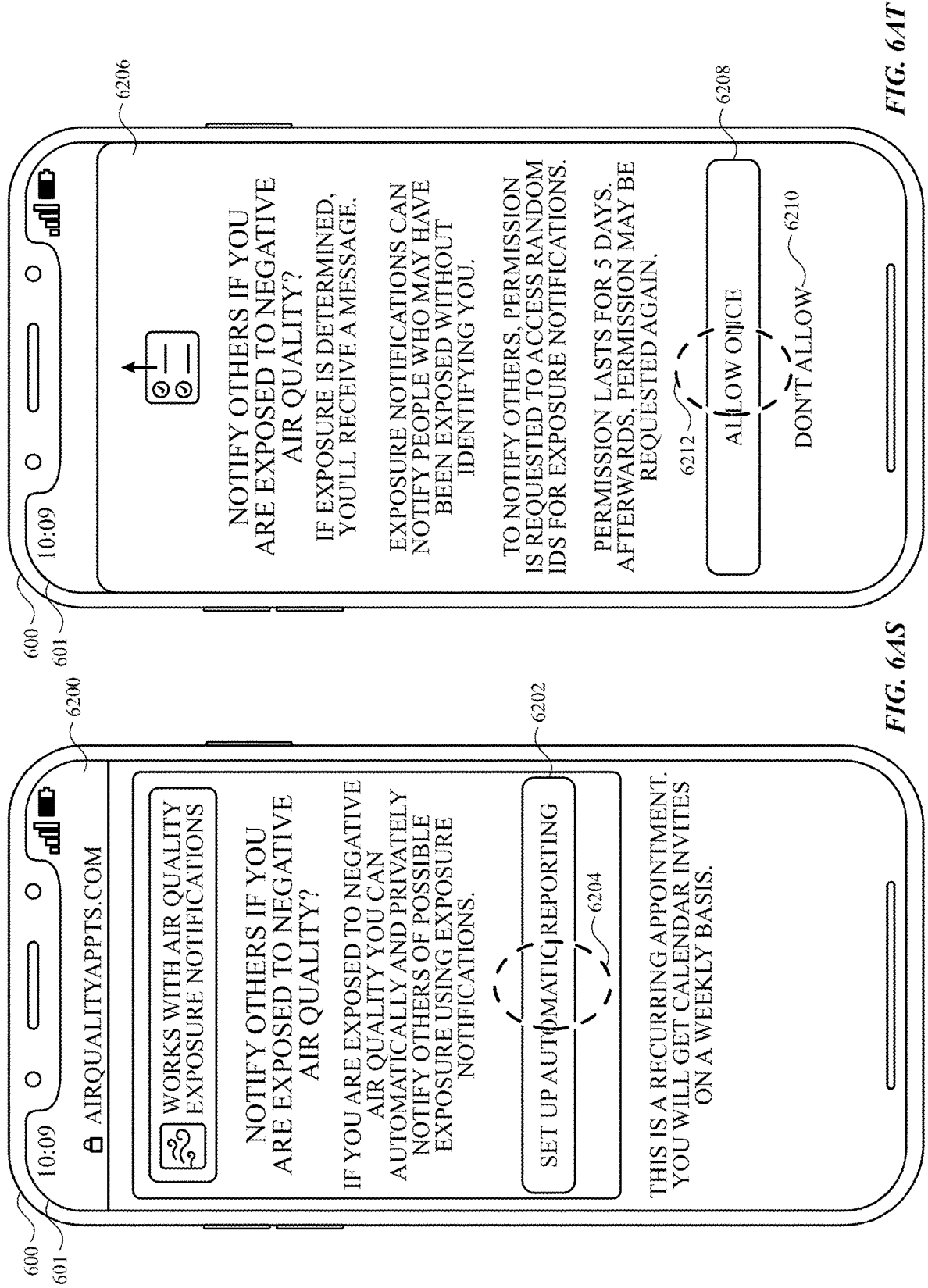

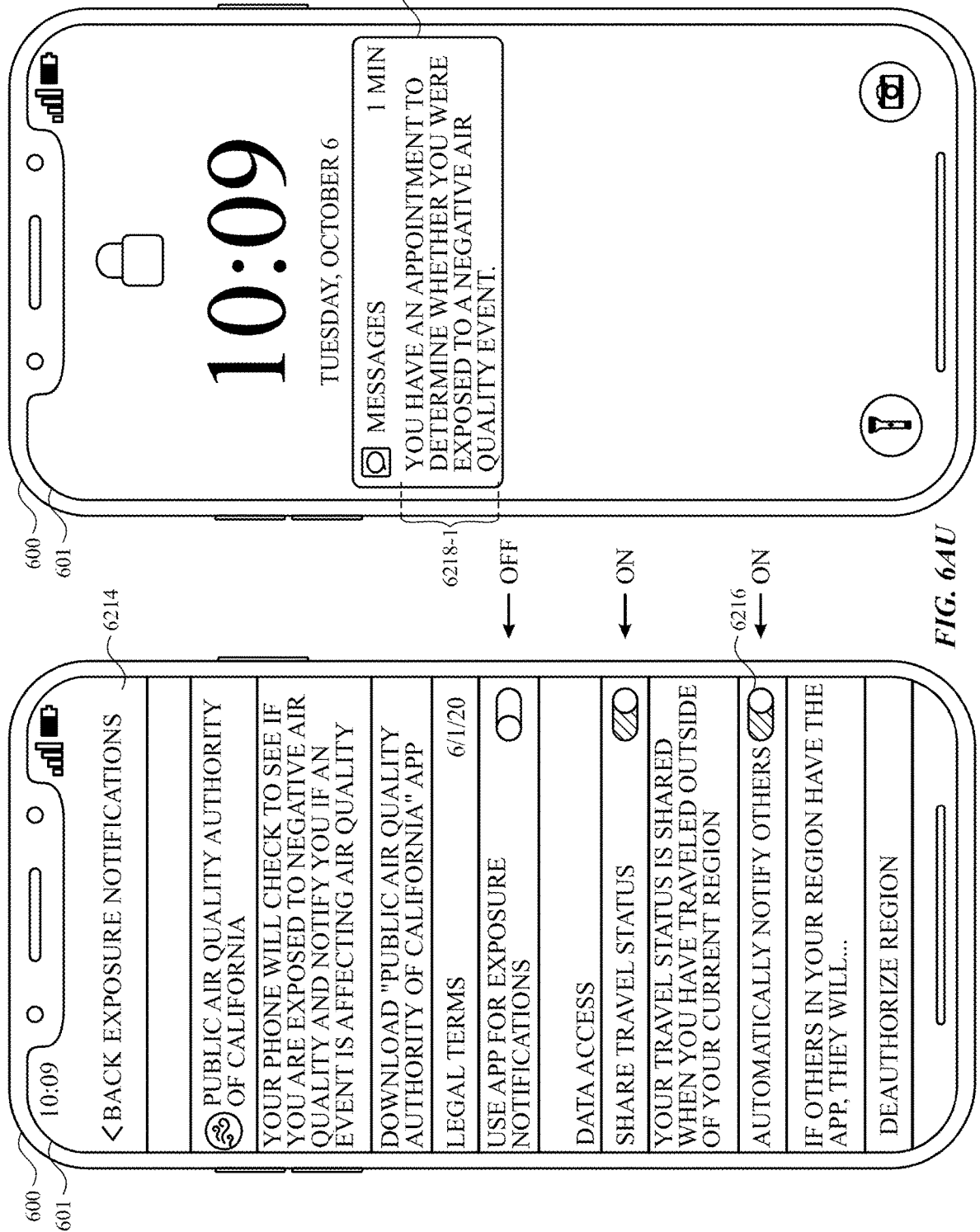

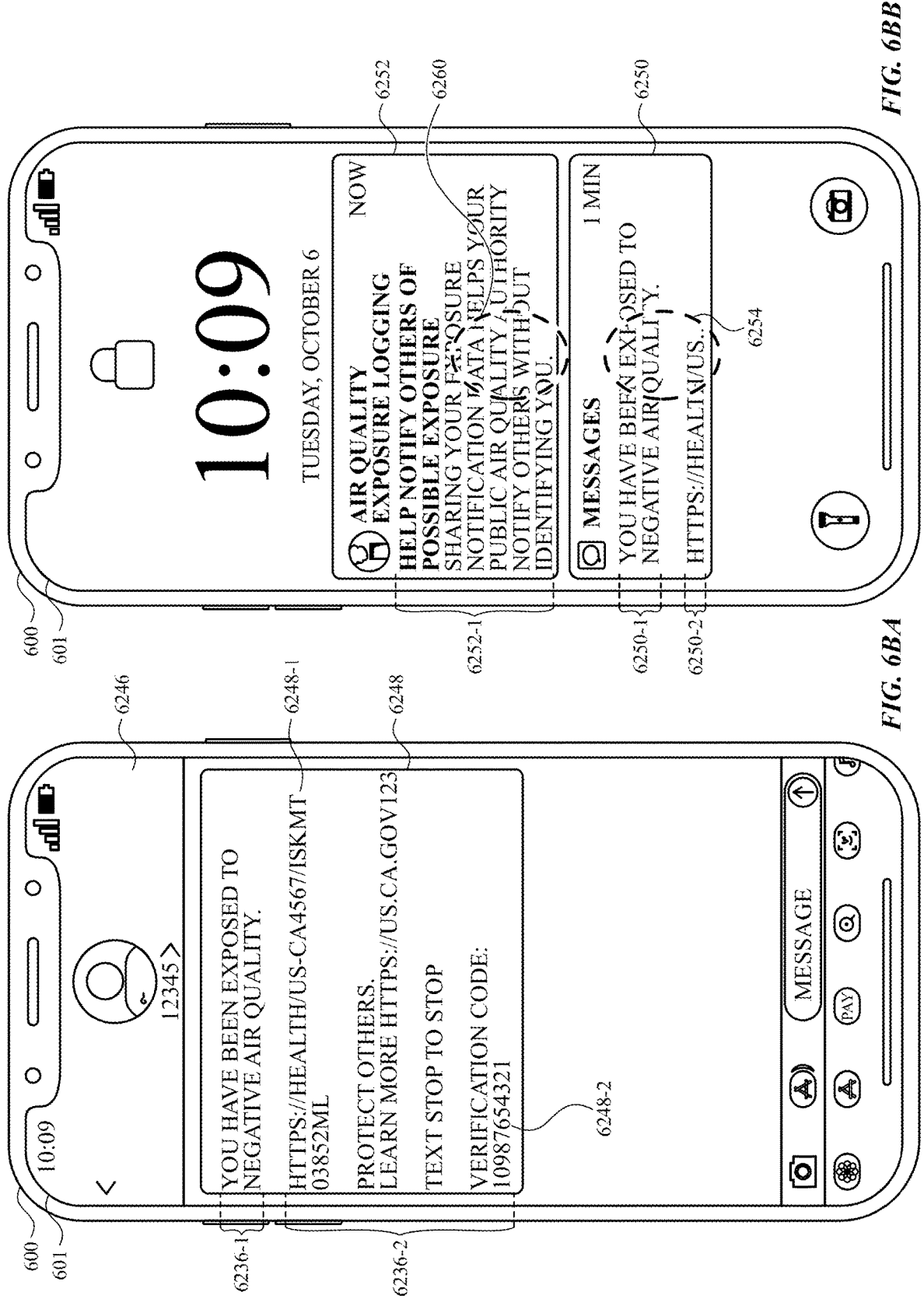

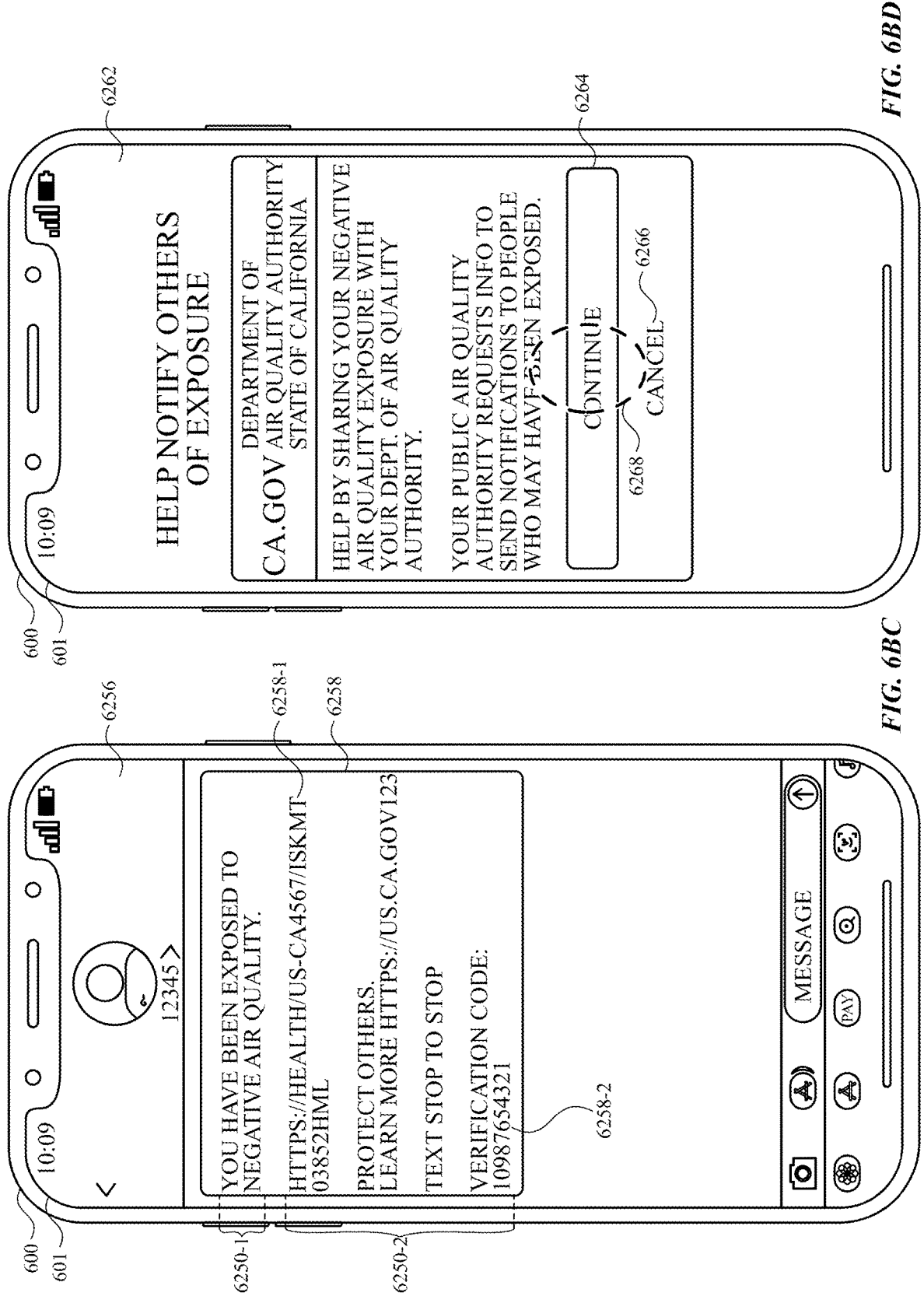

700 ⤦

702
After completion of a process in which one or more notifications are enabled for display, display a first notification.

704
Receive an input directed to the first notification.

706
In response to receiving the input directed to the first notification:

708
In accordance with a determination that a first application associated with the first notification is configured to execute on the computer system, display a user interface of the first application.

710
In accordance with a determination that the first application associated with the first notification is not configured to execute on the computer system, display a user interface object associated with a process for configuring the first application for executing on the computer system.

902
While a first location function is not active, receive a first input corresponding to a request to enable a notification feature.

↓

904
In response to the first input, display a first interface of a set of user interfaces, wherein the set of user interfaces includes a region-selection interface that includes a region-selection graphical user interface object, for selecting a region.

↓

906
While displaying the region-selection interface, receive a first set of one or more inputs that includes a second input corresponding to the region-selection graphical user interface object, wherein the second input identifies a first region.

↓

908
In response to receiving the first set of one or more inputs that includes the second input:

910
In accordance with a determination that the first region satisfies a first set of criteria, enable the notification feature wihtout requiring download of a first application that is associated with the first region.

↓

912
In accordance with a determination that the first region does not satisfy the first set of criteria, display an indication of whether a second application that is associated with the first region is available for operation on the computer system.

*FIG. 9*

USER INTERFACES FOR MANAGING EXPOSURE NOTIFICATIONS

CROSS-REFERENCES TO RELATED APPLICATIONS

This application claims priority to the following U.S. Provisional Applications: U.S. Provisional Application Ser. No. 63/041,959, entitled "USER INTERFACES FOR MANAGING EXPOSURE NOTIFICATIONS," and filed Jun. 21, 2020; U.S. Provisional Application Ser. No. 63/073,411, entitled "USER INTERFACES FOR MANAGING EXPOSURE NOTIFICATIONS," and filed Sep. 1, 2020; and U.S. Provisional Application Ser. No. 63/149,580, entitled "USER INTERFACES FOR MANAGING EXPOSURE NOTIFICATIONS," and filed Feb. 15, 2021. The contents of these applications are hereby incorporated by reference in their entireties.

FIELD

The present disclosure relates generally to computer user interfaces, and more specifically to techniques for managing exposure notifications.

BACKGROUND

An electronic device can be used to manage notifications indicating various events. Information concerning events can be presented to the user on the electronic device, after receiving notifications.

BRIEF SUMMARY

Some techniques for managing exposure notifications using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing exposure notifications. Such methods and interfaces optionally complement or replace other methods for managing exposure notifications. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and one or more input devices is described. The method comprises: after completion of a process in which one or more notifications are enabled for display, displaying, via the display generation component, a first notification; receiving, via the one or more input devices, an input directed to the first notification; and in response to receiving the input directed to the first notification: in accordance with a determination that a first application associated with the first notification is configured to execute on the computer system, displaying, via the display generation component, a user interface of the first application; and in accordance with a determination that the first application associated with the first notification is not configured to execute on the computer system, displaying, via the display generation component, a user interface object associated with a process for configuring the first application for executing on the computer system.

In accordance with some embodiments, a non-transitory computer-readable storage medium storing one or more programs configured to be executed by one or more processors of a computer system in communication with a display generation component and one or more input devices is described. The one or more programs include instructions for: after completion of a process in which one or more notifications are enabled for display, displaying, via the display generation component, a first notification; receiving, via the one or more input devices, an input directed to the first notification; and in response to receiving the input directed to the first notification: in accordance with a determination that a first application associated with the first notification is configured to execute on the computer system, displaying, via the display generation component, a user interface of the first application; and in accordance with a determination that the first application associated with the first notification is not configured to execute on the computer system, displaying, via the display generation component, a user interface object associated with a process for configuring the first application for executing on the computer system.

In accordance with some embodiments, a transitory computer-readable storage medium storing one or more programs configured to be executed by one or more processors of a computer system in communication with a display generation component and one or more input devices is described. The one or more programs include instructions for: after completion of a process in which one or more notifications are enabled for display, displaying, via the display generation component, a first notification; receiving, via the one or more input devices, an input directed to the first notification; and in response to receiving the input directed to the first notification: in accordance with a determination that a first application associated with the first notification is configured to execute on the computer system, displaying, via the display generation component, a user interface of the first application; and in accordance with a determination that the first application associated with the first notification is not configured to execute on the computer system, displaying, via the display generation component, a user interface object associated with a process for configuring the first application for executing on the computer system.

In accordance with some embodiments, a computer system in communication with a display generation component and one or more input devices is described. The computer system in communication with a display generation component and one or more input devices comprises one or more processors, and memory storing one or more programs configured to be executed by the one or more processors. The one or more programs include instructions for: after completion of a process in which one or more notifications are enabled for display, displaying, via the display generation component, a first notification; receiving, via the one or more input devices, an input directed to the first notification; and in response to receiving the input directed to the first notification: in accordance with a determination that a first application associated with the first notification is configured to execute on the computer system, displaying, via the display generation component, a user interface of the first application; and in accordance with a determination that the first application associated with the first notification is not configured to execute on the computer system, displaying, via the display generation component, a user interface object associated with a process for configuring the first application for executing on the computer system.

In accordance with some embodiments, a computer system in communication with a display generation component and one or more input devices is described. The computer system in communication with a display generation component and one or more input devices comprises means for after completion of a process in which one or more notifications are enabled for display, displaying, via the display generation component, a first notification; means for receiving, via the one or more input devices, an input directed to the first notification; and means for, in response to receiving the input directed to the first notification: in accordance with a determination that a first application associated with the first notification is configured to execute on the computer system, displaying, via the display generation component, a user interface of the first application; and in accordance with a determination that the first application associated with the first notification is not configured to execute on the computer system, displaying, via the display generation component, a user interface object associated with a process for configuring the first application for executing on the computer system.

In accordance with some embodiments, a method performed at a computer system that is in communication with a display generation component and one or more input devices is described. The method comprises: displaying, via the display generation component, a notification management interface that includes: a first user interface object corresponding to a first entity, wherein the computer system is currently configured to transmit first data to the first entity, and wherein the first entity is currently enabled to provide notifications; a second user interface object corresponding to a second entity, wherein the computer system is currently configured to transmit second data to the second entity, and wherein the second entity is currently enabled to provide notifications; and a first selectable user interface object; while the computer system is configured to transmit the first data to the first entity and the second data to the second entity, receiving, via the one or more input devices, a first input corresponding to the first selectable user interface object; and in response to receiving the first input, disabling notifications from both the first entity and the second entity, including: disabling transmission of the first data to the first entity; and disabling transmission of the second data to the second entity.

In accordance with some embodiments, a non-transitory computer-readable storage medium storing one or more programs configured to be executed by one or more processors of a computer system in communication with a display generation component and one or more input devices is described. The one or more programs include instructions for: displaying, via the display generation component, a notification management interface that includes: a first user interface object corresponding to a first entity, wherein the computer system is currently configured to transmit first data to the first entity, and wherein the first entity is currently enabled to provide notifications; a second user interface object corresponding to a second entity, wherein the computer system is currently configured to transmit second data to the second entity, and wherein the second entity is currently enabled to provide notifications; and a first selectable user interface object; while the computer system is configured to transmit the first data to the first entity and the second data to the second entity, receiving, via the one or more input devices, a first input corresponding to the first selectable user interface object; and in response to receiving the first input, disabling notifications from both the first entity and the second entity, including: disabling transmission of the first data to the first entity; and disabling transmission of the second data to the second entity.

In accordance with some embodiments, a transitory computer-readable storage medium storing one or more programs configured to be executed by one or more processors of a computer system in communication with a display generation component and one or more input devices is described. The one or more programs include instructions for: displaying, via the display generation component, a notification management interface that includes: a first user interface object corresponding to a first entity, wherein the computer system is currently configured to transmit first data to the first entity, and wherein the first entity is currently enabled to provide notifications; a second user interface object corresponding to a second entity, wherein the computer system is currently configured to transmit second data to the second entity, and wherein the second entity is currently enabled to provide notifications; and a first selectable user interface object; while the computer system is configured to transmit the first data to the first entity and the second data to the second entity, receiving, via the one or more input devices, a first input corresponding to the first selectable user interface object; and in response to receiving the first input, disabling notifications from both the first entity and the second entity, including: disabling transmission of the first data to the first entity; and disabling transmission of the second data to the second entity.

In accordance with some embodiments, a computer system in communication with a display generation component and one or more input devices is described. The computer system in communication with a display generation component and one or more input devices comprises one or more processors, and memory storing one or more programs configured to be executed by the one or more processors. The one or more programs include instructions for: displaying, via the display generation component, a notification management interface that includes: a first user interface object corresponding to a first entity, wherein the computer system is currently configured to transmit first data to the first entity, and wherein the first entity is currently enabled to provide notifications; a second user interface object corresponding to a second entity, wherein the computer system is currently configured to transmit second data to the second entity, and wherein the second entity is currently enabled to provide notifications; and a first selectable user interface object; while the computer system is configured to transmit the first data to the first entity and the second data to the second entity, receiving, via the one or more input devices, a first input corresponding to the first selectable user interface object; and in response to receiving the first input, disabling notifications from both the first entity and the second entity, including: disabling transmission of the first data to the first entity; and disabling transmission of the second data to the second entity.

In accordance with some embodiments, a computer system in communication with a display generation component and one or more input devices is described. The computer system in communication with a display generation component and one or more input devices comprises means for displaying, via the display generation component, a notification management interface that includes: a first user interface object corresponding to a first entity, wherein the computer system is currently configured to transmit first data to the first entity, and wherein the first entity is currently enabled to provide notifications; a second user interface object corresponding to a second entity, wherein the computer system is currently configured to transmit second data to the second entity, and wherein the second entity is currently enabled to provide notifications; and a first selectable user interface object; means for, while the computer system is configured to transmit the first data to the first entity and the second data to the second entity, receiving, via the one or more input devices, a first input corresponding to the first selectable user interface object; and means for, in response to receiving the first input, disabling notifications from both the first entity and the second entity, including: disabling transmission of the first data to the first entity; and disabling transmission of the second data to the second entity.

In accordance with some embodiments, a method performed at a computer system that is in communication with a display generation component and one or more input devices is described. The method comprises: while a first location function is not active, receiving, via the one or more input devices, a first input corresponding to a request to enable a notification feature; in response to the first input, displaying, via the display generation component, a first interface of a set of user interfaces, wherein the set of user interfaces includes a region-selection interface that includes a region-selection graphical user interface object, for selecting a region; while displaying the region-selection interface, receiving a first set of one or more inputs that includes a second input corresponding to the region-selection graphical user interface object, wherein the second input identifies a first region; and in response to receiving the first set of one or more inputs that includes the second input: in accordance with a determination that the first region satisfies a first set of criteria, enabling the notification feature without requiring download that is associated with the first region; and in accordance with a determination that the first region does not satisfy the first set of criteria, displaying, via the display generation component, an indication of whether a second application that is associated with the first region is available for operation on the computer system.

In accordance with some embodiments, a non-transitory computer-readable storage medium storing one or more programs configured to be executed by one or more processors of a computer system in communication with a display generation component and one or more input devices is described. The one or more programs include instructions for: while a first location function is not active, receiving, via the one or more input devices, a first input corresponding to a request to enable a notification feature; in response to the first input, displaying, via the display generation component, a first interface of a set of user interfaces, wherein the set of user interfaces includes a region-selection interface that includes a region-selection graphical user interface object, for selecting a region; while displaying the region-selection interface, receiving a first set of one or more inputs that includes a second input corresponding to the region-selection graphical user interface object, wherein the second input identifies a first region; and in response to receiving the first set of one or more inputs that includes the second input: in accordance with a determination that the first region satisfies a first set of criteria, enabling the notification feature without requiring download that is associated with the first region; and in accordance with a determination that the first region does not satisfy the first set of criteria, displaying, via the display generation component, an indication of whether a second application that is associated with the first region is available for operation on the computer system.

In accordance with some embodiments, a transitory computer-readable storage medium storing one or more programs configured to be executed by one or more processors of a computer system in communication with a display generation component and one or more input devices is described. The one or more programs include instructions for: while a first location function is not active, receiving, via the one or more input devices, a first input corresponding to a request to enable a notification feature; in response to the first input, displaying, via the display generation component, a first interface of a set of user interfaces, wherein the set of user interfaces includes a region-selection interface that includes a region-selection graphical user interface object, for selecting a region; while displaying the region-selection interface, receiving a first set of one or more inputs that includes a second input corresponding to the region-selection graphical user interface object, wherein the second input identifies a first region; and in response to receiving the first set of one or more inputs that includes the second input: in accordance with a determination that the first region satisfies a first set of criteria, enabling the notification feature without requiring download that is associated with the first region; and in accordance with a determination that the first region does not satisfy the first set of criteria, displaying, via the display generation component, an indication of whether a second application that is associated with the first region is available for operation on the computer system.

In accordance with some embodiments, a computer system in communication with a display generation component and one or more input devices is described. The computer system in communication with a display generation component and one or more input devices comprises one or more processors, and memory storing one or more programs configured to be executed by the one or more processors. The one or more programs include instructions for: while a first location function is not active, receiving, via the one or more input devices, a first input corresponding to a request to enable a notification feature; in response to the first input, displaying, via the display generation component, a first interface of a set of user interfaces, wherein the set of user interfaces includes a region-selection interface that includes a region-selection graphical user interface object, for selecting a region; while displaying the region-selection interface, receiving a first set of one or more inputs that includes a second input corresponding to the region-selection graphical user interface object, wherein the second input identifies a first region; and in response to receiving the first set of one or more inputs that includes the second input: in accordance with a determination that the first region satisfies a first set of criteria, enabling the notification feature without requiring download that is associated with the first region; and in accordance with a determination that the first region does not satisfy the first set of criteria, displaying, via the display generation component, an indication of whether a second application that is associated with the first region is available for operation on the computer system.

In accordance with some embodiments, a computer system in communication with a display generation component and one or more input devices is described. The computer system in communication with a display generation component and one or more input devices comprises means for, while a first location function is not active, receiving, via the one or more input devices, a first input corresponding to a request to enable a notification feature; means for, in response to the first input, displaying, via the display generation component, a first interface of a set of user interfaces, wherein the set of user interfaces includes a region-selection interface that includes a region-selection graphical user interface object, for selecting a region; means for, while displaying the region-selection interface, receiving a first set of one or more inputs that includes a second input corresponding to the region-selection graphical user interface object, wherein the second input identifies a first region; and means for, in response to receiving the first set of one or more inputs that includes the second input: in accordance with a determination that the first region satisfies a first set of criteria, enabling the notification feature without requiring download that is associated with the first region; and in accordance with a determination that the first region does not satisfy the first set of criteria, displaying, via the display generation component, an indication of whether a second application that is associated with the first region is available for operation on the computer system.

In accordance with some embodiments, a method performed at a computer system that is in communication with a display generation component and one or more input devices is described. The method comprises: receiving a text message that includes first data; and in response to receiving the text message that includes the first data: in accordance with a determination that the text message satisfies a set of criteria, displaying, via the display generation component, a first type of notification; and in accordance with a determination that the text message does not satisfy the set of criteria, displaying, via the display generation component, a second type of notification different from the first type of notification.

In accordance with some embodiments, a non-transitory computer-readable storage medium storing one or more programs configured to be executed by one or more processors of a computer system in communication with a display generation component and one or more input devices is described. The one or more programs include instructions for: receiving a text message that includes first data; and in response to receiving the text message that includes the first data: in accordance with a determination that the text message satisfies a set of criteria, displaying, via the display generation component, a first type of notification; and in accordance with a determination that the text message does not satisfy the set of criteria, displaying, via the display generation component, a second type of notification different from the first type of notification.

In accordance with some embodiments, a transitory computer-readable storage medium storing one or more programs configured to be executed by one or more processors of a computer system in communication with a display generation component and one or more input devices is described. The one or more programs include instructions for: receiving a text message that includes first data; and in response to receiving the text message that includes the first data: in accordance with a determination that the text message satisfies a set of criteria, displaying, via the display generation component, a first type of notification; and in accordance with a determination that the text message does not satisfy the set of criteria, displaying, via the display generation component, a second type of notification different from the first type of notification.

In accordance with some embodiments, a computer system in communication with a display generation component and one or more input devices is described. The computer system in communication with a display generation component and one or more input devices comprises one or more processors, and memory storing one or more programs configured to be executed by the one or more processors. The one or more programs include instructions for: receiving a text message that includes first data; and in response to receiving the text message that includes the first data: in accordance with a determination that the text message satisfies a set of criteria, displaying, via the display generation component, a first type of notification; and in accordance with a determination that the text message does not satisfy the set of criteria, displaying, via the display generation component, a second type of notification different from the first type of notification.

In accordance with some embodiments, a computer system in communication with a display generation component and one or more input devices is described. The computer system in communication with a display generation component and one or more input devices comprises means for receiving a text message that includes first data; and means for, in response to receiving the text message that includes the first data: in accordance with a determination that the text message satisfies a set of criteria, displaying, via the display generation component, a first type of notification; and in accordance with a determination that the text message does not satisfy the set of criteria, displaying, via the display generation component, a second type of notification different from the first type of notification.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing exposure notifications, thereby increasing the effectiveness, efficiency, and user satisfaction with such devices. Such methods and interfaces may complement or replace other methods for managing exposure notifications.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for managing exposure notifications, in accordance with some embodiments.

FIG. 9 is a flow diagram illustrating a method for managing exposure notifications, in accordance with some embodiments.

DESCRIPTION OF EMBODIMENTS

Figure 1A:
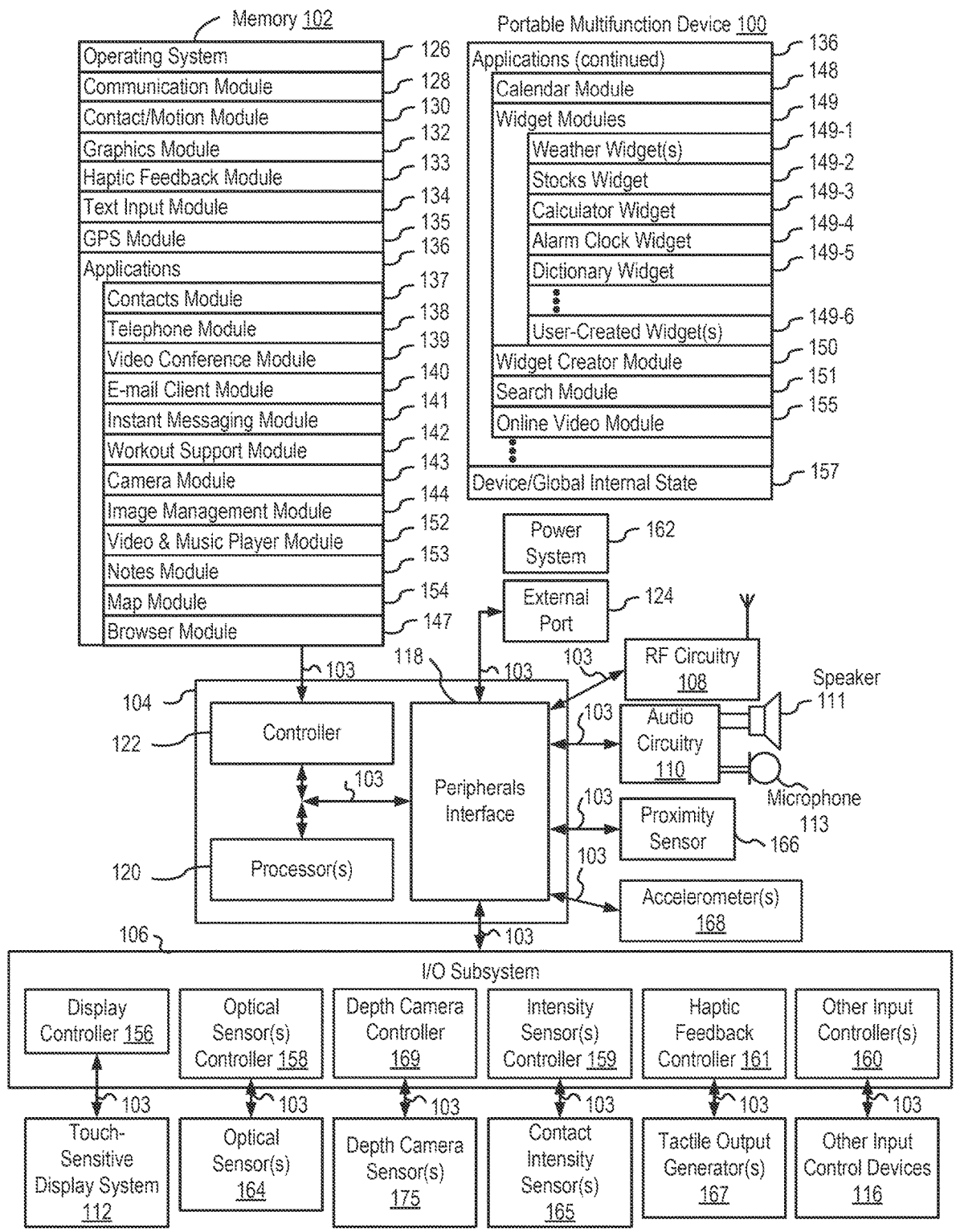
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device provides efficient methods and interfaces for managing exposure notifications. For example, the example electronic device can provide a user with information about potential exposure to violations of air quality regulations in an easily understandable and convenient manner. In another example, the example electronic device can provide the user with a user interface for managing exposure notification settings for multiple jurisdictions. Such techniques of the example electronic device can reduce the cognitive burden on a user who monitors exposure to violations of air quality regulations, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing exposure notifications. FIGS. 6A-6BD illustrate exemplary user interfaces for managing exposure notifications. FIGS. 7-10 are flow diagrams illustrating methods of managing exposure notifications in accordance with some embodiments. The user interfaces in FIGS. 6A-6BD are used to illustrate the processes described below, including the processes in FIGS. 7-10.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying"

content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
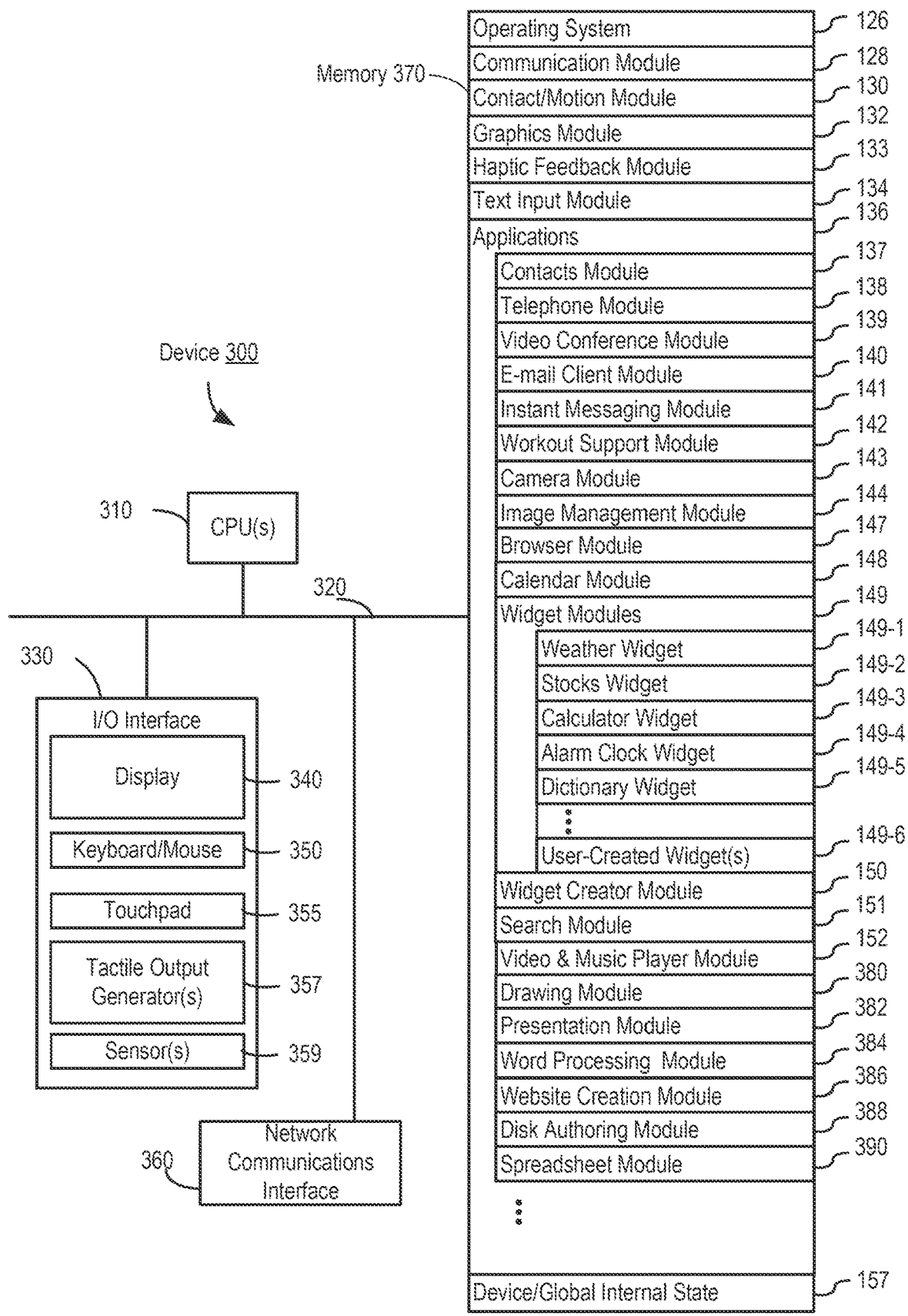
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
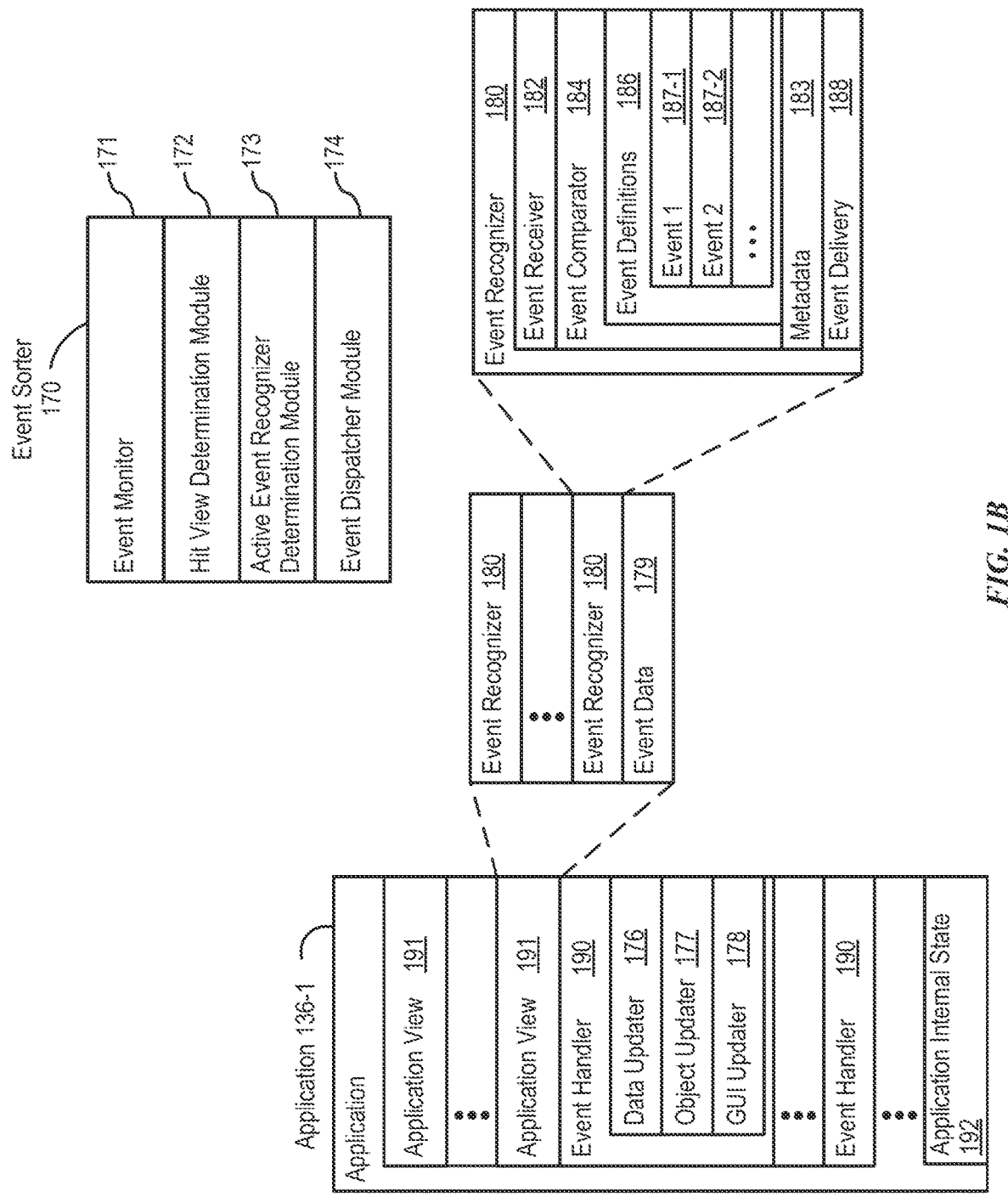
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
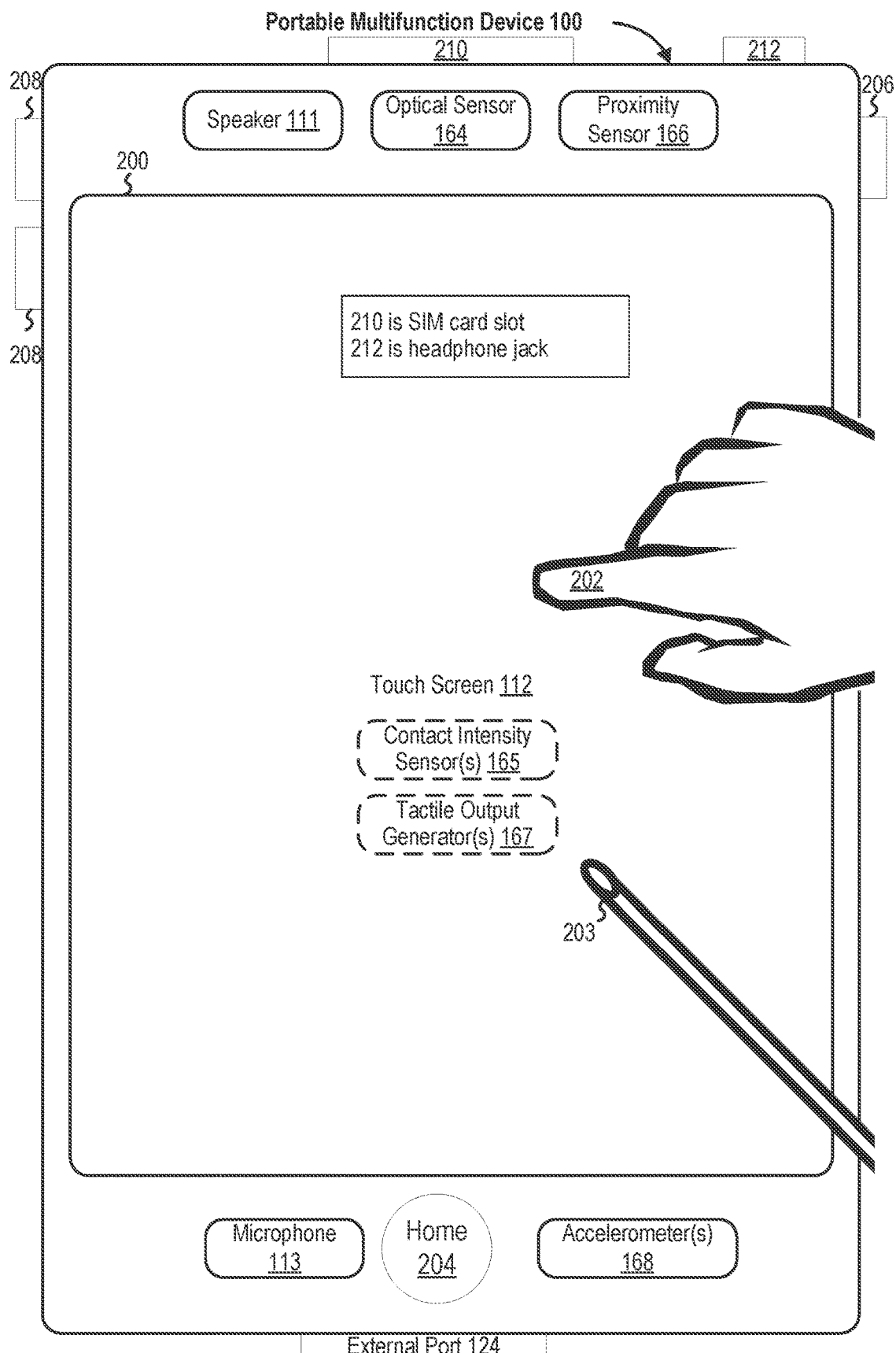
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
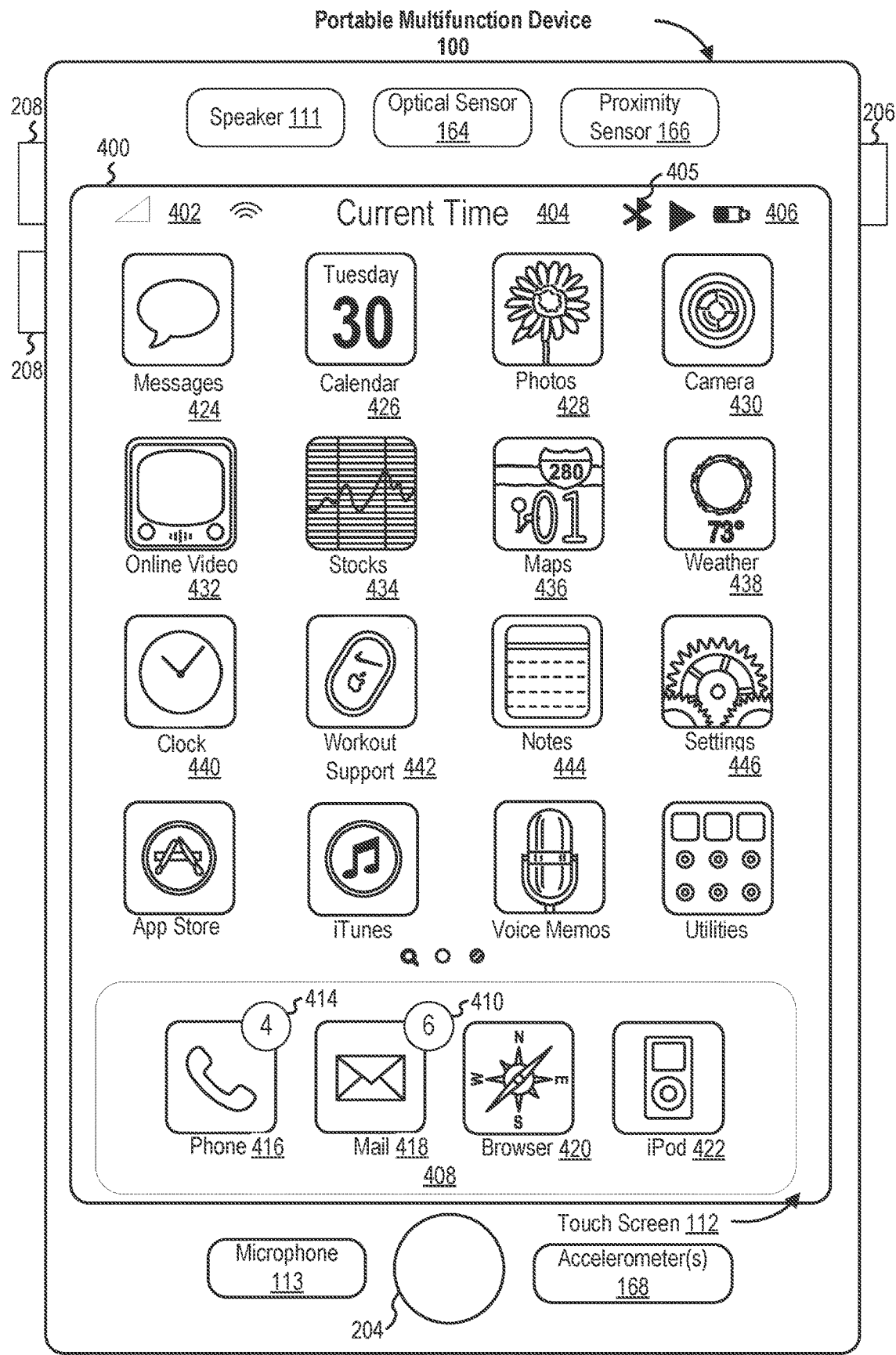
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
　Icon 416 for telephone module 138, labeled "Phone," which optionally includes an indicator 414 of the number of missed calls or voicemail messages;
　Icon 418 for e-mail client module 140, labeled "Mail," which optionally includes an indicator 410 of the number of unread e-mails;
　Icon 420 for browser module 147, labeled "Browser;" and
　Icon 422 for video and music player module 152, also referred to as iPod (trademark of Apple Inc.) module 152, labeled "iPod;" and
Icons for other applications, such as:
　Icon 424 for IM module 141, labeled "Messages;"
　Icon 426 for calendar module 148, labeled "Calendar;"
　Icon 428 for image management module 144, labeled "Photos;"
　Icon 430 for camera module 143, labeled "Camera;"
　Icon 432 for online video module 155, labeled "Online Video;"
　Icon 434 for stocks widget 149-2, labeled "Stocks;"
　Icon 436 for map module 154, labeled "Maps;"
　Icon 438 for weather widget 149-1, labeled "Weather;"
　Icon 440 for alarm clock widget 149-4, labeled "Clock;"
　Icon 442 for workout support module 142, labeled "Workout Support;"
　Icon 444 for notes module 153, labeled "Notes;" and
　Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
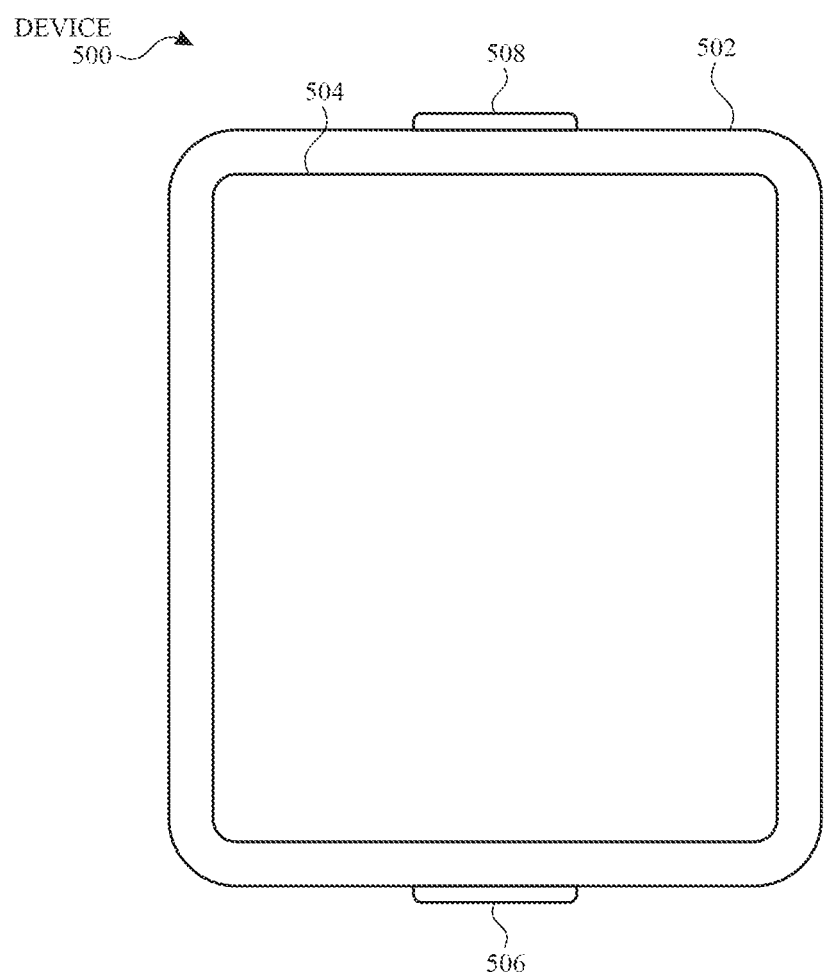
FIG. 5A illustrates a personal electronic device in accordance with some embodiments.
Figure 6A:
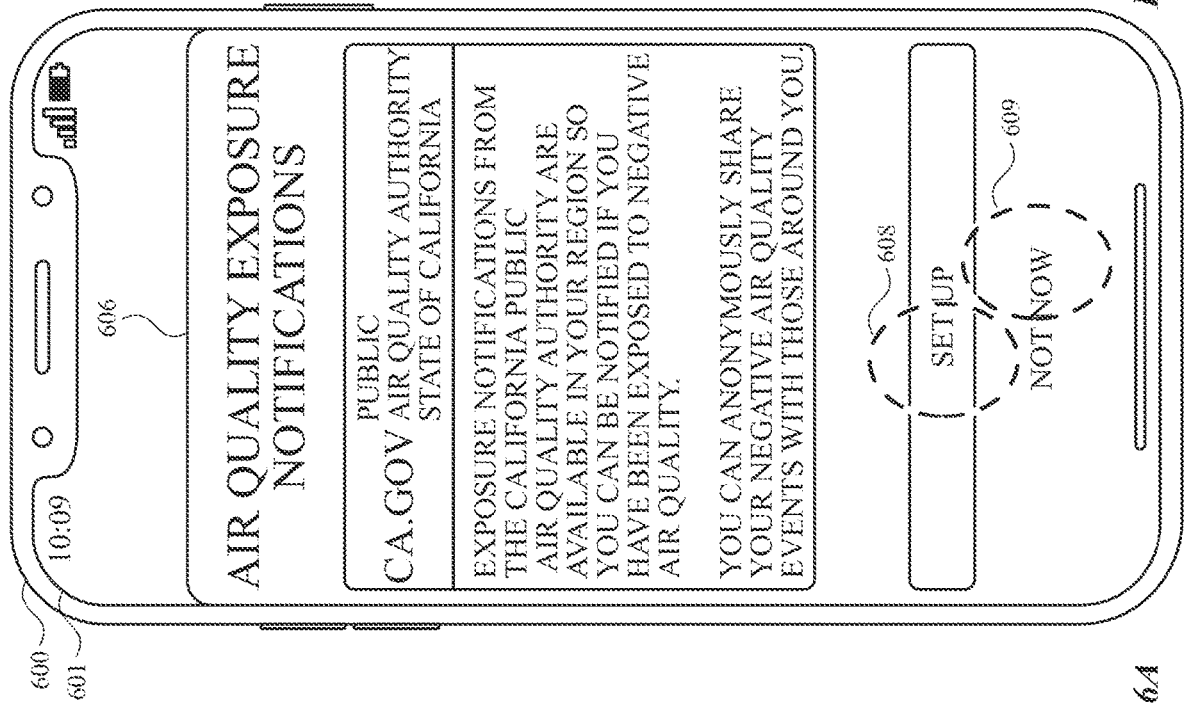
FIGS. 6A-6BD illustrate user interfaces for managing exposure notifications, in accordance with some embodiments.
Figure 6B:
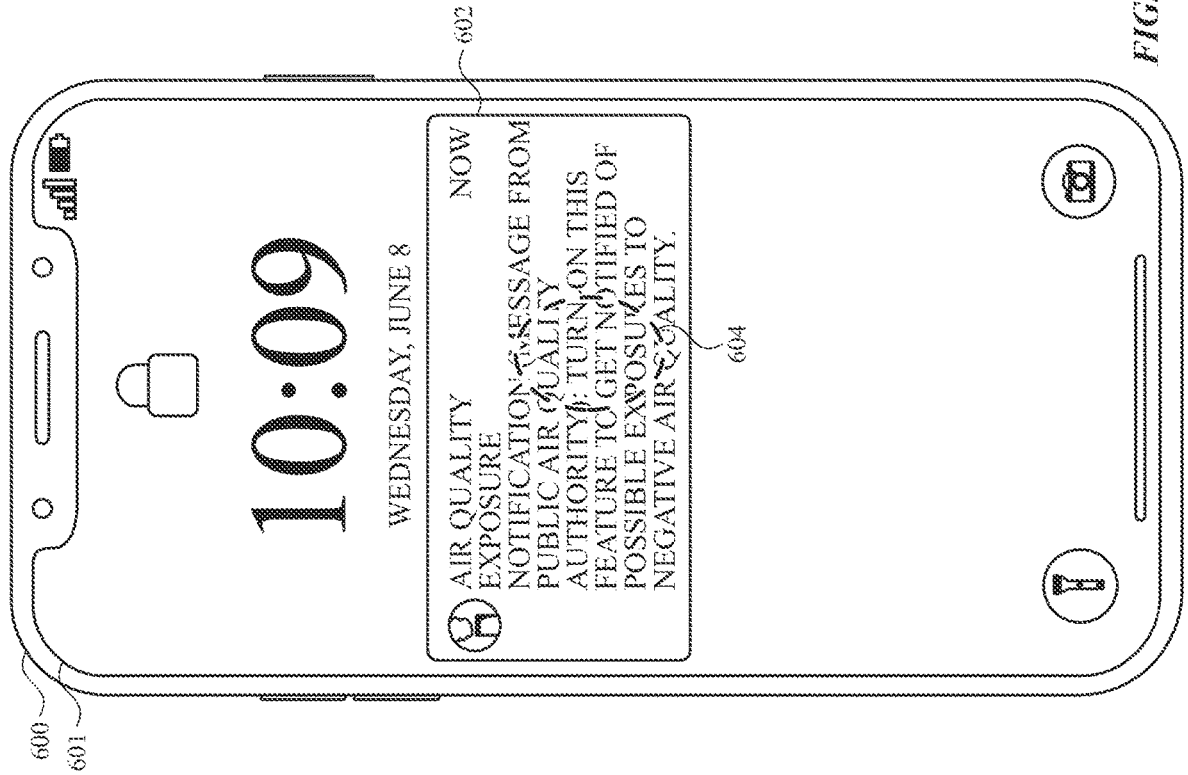

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
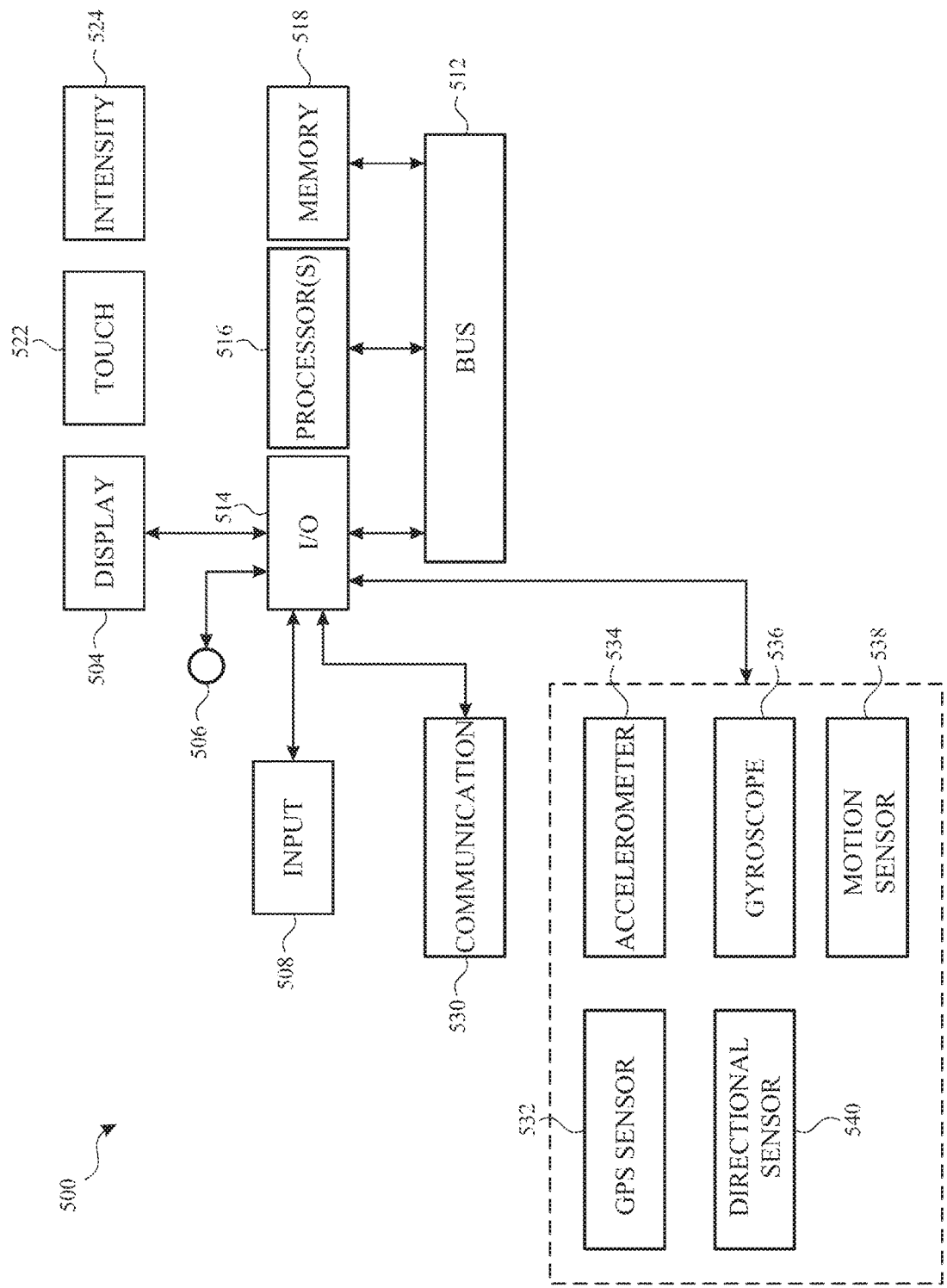
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 900, and 1000 (FIGS. 7-10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6BD illustrate exemplary user interfaces for managing exposure notifications, in accordance with some embodiments. The user interfaces in these figures are used to illustrate the processes described below, including the processes in FIGS. 7, 8, 9, and 10.

FIGS. 6A-6BD illustrate device 600 displaying user interfaces on display 601 (e.g., a display device or display generation component) for managing exposure notifications. In the embodiments depicted in the figures, the exposure notifications are associated with exposure to an environmental condition. However, in some embodiments, the exposure notifications can be associated with exposure to other conditions or events such as, for example, exposure to a person having an infectious disease. In some embodiments, device 600 includes one or more features of devices 100, 300, or 500.

FIGS. 6A-6F depict example user interfaces for enabling exposure notifications at device 600.

In FIG. 6A, device 600 displays notification 602 indicating that a feature for receiving exposure notifications is available for device 600. In some embodiments, notification 602 is displayed when a user of device 600 travels to a jurisdiction (also referred to as a region or location) that supports the exposure notification feature or, in the event the user has not traveled to a new location, when the user's local jurisdiction begins supporting the exposure notification feature. In some embodiments, a jurisdiction supports the feature when the jurisdiction (e.g., an agency or organization representing the jurisdiction) provides (e.g., makes available) an application that is capable of being installed at device 600 for supporting the feature. In some embodiments, a jurisdiction supports the feature when an authority associated with the jurisdiction (e.g., a public air quality authority) establishes rules or guidelines for determining when a person has been exposed to the environmental condition. When device 600 determines that the user meets this criteria, device 600 can generate an exposure notification informing the user of device 600 that they have been exposed to the environmental condition. In some embodiments, notification 602 includes an indication of the jurisdiction and/or public air quality authority supporting the exposure notification feature.

FIG. 6B depicts device 600 displaying user interface 606 in response to input 604 on notification 602. User interface 606 provides additional details concerning the exposure notification feature. In the embodiment illustrated in FIG. 6B, the user's local jurisdiction, California, supports the exposure notification feature through the California Public Air Quality Authority, which is an entity (a public air quality authority) associated with the user's local jurisdiction and having authority to establish criteria for determining when a person has been exposed to negative air quality. In some embodiments, device 600 displays user interface 606 without previously displaying notification 602 and without previously detecting input 604. In some embodiments, device 600 displays user interface 606 in response to one or more of the conditions listed above for displaying notification 602.

Figure 6C:
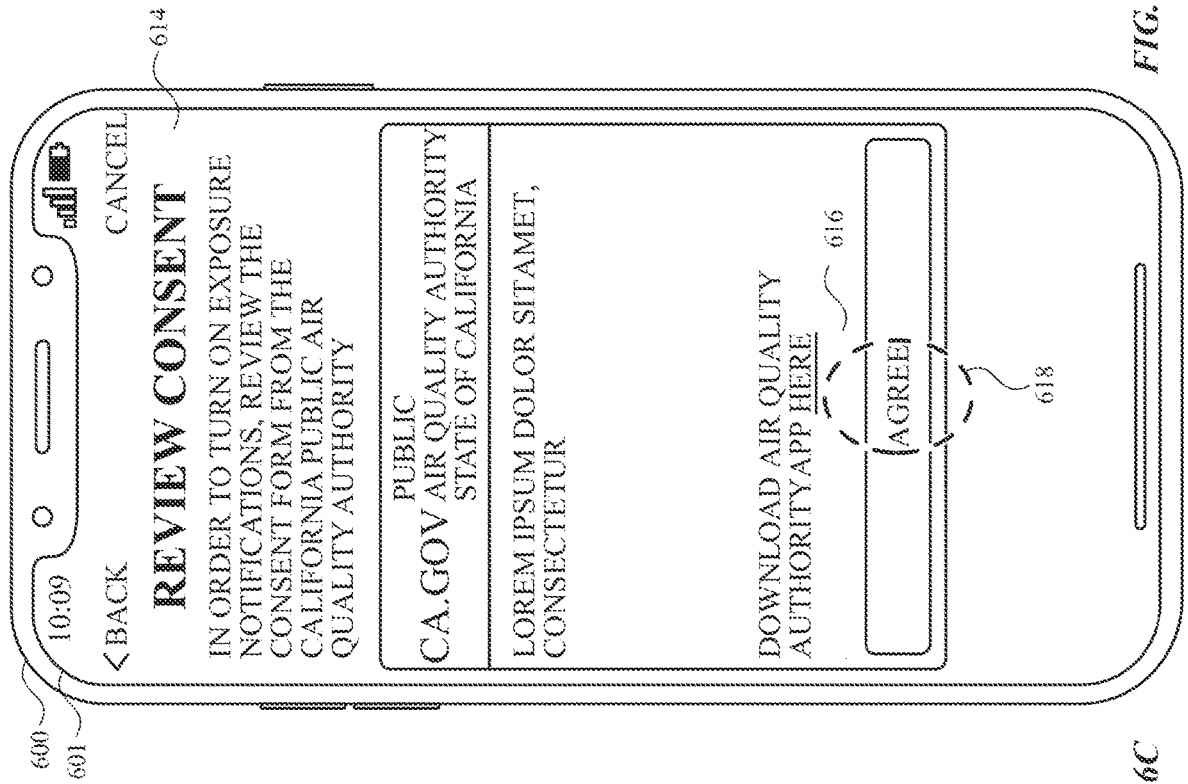

FIG. 6C depicts device 600 displaying user interface 610 in response to input 608 in FIG. 6B. User interface 610 provides detail concerning additional aspects of the exposure notification feature.

Figure 6D:
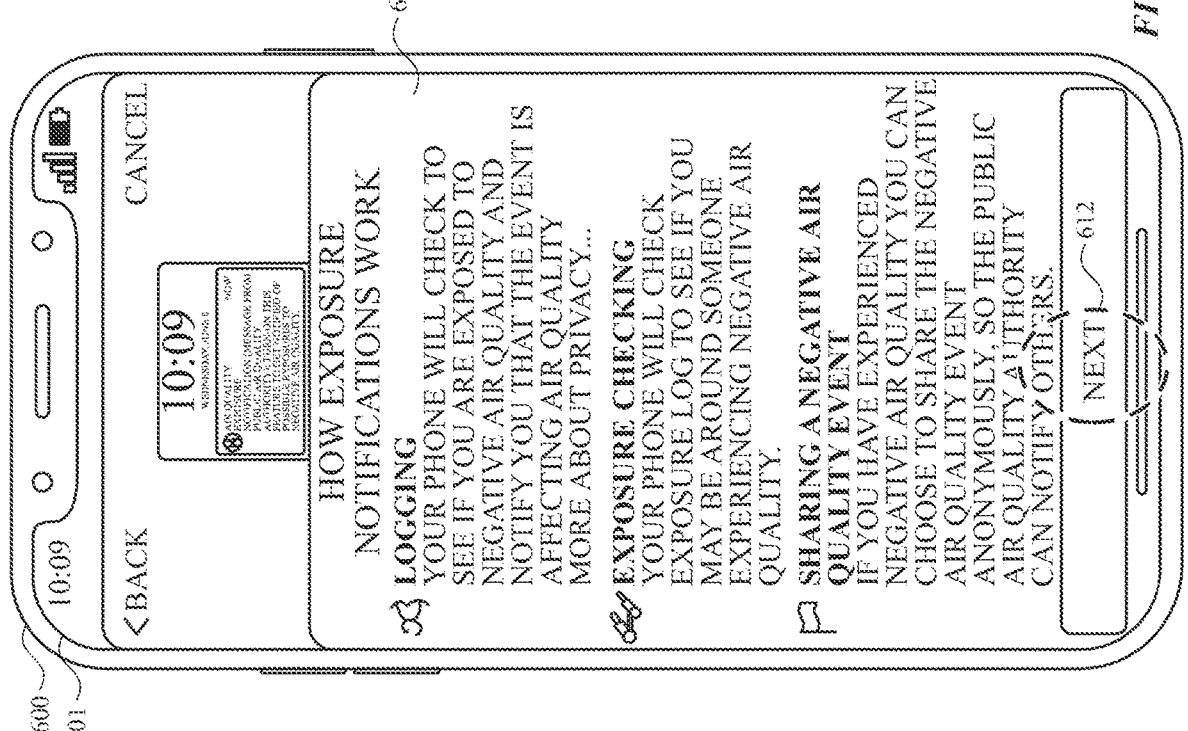

FIG. 6D depicts device 600 displaying consent interface 614 in response to input 612 in FIG. 6C. Consent interface 614 includes a consent form for agreeing to share data with the public air quality authority in order to, for example, enable the exposure notifications from that public air quality authority and/or for agreeing to receive notifications regarding exposure events. In some embodiments, the consent form is used to provide consent to sharing data with the public air quality authority as discussed herein including, for example, sharing data to notify others of the occurrence of the user's exposure to a negative air quality event. Consent interface 614 also includes link 616, which is selectable to initiate a process for downloading an application provided by the public air quality authority. In some embodiments, the application can be accessed to allow the user to access other features and perform actions that are specific to the public air quality authority—in this instance, the California Public Air Quality Authority. In some embodiments, device 600 displays interfaces 606, 610, and 614 with text and user interface elements (e.g., the logo of the jurisdiction) even though the application provided by the jurisdiction is not installed on device 600.

In response to input 618, device 600 enables the exposure notification feature, including enabling the sharing of data with the California Public Air Quality Authority. FIG. 6E depicts device 600 displaying user interface 620 indicating that the exposure notification feature is enabled.

FIG. 6F depicts device 600 displaying exposure notifications settings interface 625 in response to input 622 in FIG. 6E. In FIG. 6F, exposure notifications settings interface 625 indicates that device 600 has not received or generated exposure notifications. Exposure notifications settings interface 625 includes selectable share event option 624, which is selectable to report an occurrence of negative air quality, as discussed in more detail with reference to FIGS. 6Z-6AA. Exposure notifications settings interface 625 also indicates that the exposure notification feature is active, as indicated by exposure logging option 626 shown "ON." Exposure notifications settings interface 625 also includes region portion 628, which indicates the exposure criteria being used to generate exposure notifications and/or the source of exposure notifications, which is referred to herein as being the active region. In FIG. 6F, California is indicated to be the active region—that is, the jurisdiction, California, whose exposure notification criteria is being used, as established by the California Public Air Quality Authority. Region potion 628 also notes that this region is "active," indicating that device 600 is currently configured to exchange data with the California Public Air Quality Authority in support of the exposure notification feature. In some embodiments, device 600 can be configured to exchange data with a public air quality authority, even if the authority's application is not downloaded or installed at device 600. This configuration makes the exposure notification feature more reliable and robust by facilitating more widespread adoption of the exposure notification feature, and specifically the data logging associated with the feature, by permitting users to contribute data to the local public air quality authority, without requiring users to download or install the local authority's application.

Referring briefly to FIG. 6G, device 600 is shown displaying settings menu 630, which is, in some embodiments, a launch interface or default interface of a settings application for device 600. In some embodiments, exposure notifications settings interface 625 can be accessed by selecting exposure notifications option 632 from settings menu 630.

FIG. 6H depicts device 600 displaying region settings interface 635. Region settings interface 635 is displayed in response to input 634 in FIG. 6F.

Region settings interface 635 includes toggle 636, which is selectable to enable or disable a feature for automatically changing the active region (e.g., for changing the notification criteria and/or notification source) based on a location of the user of device 600. In FIG. 6H, this feature is shown enabled. When the feature for automatically changing the active region is enabled, device 600 automatically changes the active region based on the user's current location, provided that the user has consented to sharing data with the public air quality authority of that location. For example, in the embodiment shown in FIG. 6H, because the user is currently located in California, the California Public Air Quality Authority (638-1) is shown in active region portion 638, meaning that device 600 is configured to display exposure notifications based on the specific criteria established by the California Public Air Quality Authority. Other regions that the user has authorized (e.g., by agreeing, for each respective authority, to a consent form similar to that shown in FIG. 6D) include the Public Air Quality Authority of Nevada (640-1) and the Public Air Quality Authority of Oregon (640-2), which can have different criteria for generating exposure notifications. These authorities, which are currently not selected as active, are noted in authorized regions portion 640. Thus, as the user travels from California to Nevada, for example, device 600 automatically switches from using the exposure notification criteria established by the California Public Air Quality Authority to using the exposure notification criteria established by the Public Air Quality Authority of Nevada, without requiring the user to again consent to share data with the Public Air Quality Authority of Nevada and without requiring the user to manually select the Public Air Quality Authority of Nevada as the active region. In this embodiment, the Public Air Quality Authority of Nevada would be displayed in active region portion 638, and the California Public Air Quality Authority would be displayed in authorized regions portion 640. Similarly, device 600 automatically switches from using the exposure notification criteria of Nevada to using the exposure notification criteria of Oregon when the user travels from Nevada to Oregon.

Region settings interface 635 further includes portion 642, which includes an indication of regions that are not authorized to share data with device 600 for enabling exposure notifications. For example, the user has not consented to sharing data with these regions, or the user has de-authorized these regions (e.g., by revoking consent to share data with the public air quality authority of that region). In FIG. 6H, portion 642 includes the Public Air Quality Authority of Arizona (642-1).

In the embodiment illustrated in FIG. 6H, each indication of a respective region includes status information associated with the particular region. For example, the California Public Air Quality Authority includes status indicator 638-1a indicating that the application associated with the California Air Quality Authority is currently not installed at device 600. Similarly, the Public Air Quality Authority of Nevada includes status indicator 640-1a indicating that the application associated with the Public Air Quality Authority of Nevada is installed, and the Public Air Quality Authority of Oregon includes status indicator 640-2a indicating that the application associated with the Public Air Quality Authority of Oregon is not installed. The Public Air Quality Authority of Arizona includes status indicator 642-1a indicating that the authority is not enabled or authorized.

In some embodiments, when toggle 636 is de-selected, the feature for automatically changing the active region based on a location of the user is disabled. In some embodiments, when this feature is disabled, the currently selected region remains active. In some embodiments, when this feature is disabled, the active region is changed manually (e.g., by manually designating a particular jurisdiction as the active region).

Figure 6I:
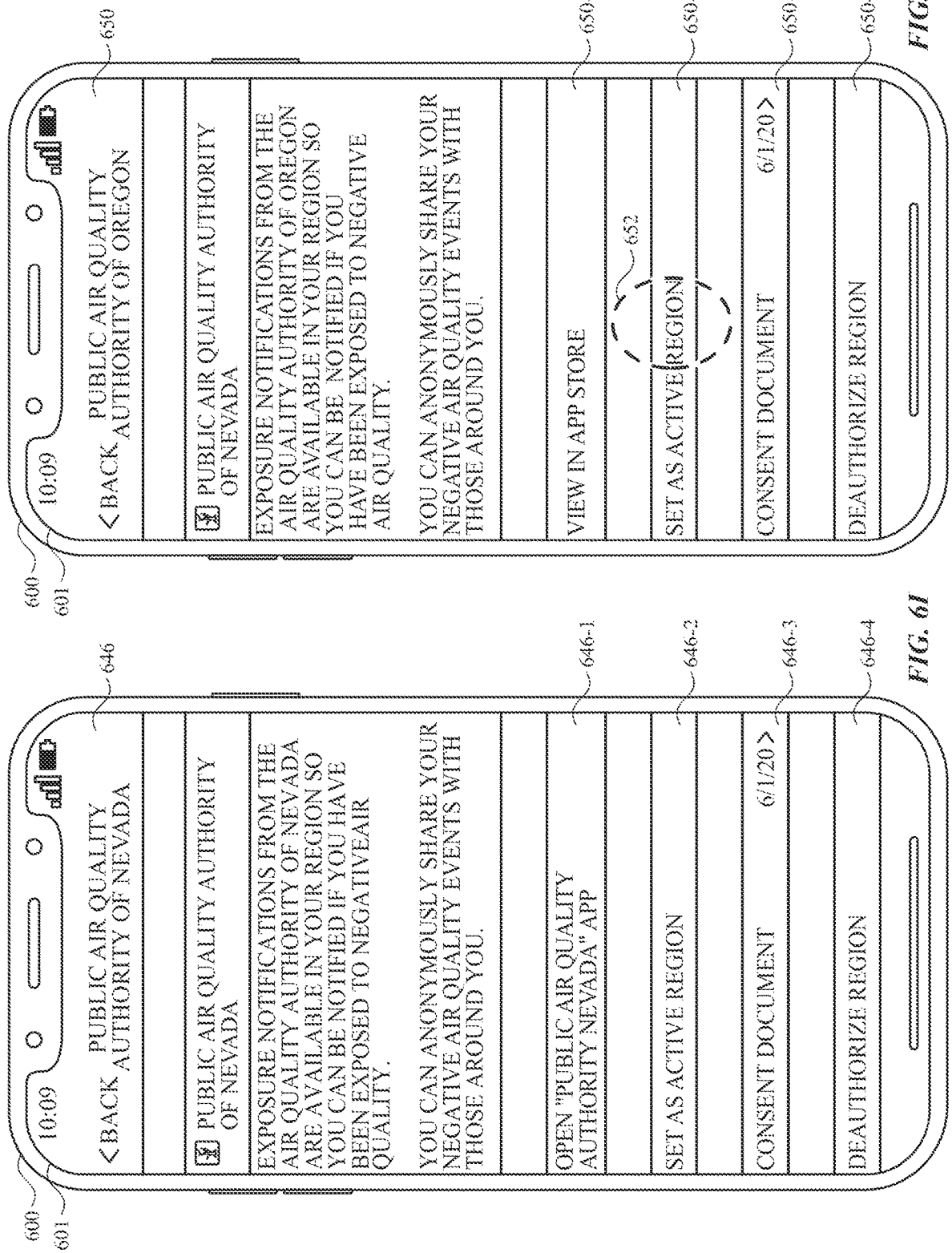

In some embodiments, the regions displayed in region settings interface 635 are selectable to view additional details regarding the selected region. For example, in some embodiments, in response to selecting the Public Air Quality Authority of Arizona (642-1), device 600 displays setup user interfaces (similar to those shown in FIGS. 6B-6E) for authorizing the Public Air Quality Authority of Arizona. As another example, in response to input 644 on the Public Air Quality Authority of Nevada (640-1), device 600 displays interface 646, as shown in FIG. 6I. Interface 646 includes details associated with the Public Air Quality Authority of Nevada, including options 646-1 to 646-4. Option 646-1 is selectable to open or launch the application associated with the Public Air Quality Authority of Nevada (which is currently installed at device 600). Option 646-2 is selectable to manually set the Public Air Quality Authority of Nevada as the active region. Option 646-3 is selectable to view the consent form that was used to authorize the sharing of data with the Public Air Quality Authority of Nevada. Option 646-4 is selectable to de-authorize the Public Air Quality Authority of Nevada. In some embodiments, when option 646-4 is selected, the Public Air Quality Authority of Nevada is displayed in portion 642 of region settings interface 635.

In response to input 648 on the Public Air Quality Authority of Oregon (640-2), device 600 displays interface 650, as shown in FIG. 6J. Interface 650 includes details associated with the Public Air Quality Authority of Oregon, including options 650-1 to 650-4. Option 650-1 is selectable to download and/or install the application associated with the Public Air Quality Authority of Oregon. Option 650-2 is selectable to manually set the Public Air Quality Authority of Oregon as the active region. Option 650-3 is selectable to view the consent form that was used to authorize the sharing of data with the Public Air Quality Authority of Oregon. Option 650-4 is selectable to de-authorize the Public Air Quality Authority of Oregon. In some embodiments, when option 650-4 is selected, the Public Air Quality Authority of Oregon is displayed in portion 642 of region settings interface 635.

Figure 6K:
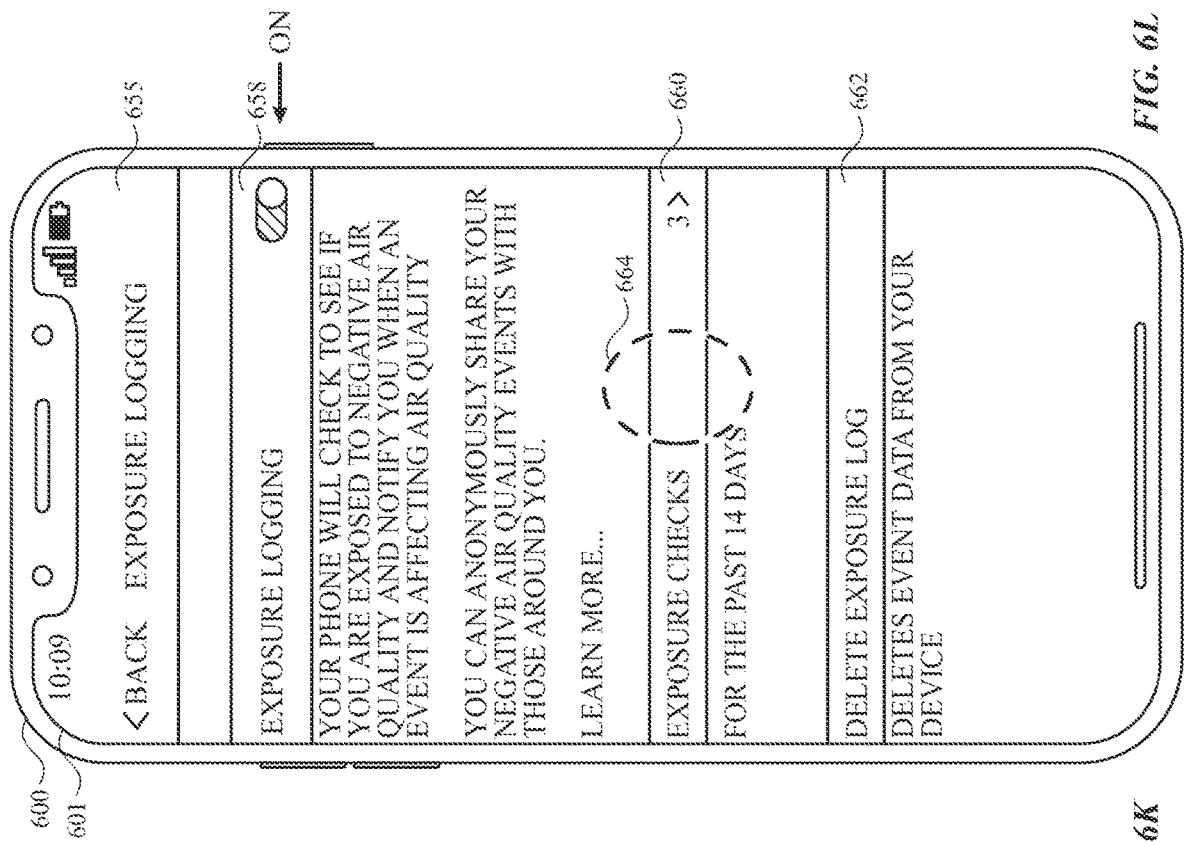

FIG. 6K depicts device 600 displaying user interface object 654, which is displayed in response to detecting input 652 on option 650-2 in FIG. 6J. User interface object 654 is a prompt that instructs the user to confirm whether they wish to set the Public Air Quality Authority of Oregon as the active region. In the embodiment shown in FIG. 6K, manually selecting the active region disables the feature for automatically changing the active region based on a location of the user.

Figure 6L:
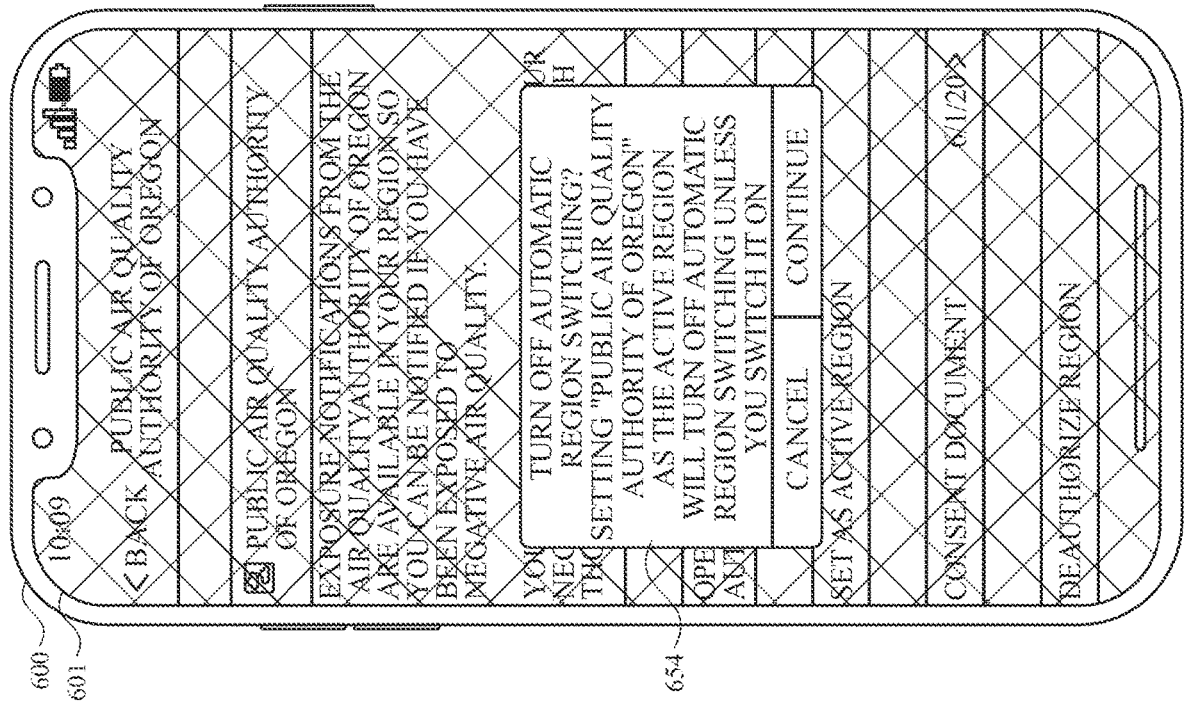

Referring now to FIG. 6L, device 600 depicts exposure logging interface 655, which is displayed in response to input 656 on exposure logging option 626 in FIG. 6F. Exposure logging interface 655 includes toggle 658, which is selectable to enable or disable the exposure notification feature by enabling or disabling the exchanging of data with other nearby devices. In other words, when the exposure logging feature is enabled, device 600 exchanges data with nearby devices in order to determine whether a user of device 600, who is presumed to be at the same location as device 600, is in proximity to other devices (e.g., smartphones, smartwatches, computer systems) that are reporting the occurrence of a negative air quality event or other environmental condition. If the exchanged data indicates that the user of device 600 is in proximity to a device that reports the occurrence of the negative air quality event, the user is presumed to be exposed to the event, and if the exposure to the event satisfies the set of notification criteria established by the active region (e.g., if the user was exposed to the event for five minutes), then device 600 displays an exposure notification as discussed in greater detail below. In FIG. 6L, the exposure notification feature is shown enabled.

Exposure logging interface 655 further includes exposure checks option 660 and delete option 662. Delete option 662 is selectable to delete a log of exposure checks (e.g., the exchange of data discussed above) that are stored at computer system 600. Exposure checks option 660 is selectable to display a log of exposure checks that have occurred in the past, for example, 14 days. Exposure checks option 660 indicates the occurrence of three exposure checks in the past 14 days. In response to input 664 on exposure checks option 660, device 600 displays exposure log 665, as shown in FIG. 6M. Exposure log 665 includes a listing of exposure events 665-1 to 665-3 that occurred in the past 14 days.

Referring now to FIG. 6N, device 600 depicts pause interface 668, which is displayed in response to input 667 on pause logging option 669 in exposure notifications settings interface 625 shown in FIG. 6F. Pause interface 668 includes options 668-1 to 668-3 for pausing logging of exposure checks for a predetermined amount of time. In response to input 670 on option 668-1, device 600 temporarily disables exposure logging for one hour and replaces display of pause logging option 669 with resume logging option 672, as shown in FIG. 6O. Selecting resume logging option 672 re-enables exposure logging, and replaces display of resume logging option 672 with pause logging option 669.

FIGS. 6P and 6Q illustrate user interfaces that are displayed when an exposure notification is generated and an application associated with the public air quality authority is not installed at device 600.

FIG. 6P depicts device 600 displaying exposure notification 674. In the embodiment illustrated in FIG. 6P, the application associated with (e.g., provided by) the California Public Air Quality Authority is currently not downloaded and/or installed at device 600. Nevertheless, device 600 displays exposure notification 674 indicating that someone the user was near recently experienced negative air quality such as, for example, vehicle pollution, smoke, or other hazardous environmental conditions, which implies that the user was potentially exposed to negative air quality.

Device 600 displays exposure notification 674 having badge 675, which is branding representing California and the California Public Air Quality Authority. Exposure notification 674 also includes additional branding such as the name of the authority, namely, the California Public Air Quality Authority. Device 600 displays exposure notification 674 with the branding associated with the California Public Air Quality Authority so that the user understands that exposure notification 674 was displayed in accordance with the exposure criteria established by the California Public Air Quality Authority, even though the application provided by the California Public Air Quality Authority is not installed at device 600. Exposure notification 674 also prompts the user to download the California Public Air Quality Authority application to view additional details concerning the exposure.

FIG. 6Q depicts device 600 displaying exposure details interface 678, which is displayed in response to input 676 on exposure notification 674. Exposure details interface 678 includes additional detail concerning the exposure event and the public air quality authority, including link 679 to download the application provided by the public air quality authority.

Figure 6S:
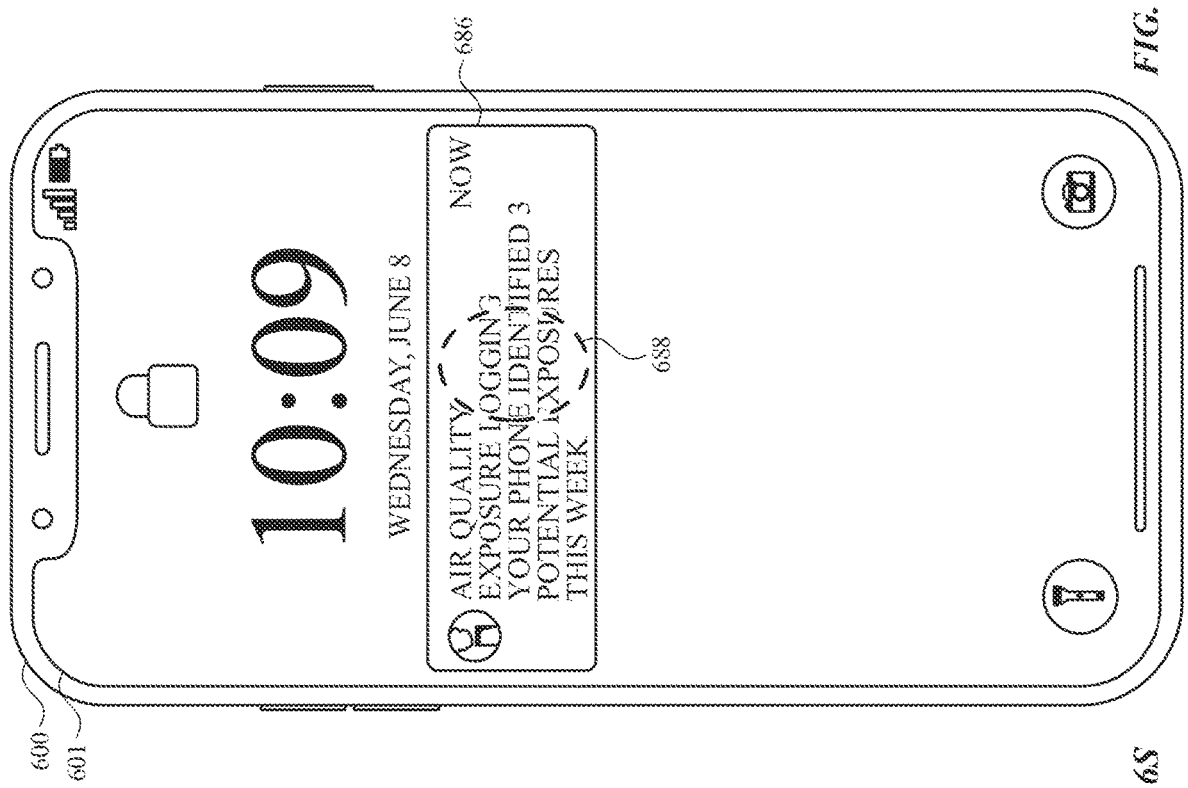

FIGS. 6R and 6S illustrate user interfaces that are displayed when an exposure notification is generated and an application associated with the public air quality authority is installed at device 600.

FIG. 6R depicts device 600 displaying exposure notification 680, which is similar to exposure notification 674. In the embodiment illustrated in FIG. 6R, the application associated with (e.g., provided by) the California Public Air Quality Authority is currently installed at device 600, and the application generates exposure notification 680 for display at device 600 (in contrast to exposure notification 674, which is generated by the system settings (operating system) of device 600). Device 600 displays exposure notification 680 having badge 682, similar to badge 675, which is branding representing California and the California Public Air Quality Authority. Exposure notification 680 also includes additional branding such as the name of the authority, namely, the California Public Air Quality Authority. Device 600 displays exposure notification 680 with the branding associated with the California Public Air Quality Authority so that the user understands that exposure notification 680 was displayed in accordance with the exposure criteria established by the California Public Air Quality Authority. Exposure notification 680 also prompts the user to access the California Public Air Quality Authority application to view additional details concerning the exposure, which also informs the user that exposure notification 680 was generated by the application provided by the California Public Air Quality Authority.

As shown in FIG. 6S, device 600 launches the application provided by the California Public Air Quality Authority, in response to input 684 on exposure notification 680. The application provided by the California Public Air Quality Authority includes application interface 685. The application can be used to view additional detail concerning the exposure event and to interact with the California Public Air Quality Authority.

Figure 6T:
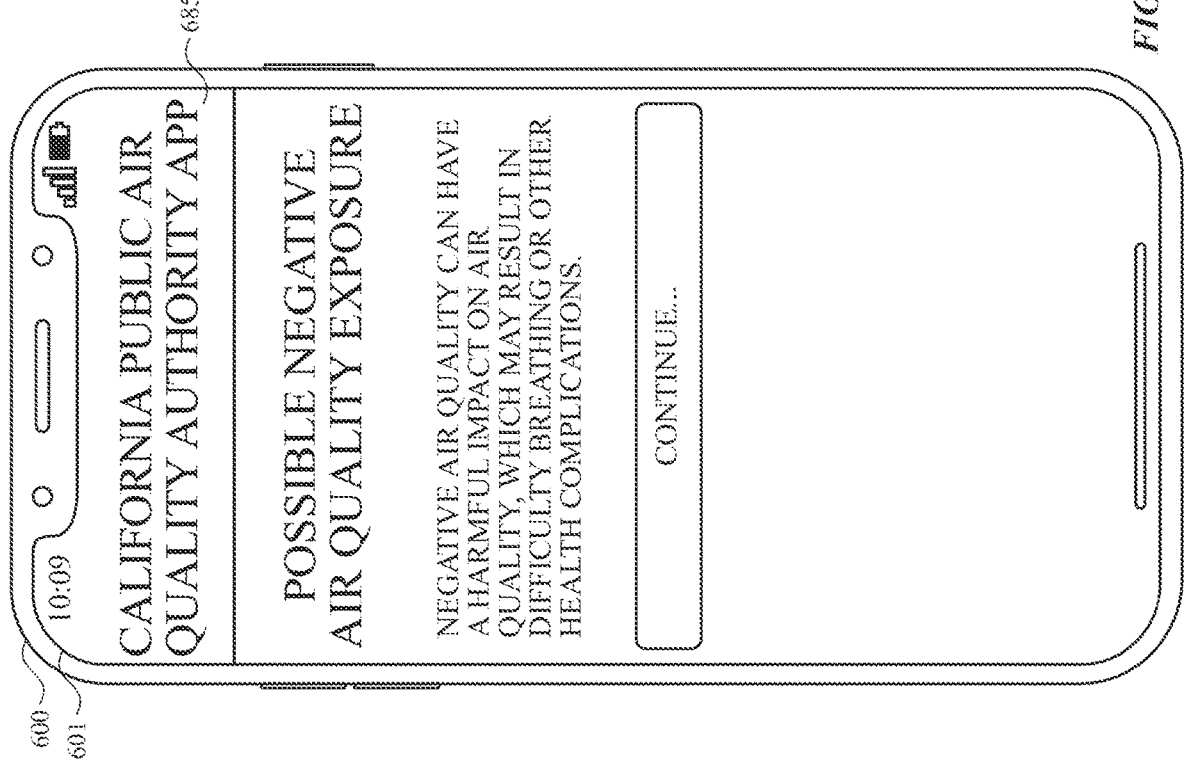

FIGS. 6T and 6U illustrate user interfaces that are displayed when an exposure logging notification is generated and an application associated with the public air quality authority is not installed at device 600.

FIG. 6T depicts device 600 displaying exposure logging notification 686 indicating a number of potential exposures to negative air quality. In the embodiment illustrated in FIG. 6T, the application associated with (e.g., provided by) the California Public Air Quality Authority is currently not downloaded and/or installed at device 600.

FIG. 6U depicts device 600 displaying exposure notifications settings interface 625, which is displayed in response to input 688 on exposure logging notification 686. Exposure notifications settings interface 625 is similar to that shown in FIG. 6F, but updated to include selectable options 689-1 and 689-2. Option 689-1 indicates a new exposure event and is selectable to view details of the possible exposure event, similar to exposure details interface 678. Option 689-2 is selectable to share location data for device 600, for example, to enable tracing or tracking the user's exposure to other users. In some embodiments, selecting option 689-2 displays an option to download the application provided by the public air quality authority, if the application is not installed at device 600. In some embodiments, option 689-2 is displayed when the application provided by the public air quality authority is installed, and selecting option 689-2 launches the application.

FIGS. 6V and 6W illustrate user interfaces that are displayed when an exposure logging notification is generated and an application associated with the public air quality authority is installed at device 600.

FIG. 6V depicts device 600 displaying exposure logging notification 690, similar to exposure logging notification 686, indicating a number of potential exposures to negative air quality. In the embodiment illustrated in FIG. 6V, the application associated with (e.g., provided by) the California Public Air Quality Authority is currently installed at device 600, and notification 690 indicates that the potential exposure events were shared with the California Public Air Quality Authority.

FIG. 6W depicts device 600 displaying authority details interface 691, which is similar to interface 646 and is displayed in response to input 962 on exposure logging notification 690. Authority details interface 691 provides details associated with the California Public Air Quality Authority, including selectable option 691-1 to launch the application provided by the California Public Air Quality Authority.

Figure 6Y:
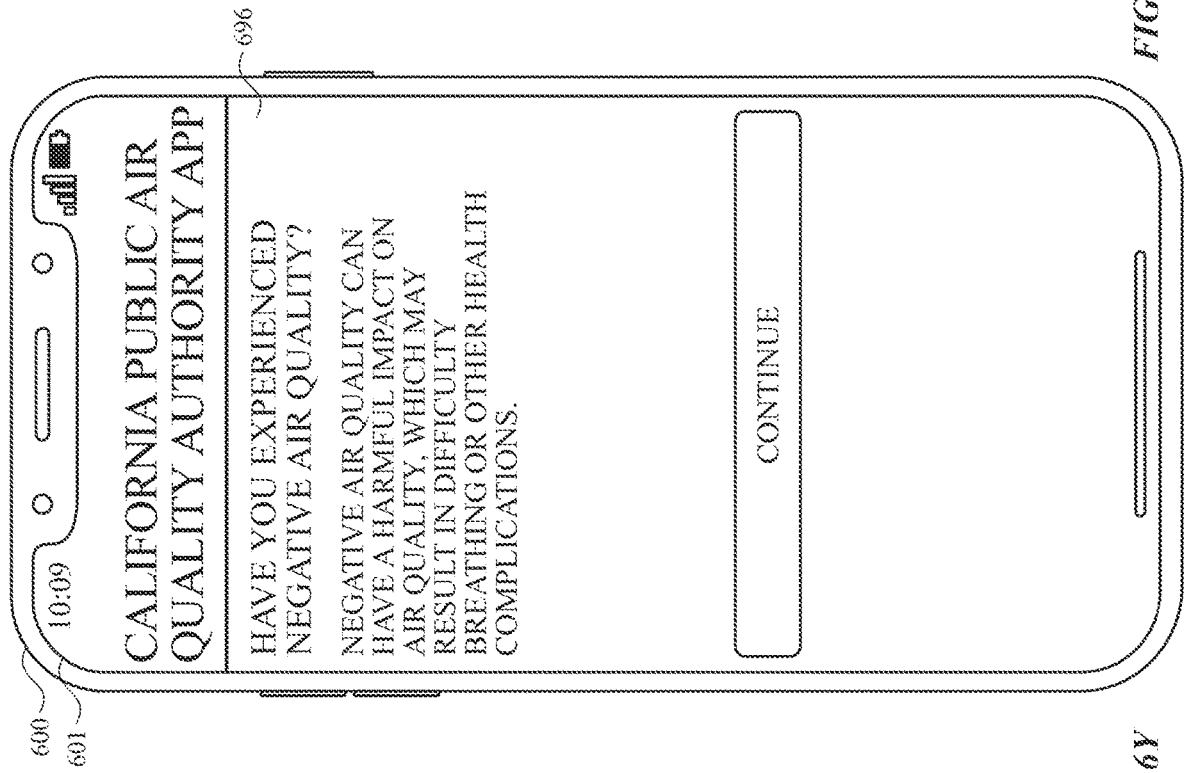

Referring now to FIG. 6X, device 600 is depicted displaying interface 693 of the application provided by the California Public Air Quality Authority. Interface 693 is displayed in response to input 694 on selectable option 691-1 of authority details interface 691 in FIG. 6W. Interface 693 permits the user to notify others of the user's exposure to negative air quality by selecting notify option 693-1 (e.g., via input 693-2). In response to the selection of notify option 693-1, device 600 displays confirmation interface 695, shown in FIG. 6Y, prompting a user to confirm whether they wish to share data with the California Public Air Quality Authority in order to notify others of the user's exposure to negative air quality.

Figure 6Z:
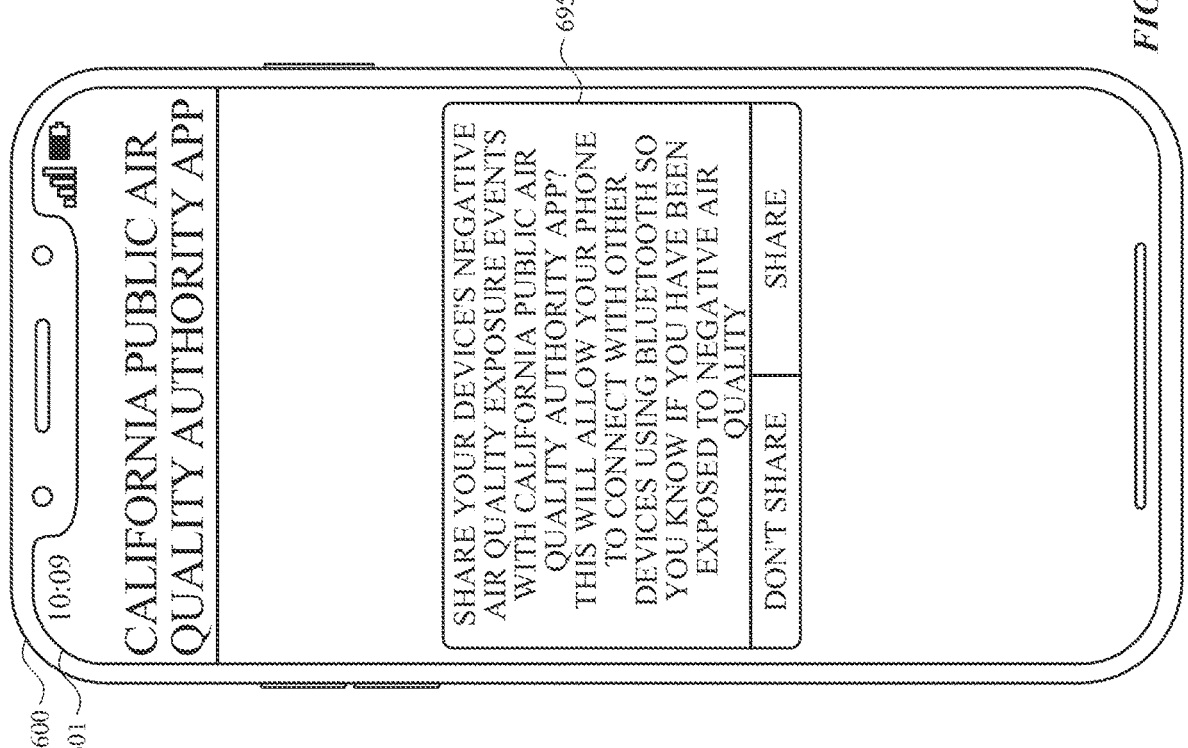
Figure 6A:
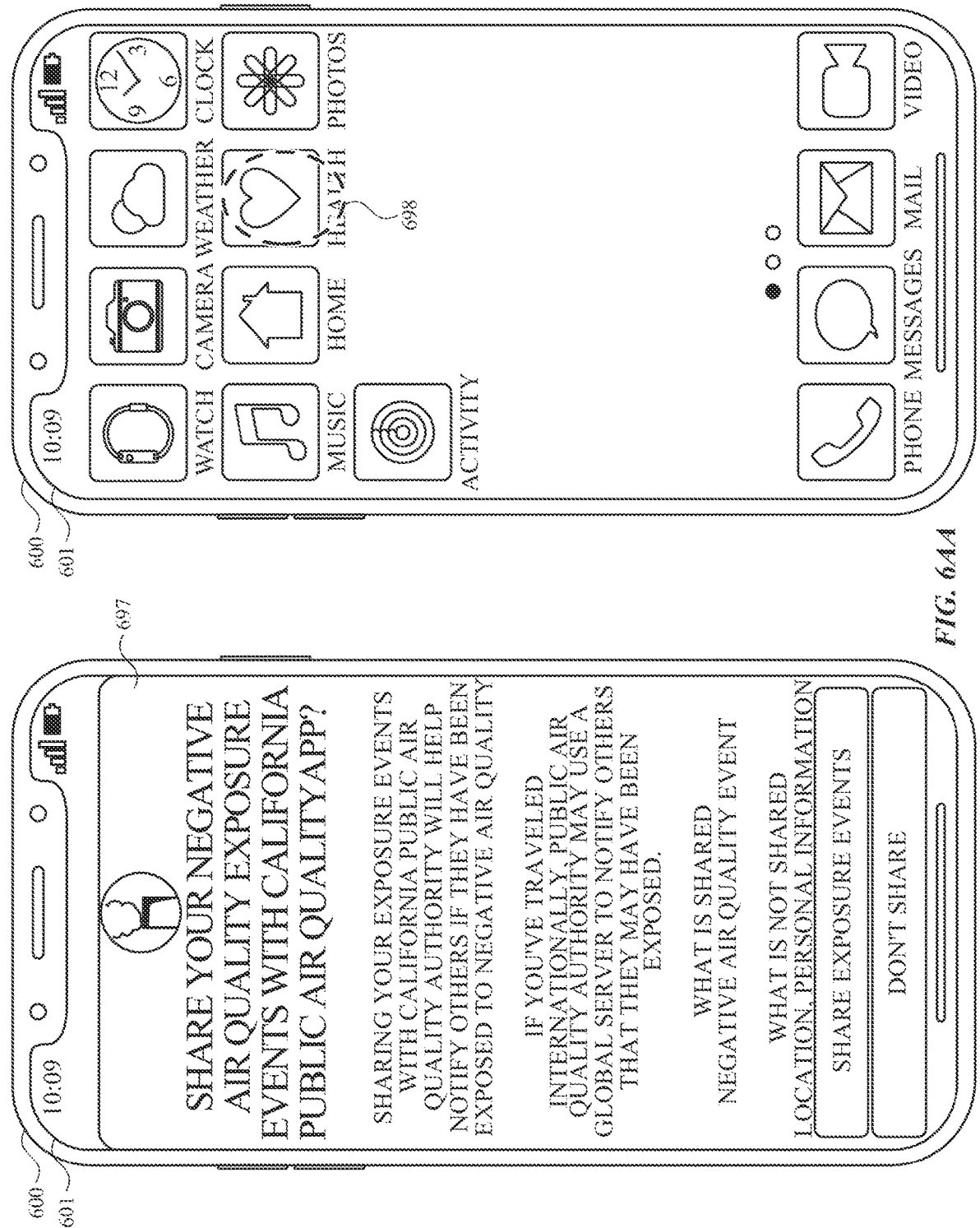
Figure 6A:
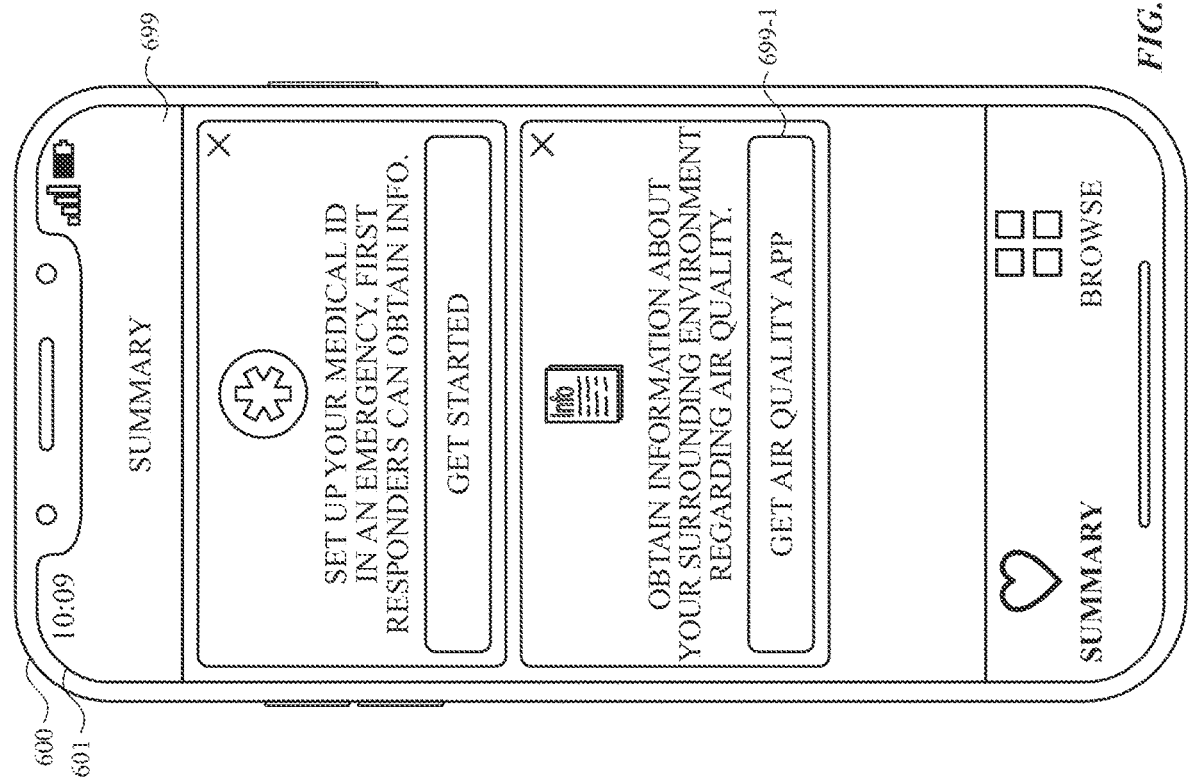
Figure 6A:
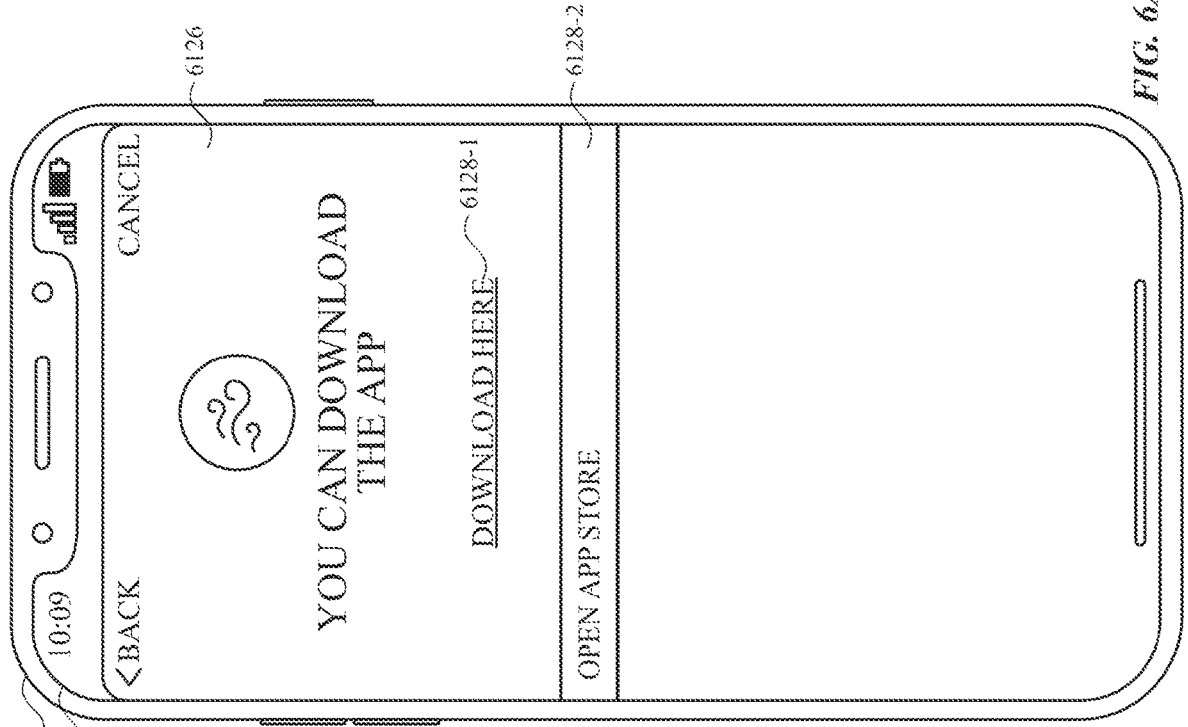
Figure 6A:
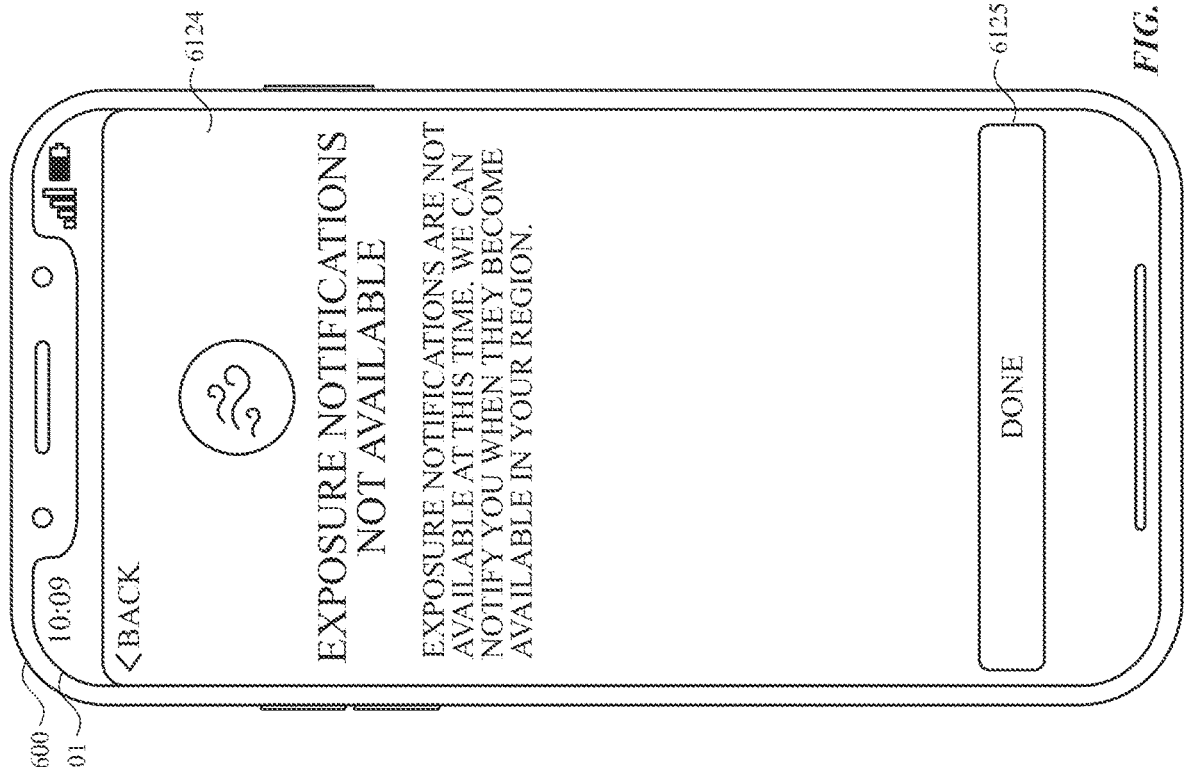
Figure 6A:
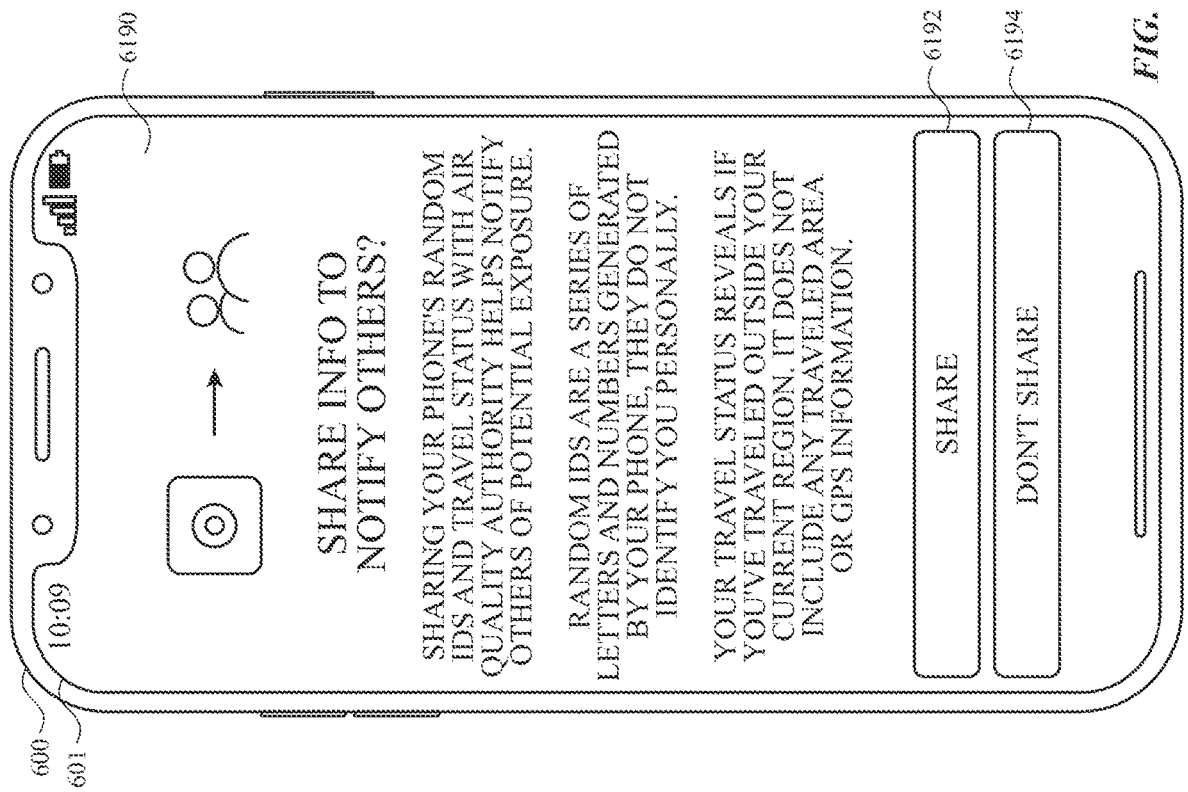
Figure 6A:
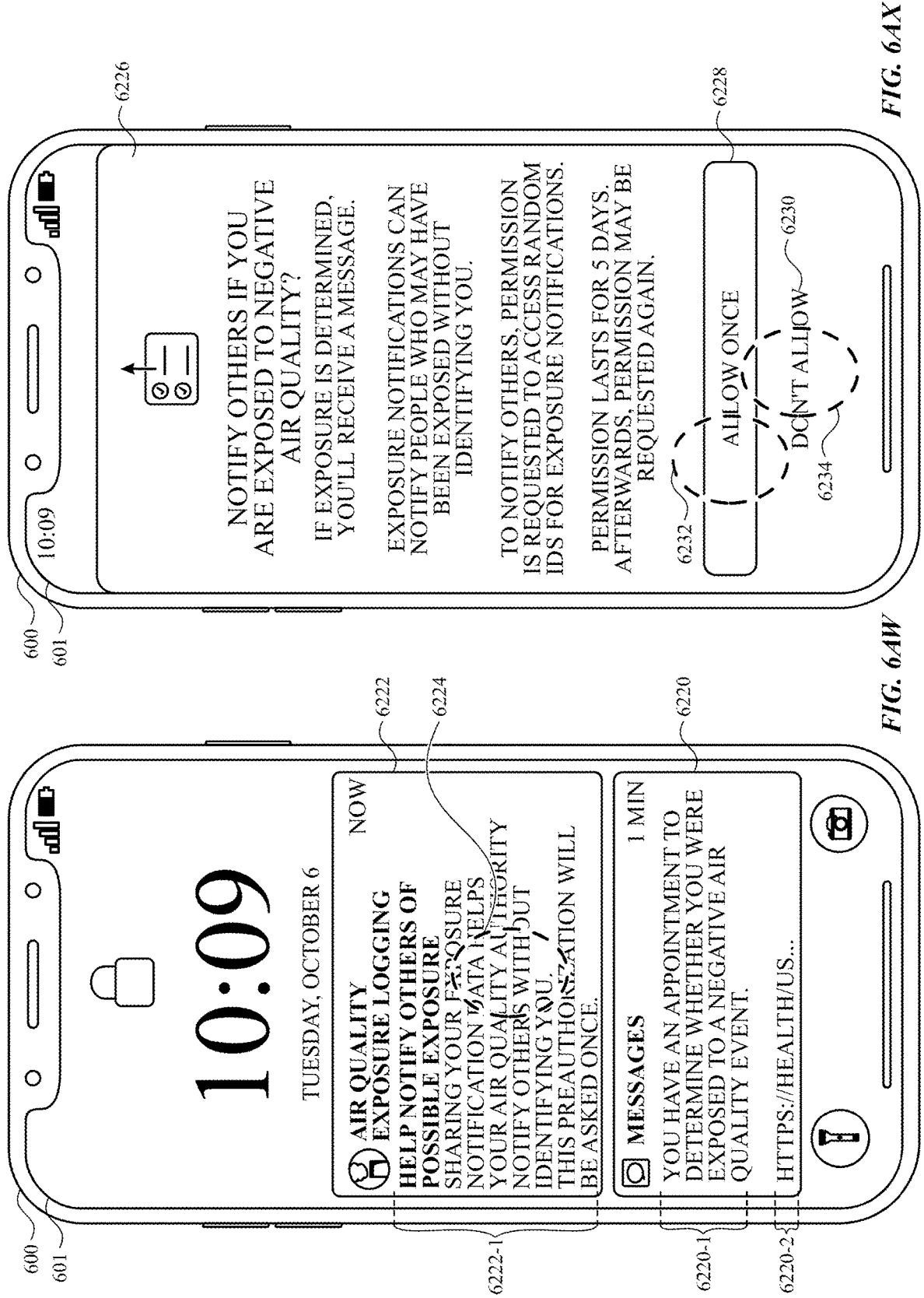
Figure 6A:
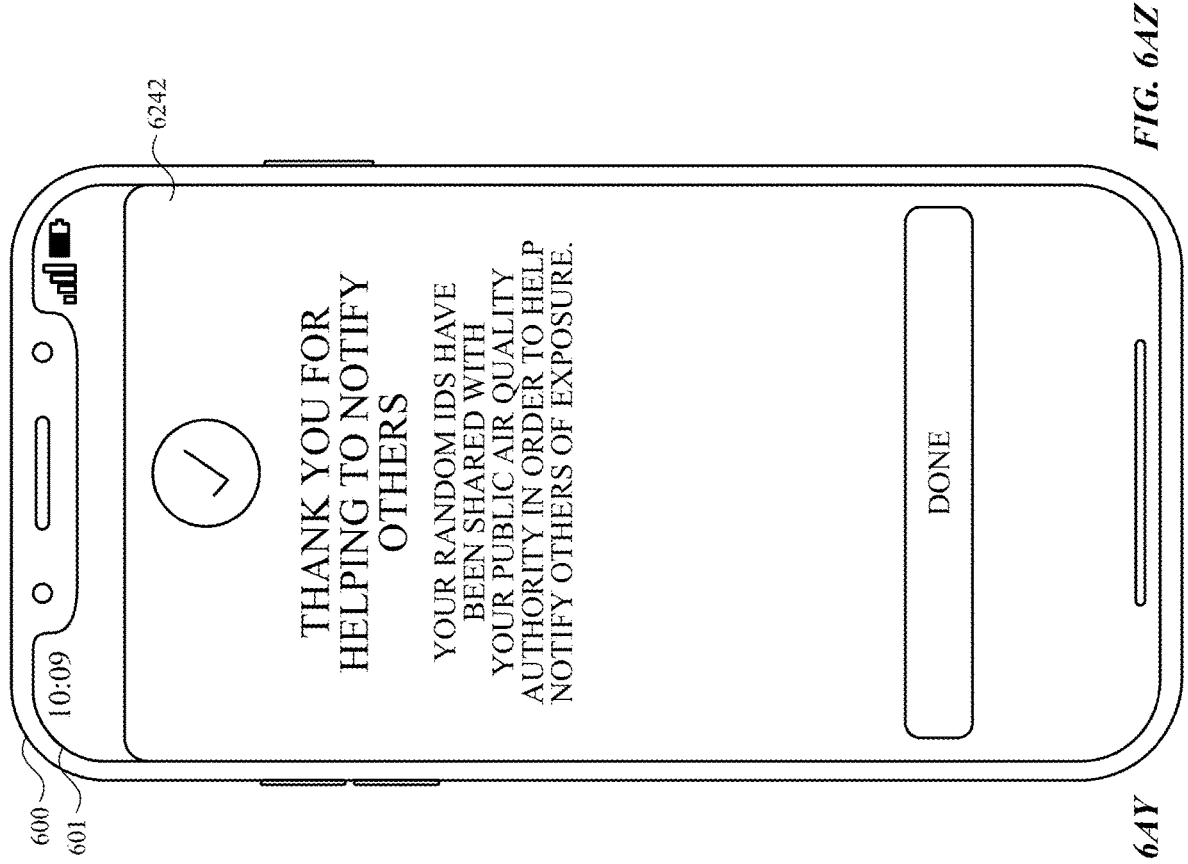
Figure 6A:
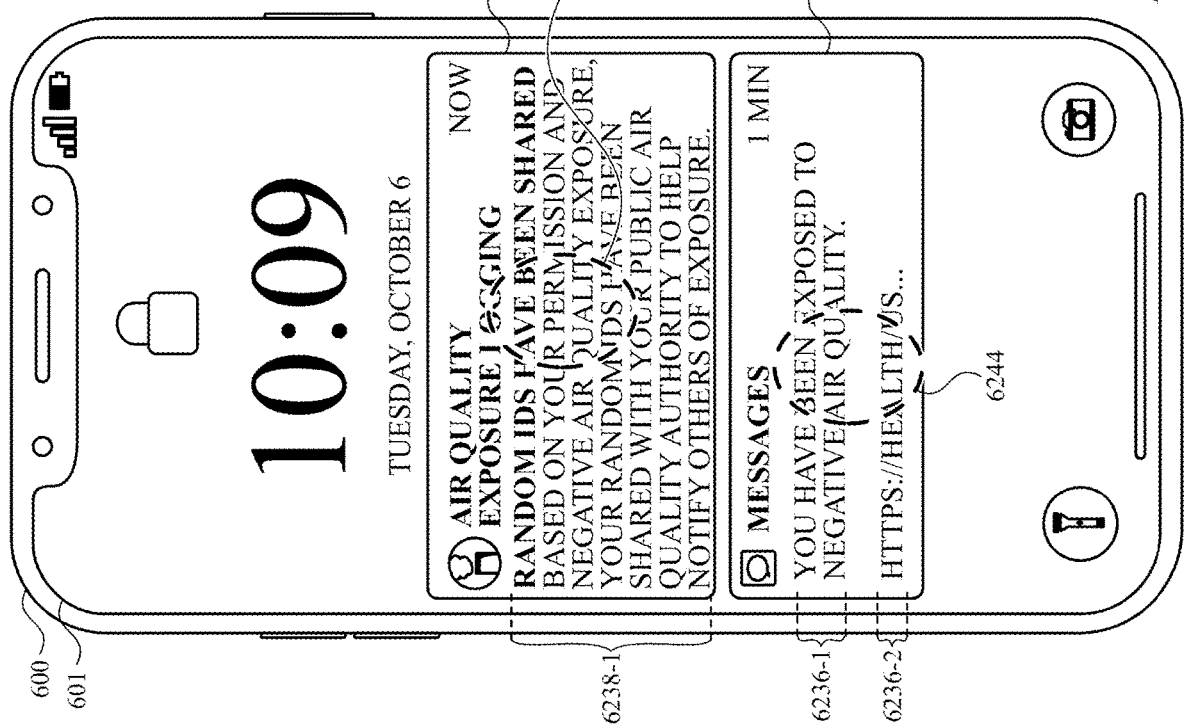

Referring now to FIG. 6Z, device 600 is depicted displaying interface 696 of the application provided by the California Public Air Quality Authority. Interface 696 is displayed in response to input 623 on share event option 624 of exposure notifications settings interface 624 in FIG. 6F, and permits the user to share the occurrence of their exposure to a negative air quality event.

In FIG. 6AA, device 600 displays confirmation interface 697, which can be a pop-up interface displayed by the operating system of device 600 (e.g., not by the application provided by the California Public Air Quality Authority). The confirmation interface 697 notifies the user that the user's travel history can be shared with other public air quality authorities, including the California Public Air Quality Authority.

FIGS. 6AB and 6AC show user interfaces for downloading an application associated with a public air quality authority (e.g., the California Public Air Quality Authority) in a health application of device 600. For example, in FIG. 6AB, device 600 detects input 698 and, in FIG. 6AC, displays health application interface 699. Health application interface 699 includes selectable option 699-1, which can be selected to download the application provided by the public air quality authority.

FIGS. 6AD-6AR depict example user interfaces for enabling exposure notifications after initially electing not to enable exposure notifications.

FIG. 6AD depicts device 600 displaying user interface 6100, which is a view of a settings interface for exposure notifications that is accessed while notifications are currently not enabled (e.g., after receiving input 609 in FIG. 6B, which corresponds to an election not to enable exposure notifications at the moment represented in FIG. 6B).

In FIG. 6AD, location services are currently not enabled for device 600, meaning device 600 is not configured to share its location, for example, with a server. Additionally, a third-party application as discussed above, such as an application provided by the California Public Air Quality Authority or other public air quality authority, is not downloaded to device 600. User interface 6100 is similar to interface 625 in, for example, FIG. 6F, except that there is no active region indicated because one has not been selected. Additionally, because location services are currently turned off, a current location of device 600 is not known and/or not currently available for use with at least some features, and no region is therefore provided for interface 6100.

In FIG. 6AD, device 600 detects input 6102 on option 6104 for turning on exposure notifications. In response to input 6102, device 600 displays interface 6106 in FIG. 6AE. Interface 6106 is displayed, in some embodiments, for enabling exposure notifications for device 600. In some embodiments, interface 6106 is displayed in response to an input on a notification, such as notification 602 in FIG. 6A, when location services are disabled. In some embodiments, interface 606 in FIG. 6B is displayed in response to the input on notification 602 when the current location of device 600 is known (e.g., location services are enabled).

In some embodiments, interface 6106 in FIG. 6AE is optionally displayed. For example, in some embodiments, interface 6106 is not displayed in response to input on option 6104 to enable exposure notifications, and device 600 instead displays interface 6112 to select a current location.

In FIG. 6AE, device 600 detects input 6108 on option 6110 to continue the process for enabling exposure notifications for device 600 and, in response, displays one or more interfaces as described below.

When location services are disabled for device 600, device 600 displays interface 6112, which provides listing 6114 of various jurisdictions or regions (e.g., countries) that may be selected to indicate a current country location associated with device 600. In FIG. 6AF, device 600 detects input 6116 on option 6114-1, which represents a selection of the United States as the country in which device 600 is located.

In response to input 6116, device 600 displays interface 6118, as shown in FIG. 6AG, which provides listing 6120 of various states (also referred to herein as regions) that may be selected to indicate a specific state location associated with device 600. In FIG. 6AG, device 600 detects input 6122 on option 6120-1, which represents a selection of the state of California as the state in which device 600 is located.

Interfaces 6112 and 6118 shown in FIGS. 6AF and 6AG, respectively, are displayed (e.g., when a location of device 600 is unknown) so that a user of device 600 can assign a current location to device 600. When a location is currently assigned to device 600 (e.g., location services are enabled), or the location of device 600 is otherwise known, device 600 optionally skips interfaces 6112 and 6118 in the process of enabling exposure notifications. In such embodiments, the interfaces in FIG. 6AH, 6AI, or 6AJ are instead shown, as appropriate, and as discussed below.

FIGS. 6AH-6AJ illustrate different user interfaces that are displayed depending on the current jurisdiction associated with the location of device 600 (e.g., the state/region selected in FIGS. 6AF and 6AG), and other criteria such as, for example, rules or criteria that are associated with the jurisdiction and the availability of an application for determining exposure criteria for the jurisdiction.

Referring to FIG. 6AH, for example, if the selected jurisdiction does not support exposure notifications (e.g., the selected region has not developed an application or criteria to determine exposure), device 600 displays interface 6124, which indicates that exposure notifications are not available for the selected region (e.g., California). Interface 6124 includes a notice that device 600 will notify a user of the device when exposure notifications are available for the selected region. The option to enable such future notification is initiated, in some embodiments, in response to selection of done affordance 6125.

In some embodiments, when a location of device 600 is known (e.g., location services are enabled) and exposure notifications are not available for the current location, device 600 displays interface 6124 in FIG. 6AH in response to detecting an input on option 6104. In some embodiments, option 6104 is not available for selection when exposure notifications are not available for the current location.

Referring to FIG. 6AI, if exposure notifications are supported by the selected region, but the region requires download of an application associated with the region's public air quality authority to enable the notifications (similar to the above disclosure regarding FIGS. 6A-6AC), device 600 displays interface 6126 shown in FIG. 6AI. Interface 6126 includes a prompt to download the application, and options 6128-1 and 6128-2 that can be selected to download the application and/or view the application in a separate interface (e.g., an application store interface) from which the application can be downloaded.

In some embodiments, when a location of device 600 is known (e.g., location services are enabled) and an application is required for download to support exposure notifications by the public air quality authority associated with the current location of device 600, device 600 displays interface 6126 in FIG. 6AI in response to detecting an input on option 6104.

Referring to FIG. 6AJ, if exposure notifications are supported by the selected region, and the region does not require download of an application to enable the notifications, device 600 displays interface 6130 shown in FIG. 6AJ. Interface 6130 is an interface for providing consent to enable exposure notifications for the jurisdiction (e.g., California) selected in FIG. 6AG without requiring the user to download the application provided by the selected jurisdiction. In some embodiments, interface 6130 is similar to interface 614 in FIG. 6D. In some embodiments, interface 6130 is not provided by a third party such as the public air quality authority, but instead, by the operating system of device 600.

In some embodiments, when a location of device 600 is known (e.g., location services are enabled) and the jurisdiction associated with the location supports exposure notifications without requiring download of an application associated with the public air quality authority of the jurisdiction, device 600 enables exposure notifications in response to detecting an input on option 6104. In such embodiments, device 600 displays interface 6130 in FIG. 6AJ in response to the input on option 6104.

In FIG. 6AJ, device 600 detects input 6132 on option 6134 to consent to enabling exposure notifications for the selected region (e.g., California). In response to detecting input 6132, device 600 enables display of exposure notifications and displays interface 6136 in FIG. 6AK, which provides a user of device 600 with an option to automatically notify others if the user experiences an exposure event. Interface 6136 includes option 6138, which is selectable to allow device 600 to automatically share an exposure event with the public air quality authority associated with the selected jurisdiction (e.g., the California Public Air Quality Authority), without requiring further input from a user of device 600. Interface 6136 also includes option 6139, which is selectable to disable device 600 from automatically sharing an exposure event with the public air quality authority associated with the selected jurisdiction. In FIG. 6AK, device 600 detects input 6140 on option 6138, which grants device 600 permission for a one-time sharing of an exposure event with the California Public Air Quality Authority.

Referring now to FIG. 6AL, device 600 displays interface 6142. In some embodiments, interface 6142 is displayed in response to input 6140. Interface 6142 includes various options and settings associated with the public air quality authority for the currently selected region. In FIG. 6AL, interface 6142 includes option 6144 indicating whether the application associated with the California Public Air Quality Authority is used to enable the exposure notifications. In FIG. 6AL, option 6144 is turned off because the application is not installed or downloaded. In some embodiments, option 6144 is turned on when the application is installed and being used to enable the exposure notifications. In some embodiments option 6144 can be turned off, even if the application is installed and/or downloaded at device 600. In such embodiments, the application is installed/downloaded, but the exposure notifications are enabled without using the application.

Interface 6142 further includes option 6146, which is turned on and enables device 600 to automatically share information (e.g., travel information) with the California Public Air Quality Authority.

Interface 6142 further includes option 6148, which is turned on and enables device 600 to automatically notify others (e.g., through the sharing of information with other devices) of an exposure event experienced by a user of device 600. Option 6148 is shown turned on in FIG. 6AL, because the feature was enabled in response to input 6140 on option 6138 in interface 6136. However, if option 6139 was selected in FIG. 6AK, then option 6148 would be turned off in FIG. 6AL.

Referring now to FIG. 6AM, device 600 displays interface 6150, which is an interface that is displayed in response to a request to share an exposure to an air quality event. For example, interface 6150 in FIG. 6AM is displayed in response to input 6152 on option 6154 in interface 6100 of FIG. 6AD. In some embodiments, interface 6150 can be displayed in response to an input on option 624 of FIG. 6F.

In FIG. 6AM, device 600 detects input 6156 on option 6158 and, in response, displays interface 6160 in FIG. 6AN, which is a verification interface for verifying an identity of the user of device 600. In FIG. 6AN, device 600 receives verification code 6162. The verification code can be provided to a user of device 600 through a third party to verify the user's identity, thereby ensuring the exposure event is correctly attributed to the user. In some embodiments, the verification code is provided to the user from the public air quality authority via, for example, a web portal associated with the public air quality authority or a text message from the public air quality authority.

In FIG. 6AN, device 600 detects input 6164 on option 6166 and, in response, displays interface 6168 in FIG. 6AO.

Interface 6168 includes listing 6170 of various conditions or symptoms that are associated with a negative air quality event. The conditions are provided by the public air quality authority and, therefore, are specific to the current jurisdiction. Thus, the conditions can vary depending on which jurisdiction is active for enabling exposure notifications. Interface 6168 also includes option 6172 which can be selected to indicate a date upon which the user first experienced the conditions or symptoms. Interface 6168 also includes option 6174 which can be selected to indicate that the user has not yet experienced any negative air quality conditions or symptoms.

In FIG. 6AO, option 6174 is selected and device 600 detects input 6176 on option 6178 and, in response, displays interface 6180 as shown in FIG. 6AP. Interface 6180 includes option 6182, which can be selected to enable device 600 to share the user's travel history with the public air quality authority. Interface 6180 also includes option 6184, which can be selected to forgo sharing the user's travel history. In some embodiments, when option 6182 is selected, option 6146 is turned on in interface 6142 of FIG. 6AL. In some embodiments, when option 6184 is selected, option 6146 is turned off in interface 6142 of FIG. 6AL.

Referring now to FIG. 6AQ, device 600 displays notification 6186 indicating that a user of device 600 has experienced an exposure event. In the embodiment illustrated in FIG. 6AQ, device 600 will automatically notify others (e.g., devices of other users that meet certain criteria set by the public air quality authority as discussed above) of the user's exposure, unless device 600 receives input to disable the automatic notification within a predetermined period of time such as, for example, 24 hours. In the embodiment illustrated in FIG. 6AQ, the automatic notification of the user's exposure to an air quality event is enabled in response to input 6140 on option 6138 in interface 6136 of FIG. 6AK.

In FIG. 6AQ, device 600 detects input 6188 on notification 6186 and, in response, displays interface 6190, as depicted in FIG. 6AR. Interface 6190 includes option 6192, which can be selected to immediately share the user's exposure to the air quality event. Interface 6190 includes option 6194, which can be selected to prevent device 600 from sharing the user's exposure to the air quality event.

FIGS. 6AS-6BD depict example user interfaces for authorizing device 600 to share data with a public air quality authority (e.g., in order to notify others of the occurrence of the user's exposure to a negative air quality event) without having to use, download, and/or install an application provided by the public air quality authority. In some embodiments, when device 600 reports the user's exposure to a negative air quality event, device 600 shares with the public air quality authority a random identification key that is associated with device 600 so that the user of device 600 is not identified to the public air quality authority. In some embodiments, the public air quality authority notifies other users of devices similar to device 600 (e.g., using exposure notifications as discussed herein) who have met certain criteria such as being within a predetermined distance of device 600 for at least a predetermined amount of time while the user of device 600 has experienced symptoms from the exposure to the negative air quality event. In the embodiments illustrated in FIG. 6AS-6BD, the application associated with the public air quality authority is not downloaded or installed at device 600.

In FIG. 6AS, a user of device 600 has not enabled automatic sharing of data (e.g., sharing of a positive exposure to negative air quality with others), and device 600 displays interface 6200, which shows a web portal or website associated with a testing authority (e.g., a party who conducts tests to determine whether the user has been exposed to a negative air quality event). In some embodiments, interface 6200 is associated with a process for scheduling an appointment to determine possible exposure to a negative air quality event. Interface 6200 prompts the user to preauthorize the future sharing of data with a public air quality authority and/or other users of devices similar to device 600 who may have been exposed, for example, if the user of device 600 is later determined to have been exposed to a negative air quality event. Interface 6200 includes option 6202, which is selectable to initiate a process for preauthorizing the future sharing of data with the public air quality authority. In some embodiments, a link or other graphical object similar to option 6202 is displayed in an email or text message from the testing authority and is selectable to initiate the process described with respect to option 6202. In some embodiments, interface 6200 can include content that prompts the user to enable exposure notifications at device 600. In some embodiments, exposure notifications can be enabled at device 600 as a part of the process for preauthorizing the future sharing of data with the public air quality authority.

In response to detecting input 6204 on option 6202, device 600 displays interface 6206, as shown in FIG. 6AT. Interface 6206 provides a user of device 600 with an option to preauthorize device 600 to automatically share data to notify others of the user's exposure to a negative air quality event (e.g., when the exposure is later determined by the testing authority). Interface 6206 includes option 6208, which is selectable to preauthorize device 600 to automatically share data with the public air quality authority to report the user's exposure to a negative air quality event, without requiring further input from the user of device 600. In FIG. 6AT, device 600 detects input 6212 on option 6208, which temporarily grants device 600 permission to automatically share data with the public air quality authority to report the user's exposure to a negative air quality event, whenever that exposure is later determined. In some embodiments, selected option 6208 grants device 600 permission for a period of five days to report exposure and, once the five day period lapses, permission expires. In some embodiments, the period is for longer or shorter than five days or permission is permanent, until revoked. Interface 6206 also includes option 6210, which is selectable to stop device 600 from automatically sharing data with the public air quality authority. Therefore, device 600 would not automatically report the user's exposure to a negative air quality event.

In some embodiments, device 600 sets up automatic reporting of positive exposures in response to input 6204 in FIG. 6AS. In some embodiments, device 600 does not display interface 6200 if device 600 is already preauthorized to share data regarding exposures with the public air quality authority and/or other users of devices similar to device 600. In such embodiments, device 600 enables automatic exposure notifications without displaying interfaces 6200 or 6206.

In the embodiment illustrated in FIG. 6AU, device 600 displays interface 6214, which is an interface in the settings application that is specific to exposure notification settings. Interface 6214 includes option 6216, which is selectable to enable device 600 to share data with the public air quality authority. As shown in FIG. 6AU, option 6216 is enabled, meaning device 600 is authorized to share data with the public air quality authority (e.g., to report the user's exposure to a negative air quality event). In some embodiments, device 600 displays interface 6214 (e.g., with option 6212 enabled) in response to detecting input 6212 on option 6208. In some embodiments, device 600 displays interface 6214 (e.g., with option 6212 enabled) in response to detecting input 6204 on option 6202 (e.g., if device 600 is preauthorized to share data with the public air quality authority and/or other users of devices similar to device 600). In some embodiments, interface 6214 can be accessed from settings menu 630 (e.g., by selecting exposure notifications option 632). In some embodiments, device 600 displays interface 6214 (e.g., with option 6212 enabled) in response to detecting an input that authorizes device 600 to share data with the public air quality authority, such as an input on a notification as discussed in greater detail below. In some embodiments, interface 6214 is similar to interface 6142 in FIG. 6AL.

FIGS. 6AV-6BD illustrate different user interfaces that are displayed at device 600 after a text message is received at device 600. In some embodiments, device 600 displays various notifications depending on whether the text message contains (or is accompanied by) data that can be used to validate the text message as being associated with the testing authority.

In the embodiment depicted in FIG. 6AV, exposure notifications are enabled and device 600 is not authorized (e.g., not preauthorized) to share data with the public air quality authority and/or other users of devices similar to device 600. For example, option 6210 was selected in interface 6206 of FIG. 6AT. Device 600 receives a text message and displays text message notification 6218, which includes content 6218-1 of the text message (e.g., displayed text), but does not include additional data, such as a link or validation code, that can be used to validate whether the text message is associated with the testing authority. Accordingly, device 600 displays text message notification 6218 without displaying an additional notification that confirms the validity of the text message as being associated with the testing authority. In some embodiments, device 600 displays the text message notification without the additional notification that confirms validity of the text message if the text message contains invalid data for validating (or no data for validating) the text message as being associated with the testing authority.

In the embodiment depicted in FIG. 6AW, exposure notifications are enabled and device 600 is not authorized (e.g., not preauthorized) to share data with the public air quality authority and/or other users of devices similar to device 600 (e.g., option 6210 was selected in interface 6206 of FIG. 6AT). Device 600 receives a text message from (or on behalf of) the testing authority to inform the user of device 600 that they have an upcoming appointment to determine whether they have been exposed to a negative air quality event. The text message also contains data that is used to validate whether the text message is associated with the testing authority. In response to receiving the text message, device 600 displays text message notification 6220, which includes content 6220-1 of the text message and data 6220-2. Data 6220-2 represents the data that is received with the text message and is used by device 600 to validate whether the received text message is associated with the testing authority. In some embodiments, the data includes a link (e.g., hyperlink, URL), a hash code, an authentication code, a QR code, an encryption code, a public key of a public/private key pair, or the like, and is used by device 600 to verify that the text message is associated with the testing authority. In some embodiments, the text message is associated with the testing authority when the text message is sent from, or on behalf of, the testing authority. Text message notification 6220 is selectable to display the text message in a message application, as discussed in greater detail below.

In response to validating the text message, device 600 displays a notification that indicates to the user that the data included with the text message is valid and prompts the user to take action based on knowledge that the link is valid. For example, in the embodiment depicted in FIG. 6AW, device 600 displays preauthorization notification 6222 in response to validating the text message informing the user of the upcoming appointment. Thus, by displaying preauthorization notification 6222 (e.g., with text message notification 6220), device 600 is confirming to the user of device 600 that the text message is associated with the testing authority. Preauthorization notification 6222, prompts the user to take action based on the expectation that the user will receive results from the upcoming appointment. Specifically, device 600 displays preauthorization notification 6222 with text 6222-1 prompting the user of device 600 to preauthorize device 600 to share data with the public air quality authority, as discussed above. If the user preauthorizes device 600, device 600 will automatically share data with the public air quality authority and/or other users of devices similar to device 600 to report the user's exposure to a negative air quality event (e.g., if the results of the appointment determine that the user was exposed). In some embodiments, text message notification 6220 and preauthorization notification 6222 are displayed concurrently as separate parts of a single notification (or as a single notification event).

In FIG. 6AW, device 600 detects input 6224 on preauthorization notification 6222 and, in response, displays interface 6226 (similar to interface 6206 in FIG. 6AT). In some embodiments, device 600 marks the text message as being read in response to an input on preauthorization notification 6222. Interface 6226 provides a user of device 600 with an option to preauthorize device 600 to automatically share data to notify the public air quality authority and/or other users of devices similar to device 600 of the user's exposure to a negative air quality event (e.g., when the exposure is later determined by the testing authority). Interface 6226 includes option 6228 (similar to option 6208), which is selectable to preauthorize device 600 to automatically share data with the public air quality authority and/or other users of devices similar to device 600 to report the user's exposure to a negative air quality event, without requiring further input from the user of device 600 and without requiring use of an application associated with (e.g., provided by) the public air quality authority. Interface 6226 also includes option 6230 (similar to option 6210), which is selectable to stop device 600 from automatically sharing data with the public air quality authority and/or other users of devices similar to device 600 (e.g., disable the feature of automatically sharing data). In response to input 6232 on option 6228 in FIG. 6AX, device 600 is temporarily allowed to automatically share data with the public air quality authority and/or other users of devices similar to device 600 (e.g., without requiring that a user download and use an application associated with the public air quality authority) to report the user's exposure to a negative air quality event, whenever that exposure is later determined. In response to input 6234 on option 6230, the automatic sharing option of device 600 is not enabled (or is disabled) to share data with the public air quality authority. In some embodiments, in response to detecting input 6232, device 600 displays interface 6214 with option 6216 enabled.

FIG. 6AY depicts an embodiment in which device 600 is preauthorized to share data with the public air quality authority and/or other users of devices similar to device 600. For example, device 600 detected input 6232 on option 6228 in FIG. 6AX. Device 600 receives a text message from the testing authority reporting that the user was determined to have been exposed to a negative air quality event and including data for validating the authenticity of the text message (e.g., validating the text message as being associated with the testing authority). In response to receiving the text message, device 600 displays text message notification 6236, which includes content 6236-1 and data 6236-2. In response to validating the text message (e.g., using data 6236-2), and because device 600 is preauthorized to share data with the public air quality authority and/or other users of devices similar to device 600, device 600 displays confirmation notification 6238, which includes text 6238-1 informing the user that device 600 has shared (or will share) data with the public air quality authority to notify the public air quality authority and/or other users of devices similar to device 600 of the user's exposure to a negative air quality event. In some embodiments, text message notification 6236 and confirmation notification 6238 are displayed concurrently as separate parts of a single notification (or as a single notification event).

In response to detecting input 6240 on notification 6238, device 600 displays interface 6242, as depicted in FIG. 6AZ. In some embodiments, device 600 marks the text message as read in response to input 6240. In response to detecting input 6244 on text message notification 6236, device 600 displays messages application interface 6246, which, as depicted in FIG. 6BA, includes text message 6248, which is an expanded version of text message notification 6236. Text message 6248 includes text message content 6236-1 and additional details of the data used to validate the text message. For example, data 6236-2 includes URL 6248-1 that can be used to validate the authenticity of the text message as being associated with the testing authority. In some embodiments, device 600 validates text message 6248 by verifying that URL 6248-1 is a valid link to a website associated with the testing authority. In some embodiments, data 6236-2 includes a numeric code, such as code 6248-2, depicted in FIG. 6BA. In some embodiments, code 6248-2 is a public key of a public/private key pair, and device 600 validates text message 6248 using public key authentication.

In some embodiments, device 600 receives and displays a subsequent text message from the public air quality authority confirming the public air quality authority's receipt of the data reporting the user's exposure to a negative air quality event.

FIG. 6BB depicts an embodiment in which device 600 is not preauthorized to share data with the public air quality authority and/or other users of devices similar to device 600. For example, device 600 detected input 6234 on option 6230 in FIG. 6AX. Device 600 receives a text message from the testing authority reporting that the user was determined to have been exposed to a negative air quality event and including data for validating the authenticity of the text message (e.g., validating the text message as being associated with the testing authority). In response to receiving the text message, device 600 displays text message notification 6250, which includes content 6250-1 and data 6250-2. In response to validating the text message (e.g., using data 6250-2), and because device 600 is not preauthorized to share data with the public air quality authority, device 600 displays authorization notification 6252, which includes text 6252-1 prompting the user to authorize (e.g., enable) device 600 to share data with the public air quality authority to notify the public air quality authority that the user was determined to have been exposed to a negative air quality event. In some embodiments, text message notification 6250 and authorization notification 6252 are displayed concurrently as separate parts of a single notification (or as a single notification event).

In response to detecting input 6254 on text message notification 6254, device 600 displays interface 6256 (similar to interface 6246), which includes an expanded version 6258 of text message notification 6250, which, as depicted in FIG. 6BC, includes URL 6258-1 and code 6258-2. In response to detecting input 6260 on authorization notification 6252, device 600 displays interface 6262, as depicted in FIG. 6BD. Interface 6262 includes option 6264, which is selectable to authorize (e.g., enable) device 600 to immediately share data with the public air quality authority to notify the public air quality authority that the user was determined to have been exposed to a negative air quality event. Interface 6262 also includes option 6266, which is selectable to decline authorizing device 600 to share data with the public air quality authority. In some embodiments, device 600 marks the text message as read in response to input 6260.

In FIG. 6BD, device 600 detects input 6268 on option 6264 and, in response, authorizes device 600 to immediately share data with the public air quality authority to notify the public air quality authority that the user was determined to have been exposed to a negative air quality event. In some embodiments, device 600 displays interface 6214 shown in FIG. 6AU (e.g., with option 6216 enabled) in response to detecting input 6268. In some embodiments, in response to detecting input 6268, device 600 displays an interface similar to interface 6168 shown in FIG. 6AO for providing additional details concerning the negative air quality exposure event.

In some embodiments, device 600 receives and displays a subsequent text message from the public air quality authority confirming the public air quality authority's receipt of the data reporting the user's exposure to a negative air quality event.

FIG. 7 is a flow diagram illustrating a method for managing exposure notifications using an electronic device in accordance with some embodiments. Method 700 is performed at a computer system (e.g., 100, 300, 500, 600) that is in communication with a display generation component (e.g., display 601) (e.g., a display controller, a touch-sensitive display system) and one or more input devices (e.g., a touch-sensitive surface of display 601). Some operations in method 700 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for managing exposure notifications. The method reduces the cognitive burden on a user for managing exposure notifications, thereby creating a more efficient human-machine interface. For battery-operated computing devices, enabling a user to manage exposure notifications faster and more efficiently conserves power and increases the time between battery charges.

In method 700, after completion of a process in which one or more notifications (e.g., exposure notifications (e.g., notifications based on exposure to one or more environmental conditions, devices, or individuals); notifications associated with a first application) are enabled for display (e.g., the process shown in FIGS. 6A-6E), the computer system (e.g., 600) displays (702), via the display generation component (e.g., 601), a first notification (e.g., 674; 680) (e.g., displaying an exposure notification (e.g., an alert, a haptic output, an audio output, a banner) that was received at the computer system) (e.g., a first notification associated with the first application). In some embodiments, the notification is associated with a third party (e.g., an entity or organization that is different from an entity or organization on whose behalf the computer system and/or an operating system of the computer system is developed). In some embodiments, the notification is received (directly or indirectly) from the third party (e.g., the third party or an application provided (e.g., developed) by the third party generates the notification and/or produces content of the notification). In some embodiments, notifications are generated and/or received in response to a determination that the computer system (or a user of the computer system) satisfies a set of criteria that is specific to a particular region or jurisdiction (e.g., a city, county, state, and/or country) or specific to an application associated with (e.g., provided by) the particular region or jurisdiction. For example, a notification can be generated and/or received in response to an event such as a determination that a user of the computer system is engaging in a particular activity for more than a predetermined amount of time.

In method 700, the computer system (e.g., 600) receives (704), via the one or more input devices (e.g., 601), an input (e.g., 676; 684) (e.g., user input) directed to the first notification (e.g., 674; 680).

At 706, in response to receiving the input (e.g., 676; 684) directed to the first notification (e.g., 674; 680) and in accordance with a determination that a first application (e.g., the California Public Air Quality Authority application) (e.g., a third party application; an application that is developed on behalf of an entity or organization that is different from an entity or organization on whose behalf the computer system and/or an operating system of the computer system is developed) associated with (e.g., the first application is launched in response to an input directed to the first notification) the first notification (e.g., 674; 680) is configured to execute on the computer system (e.g., the first application is downloaded and/or installed at the computer system), the computer system displays (708), via the display generation component (e.g., 601), a user interface (e.g., 685) of the first application (e.g., launching, opening, and/or executing the first application). Displaying a user interface of the first application in accordance with a determination that the first application associated with the first notification is configured to execute on the computer system provides feedback to a user of the computer system that the first application is available for providing details associated with the first notification and provides controls for accessing the first application to view the details without requiring the user to navigate away from the current user interface to access the first application. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the user interface for the first application includes details of an event associated with the notification.

At 706, in response to receiving the input (e.g., 676; 684) directed to the first notification (e.g., 674; 680) and in accordance with a determination that the first application (e.g., the California Public Air Quality Authority application) associated with the first notification (e.g., 674; 680) is not configured to execute on the computer system (e.g., 600) (e.g., the first application is not downloaded and/or installed at the computer system), the computer system displays (710), via the display generation component (e.g., 601), a user interface object (e.g., 678; 679) (e.g., a graphical or textual prompt; an affordance) associated with a process for configuring the first application for executing on the computer system (e.g., downloading and/or installing the first application). Displaying a user interface object associated with a process for configuring the first application for executing on the computer system in accordance with a determination that the first application associated with the first notification is not configured to execute on the computer system provides feedback to a user of the computer system that the first application is available for download and provides controls for configuring the first application for executing on the computer system without requiring the user to navigate away from the current user interface to initiate the process for configuring the first application for executing on the computer system. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the first application is not accessed, but rather, a prompt is displayed for downloading the first application. In some embodiments, the computer system initiates a process for downloading and/or installing the first application in response to an input directed to the user interface object (e.g., prompt).

In some embodiments, the first application (e.g., the California Public Air Quality Authority application) is determined (e.g., selected; identified) based on a current location associated with the computer system (e.g., 600) (e.g., the first application is associated with a same location as a current location of the computer system or a user of the computer system). In some embodiments, the first application is an application that is associated with a local authority such as a local health authority or a local environmental authority.

In some embodiments, displaying the first notification (e.g., 680) includes: in accordance with (e.g., in accordance with a determination that) the first application associated with the first notification (e.g., the California Public Air Quality Authority application) being configured to execute on the computer system (e.g., 600), displaying the first notification having one or more graphical objects (e.g., 682) (e.g., a badge, emblem, logo, trademark, slogan, or the like) representative of an entity associated with the first application. Displaying the first notification having one or more graphical objects representative of the entity associated with the first application, when the first application associated with the first notification is configured to execute on the computer system, provides feedback to a user that the first notification is sent on behalf of the entity associated with the first application. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the first notification (e.g., 674) includes: in accordance with (e.g., in accordance with a determination that) the first application associated with the first notification (e.g., the California Public Air Quality Authority application) not being configured to execute on the computer system (e.g., 600), displaying the first notification having the one or more graphical objects (e.g., 675) representative of the entity associated with the first application. Displaying the first notification having the one or more graphical objects representative of the entity associated with the first application, when the first application associated with the first notification is not configured to execute on the computer system, provides feedback to a user that the first notification is sent on behalf of the entity associated with the first application, even if the first application is not configured to execute on the computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the exposure notification is displayed having branding associated with the third party application, even if the third party application is not installed and/or downloaded at the computer system.

In some embodiments, displaying the first notification (e.g., 674; 680) includes displaying the first notification in response to a determination that a first set of criteria is met. In some embodiments, the first set of criteria is determined by a provider (e.g., developer) of the application (e.g., the California Public Air Quality Authority). Displaying the first notification in response to a determination that a first set of criteria determined by a provider of the application is met provides feedback to a user indicating that the set of criteria determined by the provider of the application has been satisfied. Providing improved feedback enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the system more quickly and efficiently. In some embodiments, the set of criteria includes a criterion that is based on a geographical location (e.g., a geographical location of a user of the computer system; a geographical location of the computer system). In some embodiments, the set of criteria includes a criterion that is based on a determination whether a user account associated with the computer system has consented to sharing data with an organization (e.g., a first entity; a second entity; a governmental organization; a jurisdiction)). In some embodiments, the set of criteria includes a criterion that is based on determining possible exposure to a specific environmental condition, contaminant, and/or biological agent. In some embodiments, the provider of the application is an entity (e.g., an entity on whose behalf the first application was developed (the entity is different from an entity on whose behalf the computer system was developed); a geographic-specific entity or notification source; an application; an external device; an account; an organization (e.g., a governmental organization and/or jurisdiction)) to which the computer system is configured to transmit data (e.g., data associated with the computer system; identification data; Bluetooth keys; device identifiers; location data) to enable the entity to provide the first notification.

In some embodiments, displaying the first notification (e.g., 674; 680) includes displaying the first notification in response to a determination that a second set of criteria is met (e.g., a set of criteria that is the same as the first set of criteria; a set of criteria that is different than the first set of criteria). In some embodiments, in accordance with the first application being a first respective application (e.g., an application provided by the California Public Air Quality Authority), the second set of criteria is a first respective set of criteria, and in accordance with the first application being a second respective application (e.g., an application provided by the Public Air Quality Authority of Nevada), different from the first respective application, the second set of criteria is a second respective set of criteria, different from the first respective set of criteria. Displaying the first notification in response to a determination that a second set of criteria is met, wherein the second set of criteria is a first respective set of criteria when the first application is a first respective application, and wherein the second set of criteria is a second respective set of criteria when the first application is a second respective application, provides feedback to a user indicating that the notification has been triggered based on different criteria that is varies based on the respective application that triggered the notification. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, different applications use different criteria to determine when to provide the first notification (e.g., 674; 680). For example, in some embodiments, a first application (e.g., an application provided by the California Public Air Quality Authority) dictates that the first notification is provided (e.g., by the application associated with the first entity (e.g., if the application is downloaded and/or installed); by the computer system (e.g., 600) (e.g., if the application is not downloaded and/or installed)) when the computer system or a user of the computer system is exposed to a set of conditions (e.g., poor air quality; proximity to a person with an infectious disease) for a predetermined amount of time (e.g., 10 minutes), and the second application (e.g., an application provided by the Public Air Quality Authority of Nevada) dictates that the first notification is provided (e.g., by the application associated with the second entity (e.g., if the application is downloaded and/or installed); by the computer system (e.g., if the application is not downloaded and/or installed)) when the computer system or a user of the computer system is exposed to the set of conditions for a different predetermined amount of time (e.g., 5 minutes). As another example, in some embodiments, a notification is triggered by (or on behalf of) the first application when a user of the computer system is exposed to a first event (e.g., exposure to wood being burned), and a notification is triggered by (or on behalf of) the second application when the user of the computer system is exposed to a different event (e.g., exposure to a polluting vehicle; exposure to a person with an infectious disease).

In some embodiments, the first application is associated with (e.g., developed by) a first entity (e.g., the California Public Air Quality Authority). In some embodiments, method 700 includes the computer system (e.g., 600) displaying (e.g., after completion of the process in which one or more notifications are enabled for display for the first entity), via the display generation component (e.g., 601), a setup notification (e.g., 602; 606; 610; 614; 620) (e.g., a notification indicating that exposure notifications are available (e.g., newly available; recently available) for a particular entity (a second entity)) for a second application (e.g., an application provided by the Public Air Quality Authority of Nevada) associated with a second entity different from the first entity, wherein the second application is different from the first application. Displaying a setup notification for a second application associated with a second entity different from the first entity, wherein the second application is different form the first application, provides feedback to a user that a different application is available from a different provider. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the setup notification is or includes an indication that an application associated with an entity (e.g., the second application associated with the second entity) is available to be downloaded and/or installed at the computer system. In some embodiments, the setup notification is displayed prior to completion of the process in which one or more notifications are enabled for display for the first entity.

In some embodiments, the method further includes the computer system (e.g., 600) receiving, via the one or more input devices (e.g., 601), an input (e.g., 604; 608; 612; 618; 622) directed to the setup notification (e.g., 602; 606; 610; 614; 620) for the second application. In response to receiving the input directed to the setup notification for the second application, the computer system initiates a process in which one or more notifications (e.g., 674; 680; 686; 690) are enabled for display on behalf of the second entity (e.g., the notifications can be displayed by the second application or by the computer system).

In some embodiments, the setup notification (e.g., 602) for the second application associated with the second entity is displayed in response to a determination that a current location associated with the computer system (e.g., 600) (e.g., a geographical location of the computer system, or a geographical location of a user of the computer system) corresponds to a location associated with the second entity and/or the second application (e.g., a geographical location that defines a boundary of the second entity). Displaying the setup notification for the second application associated with the second entity in response to a determination that a current location associated with the computer system corresponds to a location associated with the second entity and/or the second application provides feedback to a user indicating that a new application is available for the new location to which the has user traveled. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the setup notification is displayed when the computer system (e.g., the user of the computer system) travels to the jurisdiction of the second entity. For example, if the user travels from a first state to a second state, a setup notification is displayed for an application associated with the second state.

In some embodiments, a current location associated with the computer system (e.g., 600) corresponds to a location (e.g., California) associated with the second entity (e.g., the California Public Air Quality Authority) (e.g., the computer system or a user of the computer system is currently located within the geographical boundary of the second entity). In some embodiments, the setup notification (e.g., 602) for the second application associated with the second entity is displayed in response to a determination that the second application is available (e.g., newly or recently capable of being downloaded and/or installed) to be configured to execute at the computer system. When a current location associated with the computer system corresponds to a location associated with the second entity, displaying the setup notification for the second application associated with the second entity in response to a determination that the second application is available to be configured to execute at the computer system provides feedback to a user that the second application is now available for the user's current location. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the setup notification is displayed when a user's current jurisdiction begins supporting exposure notifications (e.g., by way of an application associated with the current jurisdiction).

In some embodiments, the setup notification (e.g., 602; 606; 610; 614; 620) includes an indication (e.g., a prompt, text, a selectable option) of an option to enable display of notifications (e.g., exposure notifications associated with the second entity) associated with the second entity (e.g., the California Public Air Quality Authority). Displaying the setup notification with an indication of an option to enable display of notifications associated with the second entity provides feedback to a user that notifications are currently not enabled for the second application associated with the second entity and indicates that such notifications are capable of being enabled. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the exposure notifications associated with the second entity are displayed by (e.g., triggered for display by) the second application. In some embodiments, the exposure notifications associated with the second entity are displayed by the computer system.

In some embodiments, the process in which one or more notifications (e.g., 674; 680; 686; 690) are enabled for display includes enabling the computer system (e.g., 600) to transmit (e.g., transmit and/or receive) data (e.g., data associated with the computer system; identification data; Bluetooth keys; device identifiers; location data) to a third entity (e.g., the California Public Air Quality Authority) (e.g., a provider of the application; an entity that is different from a provider of the computer system; a geographic-specific entity or notification source; an application; an external device; an account; an organization (e.g., a governmental organization and/or jurisdiction)) to enable display of the notifications (e.g., data that is used to determine if notification criteria are met). In some embodiments, the entity is a local authority such as a local health authority or a local environmental authority.

In some embodiments, the first application is associated with (e.g., developed by; provided by) the third entity (e.g., the California Public Air Quality Authority). In some embodiments, the computer system is configured to transmit the data to the third entity when the first application is configured to execute on the computer system (e.g., 600) and when the first application is not configured to execute on the computer system. Configuring the computer system to transmit the data to the third entity when the first application is configured to execute on the computer system and when the first application is not configured to execute on the computer system enables sharing of data with the third entity to provide a user of the computer system with notification of an event, even when the user of the computer system has not configured the first application to execute at the computer system. Enabling the computer system to provide such notifications to the user without requiring the user to provide further input to configure the first application to execute at the computer system reduces the number of inputs performed at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, after completion of the process in which one or more notifications are enabled for display, the computer system (e.g., 600) receives, via the one or more input devices (e.g., 601), a request to pause display of the one or more notifications (e.g., input 667 on pause logging option 669). In response to receiving the request to pause display of the one or more notifications, the computer system temporarily disables display of the one or more notifications (e.g., 674; 680) (e.g., temporarily ceasing display of exposure notifications; temporarily disabling display of exposure notifications) for a predetermined amount of time (e.g., one hour, twelve hours, the remainder of the day). Temporarily disabling display of the one or more notifications for a predetermined amount of time in response to receiving the request to pause display of the one or more notifications reduces the number of calculations and inputs performed at the computer system by eliminating display of exposure notifications that are not relevant to a user of the computer system. Reducing the number of inputs and calculations enhances the operability of the computer system and makes the user-system interface more efficient by reducing power usage and improving battery life of the computer system, thereby enabling the user to use the system more quickly and efficiently. In some embodiments, after expiration of the predetermined amount of time, the computer system re-enables display of the one or more notifications. In some embodiments, the computer system re-enables display of the one or more notifications in response to a request to resume display of the one or more notifications (e.g., an input on resume logging option 672), if the request to resume display of the notifications is received prior to expiration of the predetermined amount of time.

In some embodiments, the computer system (e.g., 600) permits temporarily disabling display of exposure notifications (e.g., 674; 680). For example, in situations in which a user expects to be exposed to a particular event, but that precautions are taken with respect to the event, the user may elect not to be notified of exposure to the event. For example, if the event corresponds to exposure to an environmental condition or exposure to a person having an infectious disease and the user is, for example, an environmental worker or healthcare worker who has taken precaution to avoid harm caused by exposure to the environmental condition or infectious disease, the user can elect to pause display of notifications concerning exposure to the event.

In some embodiments, prior to completion of (e.g., during) the process in which one or more notifications are enabled for display (e.g., the process shown in FIGS. 6A-6E), the computer system (e.g., 600) displays, via the display generation component (e.g., 601), a second user interface object (e.g., 616) associated with a process for configuring the first application for executing on the computer system. Displaying a second user interface object associated with a process for configuring the first application for executing on the computer system, prior to completion of the process in which one or more notifications are enabled for display, provides feedback to a user of the computer system that an application is available for download and provides controls for downloading the application without requiring the user to navigate away from the process for enabling notifications to initiate the process for configuring the first application for executing on the computer system. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) displays, via the display generation component (e.g., 601), a second application user interface (e.g., 699) (e.g., a user interface for a health application; a user interface for an application that is different than the first application) that includes a third user interface object (e.g., 699-1) associated with a process for configuring the first application for executing on the computer system (e.g., a prompt; a selectable object that initiates a process to download and/or install the first application). Displaying a second application user interface that includes a third user interface object associated with a process for configuring the first application for executing on the computer system provides feedback to a user of the computer system that an application is available for download and provides controls for downloading the application without requiring the user to navigate away from the second application to initiate the process for configuring the first application for executing on the computer system. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) receives, via the one or more input devices (e.g., 601), a series of one or more inputs (e.g., 623; 694; 693-2) (e.g., including an input corresponding to selection of a user interface object in a user interface associated with the provider of the first notification) corresponding to a request to report an occurrence of an event (e.g., exposure to a specific environmental condition, contaminant, and/or biological agent; being diagnosed with a specific health condition). In response to receiving the series of one or more inputs corresponding to the request to report the occurrence of the event, and in accordance with a determination that the first application is configured to execute on the computer system, the computer system displays, via the display generation component, a user interface (e.g., 696) of the first application for reporting (e.g., communicating to an entity associated with the first application) the occurrence of the event (e.g., launching, opening, and/or executing the first application to report the event). Displaying the user interface of the first application for reporting the occurrence of the event when the first application is configured to execute on the computer system provides feedback to a user of the computer system that an application is available for reporting the event and provides controls for reporting the event without requiring the user to navigate away from the current user interface to access the first application to report the occurrence of the event. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to receiving the series of one or more inputs (e.g., 623; 694; 693-2) corresponding to the request to report the occurrence of the event, and in accordance with a determination that the first application is not configured to execute on the computer system (e.g., 600), the computer system displays, via the display generation component (e.g., 601), a second user interface object (e.g., 650) (e.g., that is the same as the user interface object associated with a process for configuring the first application for executing on the computer system; e.g., that is different than that user interface object) associated with a process for configuring the first application for executing on the computer system. Displaying a second user interface object associated with a process for configuring the first application for executing on the computer system when the first application is not configured to execute on the computer system provides feedback to a user of the computer system that the first application is available for download and provides controls for configuring the first application for executing on the computer system without requiring the user to navigate away from the current user interface to initiate the process for configuring the first application for executing on the computer system. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) receives, via the one or more input devices (e.g., 601), a second series of one or more inputs (e.g., 693-2; 694; an input on the continue affordance in interface 696) corresponding to a request to report an occurrence of an event (e.g., exposure to a specific environmental condition, contaminant, and/or biological agent; being diagnosed with a specific health condition). In some embodiments, subsequent to receiving (e.g., in response to receiving) the second series of one or more inputs corresponding to the request to report the occurrence of the event, and in accordance with a determination that a location history of a user of the computer system (e.g., a history based on one or more of the computer system's location, information entered at the computer system, and information accessible at the computer system) satisfies a third set of criteria (e.g., the location history corresponds, over a predetermined amount of time, to a plurality of geographical locations (e.g., the user has recently traveled to a plurality of locations associated with different entities (e.g., cities, counties, states, countries))), the computer system displays, via the display generation component, a user interface object (e.g., 697) (e.g., a prompt; a selectable object that initiates a process to report) associated with a process for reporting the occurrence of the event to a plurality of entities associated with the location history. Displaying a user interface object associated with a process for reporting the occurrence of the event to a plurality of entities associated with the location history of the user when the location history satisfies the third set of criteria provides controls for selectively reporting the occurrence of the event to multiple entities without requiring the user to navigate away from the current user interface to report the occurrence of the event to each of the entities. This reduces the number of inputs needed to report the occurrence of the event to multiple entities, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the user interface object (e.g., 697) is displayed after reporting an occurrence of the event to a currently active jurisdiction. In some embodiments, the user interface object is displayed by a system user interface of the computer system (not using the third party application) to avoid alerting the currently active jurisdiction of the user's travel history. In some embodiments, subsequent to receiving the second series of one or more inputs (e.g., 693-2; 694; an input on the continue affordance in interface 696) corresponding to the request to report the occurrence of the event, and in accordance with a determination that the location of the user of the computer system (e.g., 600) does not satisfy the third set of criteria (e.g., the location history does not correspond, over the predetermined amount of time, to a plurality of geographical locations (e.g., the user has not recently traveled to a plurality of locations)), the computer system forgoes display of the user interface object associated with the process for reporting the occurrence of the event to the plurality of entities associated with the plurality of geographical locations.

In some embodiments, the process in which one or more notifications (e.g., 674; 680) are enabled for display includes enabling display of notifications associated with: a fourth entity (e.g., the Public Air Quality Authority of Oregon) (e.g., a provider of the first application) that corresponds to a first geographic area (e.g., location) (e.g., Oregon) and a first set of notification criteria; and a fifth entity (e.g., the Public Air Quality Authority of Nevada) (e.g., a provider of a second application) that corresponds to a second geographic area (e.g., Nevada), different from the first geographic area, and a second set of notification criteria, different than the first set of notification criteria (e.g., see FIG. 6H).

In some embodiments, in accordance with a determination that a current location of the computer system (e.g., 600) (e.g., as determined by GPS, WiFi positioning) corresponds to the first geographic area (e.g., Oregon), the method includes configuring the computer system to receive notifications based on the first set of notification criteria. Configuring the computer system to receive notifications based on the first set of notification criteria in accordance with a determination that a current location of the computer system corresponds to the first geographic area automatically configures the computer system to adopt notification criteria for the fourth entity when the user travels to the first geographic area without requiring the user to manually enable the notification criteria for the fourth entity. This reduces the number of inputs needed to enable notification criteria for the user's current location, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in accordance with a determination that the current location of the computer system (e.g., 600) corresponds to the second geographic area (e.g., Nevada), the method includes configuring the computer system to receive notifications based on the second set of notification criteria. Configuring the computer system to receive notifications based on the second set of notification criteria in accordance with a determination that a current location of the computer system corresponds to the second geographic area automatically configures the computer system to adopt notification criteria for the fifth entity when the user travels to the second geographic area without requiring the user to manually enable the notification criteria for the fifth entity. This reduces the number of inputs needed to enable notification criteria for the user's current location, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the criteria for displaying a notification is specific to a particular entity of a set of entities who have been authorized to provide notifications at the computer system (e.g., 600). In some embodiments, the active entity (the entity whose criteria is currently selected for displaying notifications) is selected based on a geographical location of the computer system or a user of the computer system. For example, as a user travels between jurisdictions of a set of authorized entities, the entity associated with the jurisdiction in which the user is currently located is automatically selected as the active entity, and that entity's criteria is automatically selected for determining when to display an exposure notification (e.g., see FIG. 6H).

In some embodiments, after displaying (in some embodiments, while displaying) the user interface of the first application for reporting the occurrence of the event (e.g., 696; 6150), the computer system (e.g., 600) receives a second series of one or more inputs (e.g., 6152; 6156; 6164) (in some embodiments, that includes at least one input directed to a selectable graphical object (e.g., affordance) (e.g., 6154; 6158) of the user interface of the first application for reporting the occurrence of the event). In some embodiments, the second series of one or more inputs includes one or more inputs corresponding to a verification code (e.g., one or more numeric and/or textual characters that verify the validity of the reporting of the occurrence of the event; a verification code provided by a third party (e.g., provided by text message) that validates reporting of occurrences (e.g., a testing provider; an authorized agent). In response to receiving the second series of one or more inputs, the computer system reports the occurrence of the event via the first application (e.g., reported to the third party that developed and/or provided the first application). Reporting an occurrence after receiving a verification code reduces the risk of erroneous and/or unauthorized reporting. Reducing the risk of erroneous and/or unauthorized reporting enhances the operability of the device and makes the user-device interface more secure and efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) displays (e.g., as part of the process in which one or more notifications are displayed; as part of a settings user interface for managing the first application), via the display generation component (e.g., 601), a user interface object (e.g., 6138; 6148; 6192) for enabling automatic reporting of occurrences of a first type (e.g., exposure of a user of the computer system to a predetermined type of exposure event) to a first set of external devices (e.g., one or more devices of other users who have completed the process (e.g., the same process) in which one or more notifications are enabled for display; one or more devices of other users of the first application). After displaying the user interface object for enabling automatic reporting of occurrences of a first type to a first set of external devices (in some embodiments, in response to an input (e.g., 6140) corresponding to user interface object for enabling automatic reporting of occurrences of a first type to a first set of external devices), the computer system detects (e.g., a determination made based on data received by the computer system from an external device and/or made based on data entered by a user of the computer system (e.g., based on a self-reporting of exposure)) that an occurrence of the first type has occurred. In response to detecting that the occurrence of the first type has occurred: in accordance with a determination that reporting the occurrence of the first type to the first set of external devices is currently enabled, the computer system reports the occurrence of the first type to the first set of external devices. In some embodiments, if an occurrence of the first type has occurred but automatic reporting of occurrences of the first type are not enabled, the computer system does not report the occurrence of the first type to the first set of external devices. In accordance with a determination that reporting the occurrence of the first type to the first set of external devices is currently not enabled, forgoing reporting the occurrence of the first type to the first set of external devices. Providing an option to automatically report occurrences of the first type to a first set of external devices provides the user with an option to report occurrences without having to provide additional user inputs. Performing an optimized operation based on whether a settable option has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) displays the user interface object (e.g., 6138; 6148) for enabling automatic reporting of occurrences of a first type to a first set of external devices occurs prior to the occurrence of the first type (e.g., prior to determining that any occurrence of the first type has occurred). In some embodiments, a settings user interface (e.g., 6142) for managing notifications enabled by a process in which one or more notifications are enabled for display includes an indication (e.g., 6148) of whether automatic reporting of occurrences of a first type to a first set of external devices are currently enabled. In some embodiments, the computer system displays the user interface object (e.g., 6192) for enabling automatic reporting of occurrences of a first type to a first set of external devices occurs after (in some embodiments, in response to) the occurrence of the first type. In some embodiments, the user interface object for enabling automatic reporting of occurrences of a first type to a first set of external devices is included in a notification that is displayed in response to the occurrence of the first type occurs. In some embodiments, the first application must be installed on the computer system for the notification to be displayed.

In some embodiments, the computer system (e.g., 600) enables automatic reporting of occurrences of a first type to a first set of external devices in response to a predetermined time period elapsing after displaying the user interface object (e.g., 6186; 6192; 6138; 6148) for enabling automatic reporting of occurrences of a first type to a first set of external devices without receiving user input (e.g., on option 6194) requesting that the automatic reporting of occurrences of a first type to a first set of external devices not be enabled. In some embodiments, the automatic reporting of occurrences of a first type to a first set of external devices is enabled, by default, if a user of the computer system does not explicitly intervene within the predetermined time period. Enabling an option to automatically report occurrences of the first type to a first set of external devices provides the user with an option to report occurrences without having to provide additional user inputs, based on a predetermined time elapsing without user intervention provides the user with the ability to enable the option without having to provide further user input and also reduces the risk that the option is erroneously not enabled due to user inattention. Performing an optimized operation based on a settable option has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after displaying the user interface object (e.g., 6138; 6148) for enabling automatic reporting of occurrences of a first type to a first set of external devices and prior to the predetermined time period elapsing, the computer system (e.g., 600) receives a third series of one or more inputs (e.g., 6140; 6188) (e.g., that includes an input corresponding to the user interface object for enabling automatic reporting of occurrences of a first type to a first set of external devices). In some embodiments, the third series of one or more inputs includes selection (e.g., 6188) of a notification (e.g., 6186) that was displayed in response to determining that the occurrence of the first type occurred. In response to receiving the third series of one or more inputs, the computer system enables automatic reporting of occurrences of a first type to a first set of external devices.

In some embodiments, after displaying the user interface object (e.g., 6138; 6148) for enabling automatic reporting of occurrences of a first type to a first set of external devices and prior to the predetermined time period elapsing, the computer system (e.g., 600) receives a fourth series of one or more inputs (e.g., an input on option 6139; 6188; an input to deselect option 6148; an input on option 6194) corresponding to a request to not enable automatic reporting of occurrences of a first type to a first set of external devices (e.g., the fourth series of one or more inputs prevents the enabling of the automatic reporting of occurrences of a first type to a first set of external devices, by default, after the predetermined time period elapses). After receiving the fourth series of one or more inputs and after the predetermined time period has elapsed, the computer system forgoes enabling automatic reporting of occurrences of a first type to a first set of external devices, and forgoes reporting of the occurrence of the first type to the first set of external devices.

Note that details of the processes described above with respect to method 700 (e.g., FIG. 7) are also applicable in an analogous manner to the methods described below. For example, method 800 optionally includes one or more of the characteristics of the various methods described above with reference to method 700. For example, exposure notifications can be displayed when multiple entities are enabled to provide notifications, and in response to input on an exposure notification, an application associated with an entity can be accessed if it is configured to execute on the computer system, or a user interface object associated with a process for configuring the application for executing on the computer system can be displayed if the application is not configured to execute on the computer system. Method 900 also optionally includes one or more of the characteristics of the various methods described above with reference to method 700. For example, if an application is required to enable exposure notifications, the exposure notifications can be displayed as discussed with respect to method 700. Method 1000 also optionally includes one or more of the characteristics of the various methods described above with reference to method 700. For example, exposure notifications can be displayed for a public air quality authority associated with the device's current location as discussed with respect to method 700. For brevity, these details are not repeated below.

Figure 8:
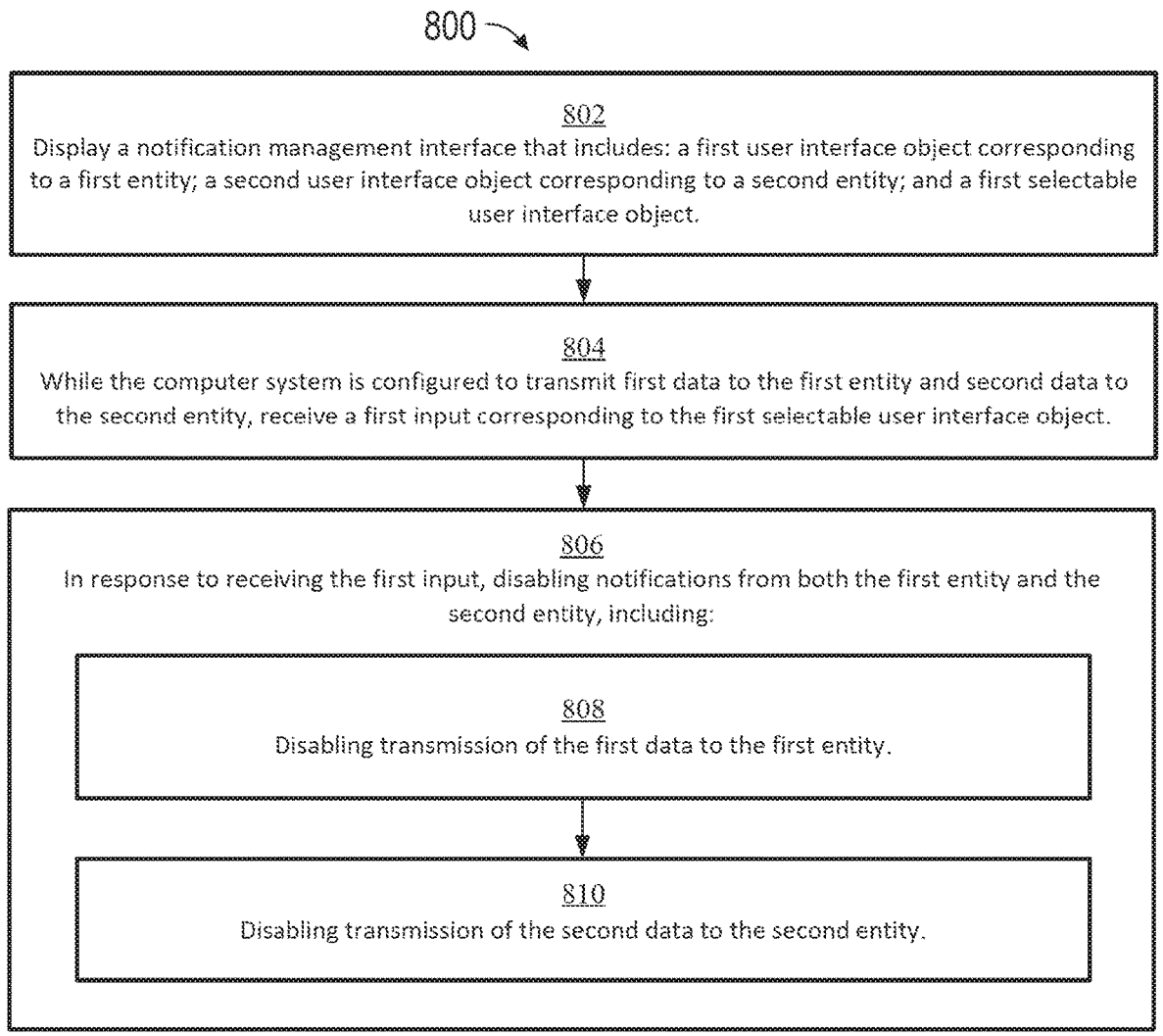
FIG. 8 is a flow diagram illustrating a method for managing exposure notifications, in accordance with some embodiments.

FIG. 8 is a flow diagram illustrating a method for managing exposure notifications using an electronic device in accordance with some embodiments. Method 800 is performed at a computer system (e.g., 100, 300, 500, 600) that is in communication with a display generation component (e.g., display 601) (e.g., a display controller, a touch-sensitive display system) and one or more input devices (e.g., a touch-sensitive surface of display 601). Some operations in method 800 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 800 provides an intuitive way for managing exposure notifications. The method reduces the cognitive burden on a user for managing exposure notifications, thereby creating a more efficient human-machine interface. For battery-operated computing devices, enabling a user to manage exposure notifications faster and more efficiently conserves power and increases the time between battery charges.

In method 800, the computer system (e.g., 600) displays (802), via the display generation component (e.g., 601), a notification management interface (e.g., 635; 655; 625) (e.g., an interface for managing one or more aspects of notifications (e.g., exposure notifications (e.g., notifications based on exposure to one or more environmental conditions, devices, or individuals) that can be issued at the computer system).

The notification management interface (e.g., 635; 655; 625; 646; 650) includes a first user interface object (e.g., 640-1) (e.g., an icon, text, an indication, an affordance) corresponding to a first entity (e.g., the Public Air Quality Authority of Nevada) (e.g., a geographic-specific entity or notification source; an application; an external device; an account; an organization (e.g., a governmental organization and/or jurisdiction)), wherein the computer system (e.g., 600) is currently configured to transmit first data (e.g., data associated with the computer system; identification data; Bluetooth keys; device identifiers; location data) to the first entity, and wherein the first entity is currently enabled (e.g., authorized; permitted) (e.g., the first entity is enabled to provide notifications if a set of one or more notification criteria are met (In some embodiments, the notification criteria includes a criterion that is based on a geographical location (e.g., a geographical location of a user of the computer system; a geographical location of the computer system)). In some embodiments, the notification criteria includes a criterion that is based on a determination whether a user account associated with the computer system has consented to sharing data with an organization (e.g., the first entity; a second entity; a governmental organization; a jurisdiction)) to provide (e.g., issue; generate) notifications (e.g., 680) (e.g., an alert, a haptic output, an audio output, a banner) (e.g., at the computer system). In some embodiments, the first entity is enabled to provide notifications, but is currently not selected as an active entity for providing notifications. For example, the first entity is authorized to provide notifications, but criteria for providing the notifications (e.g., notification criteria) is not met (e.g., the user is not located in a geographical location associated with the first entity). In some embodiments, the first user interface object includes an indication that the first entity is (e.g., currently) enabled to provide notifications (e.g., the first entity is indicated as an authorized region or an active region).

The notification management interface (e.g., 635; 655; 625; 646; 650) includes a second user interface object (e.g., 640-2) (e.g., an icon, an indication, an affordance) corresponding to a second entity (e.g., the Public Air Quality Authority of Oregon) (e.g., different from the first entity), wherein the computer system (e.g., 600) is currently configured to transmit second data to the second entity, and wherein the second entity is currently enabled to provide notifications. In some embodiments, the second data is the same data or same type of data as the first data. In some embodiments, the second entity is enabled to provide notifications, but is currently not selected as an active entity for providing notifications. For example, the second entity is authorized to provide notifications, but criteria for providing the notifications (e.g., notification criteria) is not met (e.g., the user is not located in a geographical location associated with the second entity). In some embodiments, the second user interface object includes an indication that the second entity is (e.g., currently) enabled to provide notifications (e.g., the second entity is indicated as an authorized region or an active region).

The notification management interface (e.g., 635; 655; 625; 646; 650) includes a first selectable user interface object (e.g., 636; 646-2; 650-2; 658; 654) (e.g., a toggle; a checkable or uncheckable option; an affordance; a selectable option).

In some embodiments, the first selectable user interface object corresponds to an affordance (e.g., exposure logging toggle 658 of FIG. 6L) that is selectable for enabling or disabling a setting for logging one or more occurrences of an event (e.g., an event of a first type; exposure to negative air quality; exposure to a person with an infectious disease). In some embodiments, logging includes gathering data corresponding to contact with external electronic devices (e.g., determined via Bluetooth connections) and one or more parameters associated with those devices and/or the users of those devices).

In some embodiments, the first user interface object and the second user interface object are displayed on a first user interface (e.g., 640-1 and 640-2 are both displayed in region settings interface 635 of FIG. 6H). In some embodiments, the first selectable user interface object is displayed on a second user interface separate from the first user interface (e.g., exposure logging toggle 658 is shown in exposure logging interface 655 in FIG. 6L).

While the computer system (e.g., 600) is configured to transmit the first data to the first entity (e.g., the Public Air Quality Authority of Nevada) and the second data to the second entity (e.g., the Public Air Quality Authority of Oregon), the computer system receives (804), via the one or more input devices (e.g., 601), a first input (e.g., an input directed to toggle 636; an input directed to option 646-2; input 652 directed to 650-2; an input directed to the continue affordance of user interface object 654) (e.g., a single input; a tap gesture; a swipe gesture; a series of one or more inputs) corresponding to the first selectable user interface object.

In response to receiving the first input (e.g., an input directed to toggle 636; an input directed to option 646-2; input 652 directed to 650-2; an input directed to the continue affordance of user interface object 654), the computer system (e.g., 600) disables (806) (e.g., deactivates; de-authorizes; prevents) notifications from both the first entity (e.g., the Public Air Quality Authority of Nevada) and the second entity (e.g., the Public Air Quality Authority of Oregon). Disabling notifications from both the first entity and the second entity, in response to receiving the first input corresponding to the first selectable user interface object, automatically disables notifications from both the first entity and the second entity without requiring separate inputs to selectively disable notifications for each respective entity, which reduces the number of inputs needed to disable notifications from both the first entity and the second entity. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

When disabling notifications from both the first entity (e.g., the Public Air Quality Authority of Nevada) and the second entity (e.g., the Public Air Quality Authority of Oregon), the computer system (e.g., 600) disables (808) (e.g., deactivates; de-authorizes; configures the computer system to cease transmission of the first data) transmission of the first data to the first entity, and disables (810) transmission of the second data to the second entity. Disabling transmission of the first data to the first entity and disabling transmission of the second data to the second entity, in response to receiving the first input corresponding to the first selectable user interface object, automatically disables transmission of data to both the first entity and the second entity without requiring separate inputs to selectively disable transmission of data for each respective entity, which reduces the number of inputs needed to disable data transmission to both the first entity and the second entity. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to detecting the first input, updating the first user interface object to indicate that the first entity is not enabled to provide notifications. In some embodiments, in response to detecting the first input, updating the second user interface object to indicate that the second entity is not enabled to provide notifications.

In some embodiments, the first entity is a first geographic-specific entity (e.g., the Public Air Quality Authority of Nevada) (e.g., an entity whose jurisdiction is determined based, at least in part, on a geographical boundary (e.g., a city, county, state, and/or country)) and the second entity is a second geographic-specific entity different from the first geographic-specific entity (e.g., the Public Air Quality Authority of Oregon).

In some embodiments, displaying the first user interface object (e.g., 640-1) includes displaying an indication (e.g., 640-1*a*) of a status (e.g., downloaded; not downloaded; installed; not installed) of an application (e.g., a third party application; an application that is developed on behalf of the first entity) associated with the first entity. Displaying the first user interface object including an indication of a status of an application associated with the first entity provides feedback, to a user, of the status of the application associated with the first entity without requiring the user to navigate away from the notification management interface to view application details for the application associated with the first entity. This provides improved feedback and reduces the number of inputs needed to view application details for the application, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the second user interface object (e.g., 640-2) includes displaying an indication (e.g., 640-2*a*) of a status of an application (e.g., a third party application; an application that is developed on behalf of the second entity) associated with the second entity. Displaying the second user interface object including an indication of a status of an application associated with the second entity provides feedback, to a user, of the status of the application associated with the second entity without requiring the user to navigate away from the notification management interface to view application details for the application associated with the second entity. This provides improved feedback and reduces the number of inputs needed to view application details for the application, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to a determination (e.g., while the computer system is configured to transmit the first data to the first entity and the second data to the second entity) (e.g., while the computer system is configured to cease transmission of the first data to the first entity and cease transmission of the second data to the second entity) that a first set of criteria is met, the computer system (e.g., 600) displays, via the display generation component (e.g., 601), a first notification (e.g., 680; a notification similar to 680, but associated with the Public Air Quality Authority of Nevada) associated with the first entity. In some embodiments, in response to a determination (e.g., while the computer system is configured to transmit the first data to the first entity and the second data to the second entity) (e.g., while the computer system is configured to cease transmission of the first data to the first entity and cease transmission of the second data to the second entity) that a second set of criteria is met, wherein the second set of criteria is different from the first set of criteria, the computer system displays, via the display generation component, a second notification associated with the second entity (e.g., a notification similar to 680, but associated with a different entity such as the Public Air Quality Authority of Oregon). Displaying a first notification associated with the first entity when a first set of criteria is met, and displaying a second notification associated with the second entity when a second set of criteria is met, wherein the second set of criteria is different from the first set of criteria, provides feedback to a user that different entities have different criteria for producing notifications. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, a notification (e.g., 680) is triggered by different criteria depending on whether the notification is associated with the first entity or the second entity. In other words, the first and second entities can have different criteria for triggering a notification. For example, in some embodiments, a notification is triggered by (or on behalf of) the first entity when a user of the computer system is exposed to a set of conditions (e.g., poor air quality; proximity to a person with an infectious disease) for a predetermined amount of time (e.g., 10 minutes), and a notification is triggered by (or on behalf of) the second entity when the user of the computer system is exposed to the set of conditions for a different predetermined amount of time (e.g., 5 minutes). As another example, in some embodiments, a notification is triggered by (or on behalf of) the first entity when a user of the computer system is exposed to a first event (e.g., exposure to wood being burned), and a notification is triggered by (or on behalf of) the second entity when the user of the computer system is exposed to a different event (e.g., exposure to a polluting vehicle; exposure to a person with an infectious disease).

In some embodiments, the first entity (e.g., the Public Air Quality Authority of Nevada) corresponds to a first geographic area (e.g., Nevada) and a first set of notification criteria (e.g., a set of criteria, provided by the first entity, that governs the provision of notifications). In some embodiments, the second entity (e.g., the Public Air Quality Authority of Oregon) corresponds to a second geographic area (e.g., Oregon), different than the first geographic area, and a second set of notification criteria (e.g., a set of criteria, provided by the second entity, that governs the provision of notifications) different from the first set of notification criteria. In some embodiments, prior to receiving the first input (e.g., an input directed to toggle 636; an input directed to option 646-2; input 652 directed to 650-2; an input directed to the continue affordance of user interface object 654), and while the computer system (e.g., 600) is in a first notification mode (e.g., a user configured mode; a user selected mode (e.g., a mode that can be altered (e.g., enabled or disabled) in a settings user interface; a mode in which the computer system determines notification rules based on geographic criteria)), in accordance with a determination that a current location of the computer system (e.g., as determined by GPS, WiFi positioning) corresponds to the first geographic area (e.g., Nevada), the computer system is configured to receive notifications (e.g., from the first entity) based on the first set of notification criteria. Configuring the computer system to receive notifications based on the first set of notification criteria in accordance with a determination that a current location of the computer system corresponds to the first geographic area automatically configures the computer system to adopt notification criteria for the first entity when the user travels to a location corresponding to the first entity without requiring the user to manually enable the notification criteria for the first entity. This reduces the number of inputs needed to enable notification criteria for the user's current location, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, when the computer system is not in the first user-selectable mode, the computer system does not use the current location of the computer system to configure notification criteria.

In some embodiments, prior to receiving the first input (e.g., an input directed to toggle 636; an input directed to option 646-2; input 652 directed to 650-2; an input directed to the continue affordance of user interface object 654), and while the computer system (e.g., 600) is in the first notification mode, in accordance with a determination that the current location of the computer system corresponds to the second geographic area (e.g., Oregon), the computer system is configured to receive notifications (e.g., from the second entity) based on the second set of notification criteria. Configuring the computer system to receive notifications based on the second set of notification criteria in accordance with a determination that a current location of the computer system corresponds to the second geographic area automatically configures the computer system to adopt notification criteria for the second entity when the user travels to a location corresponding to the second entity without requiring the user to manually enable the notification criteria for the second entity. This reduces the number of inputs needed to enable notification criteria for the user's current location, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system automatically switches between providing notifications based on criteria provided by the first entity or criteria provided by the second entity, depending on the current location of the computer system.

In some embodiments, prior to receiving the first input, the computer system (e.g., 600) receives, via the one or more input devices (e.g., 601), a second input (e.g., an input directed to toggle 636) (e.g., selection/deselection of an option to automatically select notification criteria based on the current location of the computer system). In response to receiving the second input, the computer system transitions from the first notification mode to a second notification mode, wherein the computer system, while in the second notification mode, is configured to receive notifications based on a third set of notification criteria (e.g., a set of criteria that is the first set of notification criteria or the second set of notification criteria; a set of criteria that was the current/active set of criteria at the time the second input was received), regardless of the current location of the computer system. Transitioning the computer system from the first notification mode to a second notification mode, wherein the computer system, while in the second notification mode, is configured to receive notifications based on a third set of notification criteria, regardless of the current location of the computer system, automatically configures the computer system to disable adopting notification criteria based on a location of the user and instead enables a mode for adopting notification criteria based on different criteria that is independent of the user's current location. This reduces the number of inputs needed to switch notification modes, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to the first input (e.g., input on toggle 636), the computer system (e.g., 600) is configured to provide notifications (e.g., 674; 680) based on a second set of notification criteria that does not include a criterion based on the current location of the computer system. In some embodiments, the first input disables a feature for automatically selecting an entity for providing notifications based on geographic criteria (e.g., a location of the computer system; a location of a user of the computer system). In some embodiments, when the feature is disabled, the currently selected entity (e.g., the California Public Air Quality Authority as shown in FIG. 6H) remains the entity that is selected for providing notifications. In some embodiments, when the feature is disabled, an entity that was most recently selected (e.g., manually or by consenting to share data with that entity) becomes (or remains) the selected entity for providing notifications. In some embodiments, when the feature is disabled, the respective entity for providing notifications is selected based on a manual selection of a specific entity (e.g., the user manually selects the first or second entity for providing notifications as discussed with respect to FIGS. 6H-6K). In some embodiments, the first input corresponds to a selection (e.g., deactivation, deselection) of change region automatically toggle 636 in FIG. 6H or continue affordance of user interface object 654 in FIG. 6K.

In some embodiments, while the computer system (e.g., 600) is configured to receive notifications (e.g., 680) (e.g., from the first entity) based on a fourth set of notification criteria (e.g., criteria provided by the first entity), the computer system receives, via the one or more input devices (e.g., 601), a third input (e.g., a series of one or more inputs; inputs 648, 652, and/or an input on the continue affordance of user interface object 654 in FIG. 6K). In response to the third input, the computer system is configured to receive notifications based on a fifth set of notification criteria (e.g., criteria provided by the second entity). Configuring the computer system to receive notifications based on the fifth set of notification criteria in response to the third input automatically configures the computer system to switch from a configuration in which the computer system receives notifications based on the fourth set of notification criteria to a configuration in which the computer system receives notifications based on the fifth set of notification criteria. This allows the user to adopt preferred notification criteria regardless of where the user is located and without having to display additional controls for switching notification criteria. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, prior to receiving the first input, and while the current location of the computer system (e.g., 600) corresponds to a location (e.g., California) associated with a third entity (e.g., the California Public Air Quality Authority): a) the computer system is currently configured to transmit the first data to the first entity (e.g., the Public Air Quality Authority of Nevada), the second data to the second entity (e.g., the Public Air Quality Authority of Oregon), and third data to the third entity (e.g., in some embodiments, the third data is the same data or same type of data as the first data); b) the first entity, second entity, and third entity are currently enabled to provide notifications; c) the computer system is currently configured to provide notifications from the third entity (e.g., the computer system is currently configured to provide notifications from the third entity because the current location of the computer system corresponds to the location associated with the third entity); d) the computer system is currently configured not to provide notifications from the first entity (e.g., the computer system is currently configured not to provide notifications from the first entity because the current location of the computer system does not correspond to a location associated with the first entity); and e) the computer system is currently configured not to provide notifications from the second entity (e.g., the computer system is currently configured not to provide notifications from the second entity because the current location of the computer system does not correspond to a location associated with the second entity).

In some embodiments, the computer system (e.g., 600) detects, via the one or more input devices (e.g., the touch-sensitive surface of 601), a second input (e.g., 644; 648). In response to detecting the second input, the computer system displays, via the display generation component (e.g., 601), a user interface. In accordance with a determination that the second input corresponds to a selection of the first user interface object (e.g., 640-1), the computer system displays information (e.g., 646; 646-1; 646-2; 646-3; 646-4) corresponding to the first entity (e.g., the Public Air Quality Authority of Nevada) (e.g., a name of the first entity, an option to access an application associated with the first entity, an option to download an application associated with the first entity, an option to select the first entity as the active region, an option to view a consent document associated with the first entity, and/or an option to de-authorize the first entity; information not included in the notification management interface). Displaying information corresponding to the first entity when the second input corresponds to a selection of the first user interface object provides additional controls for viewing information corresponding to the first entity without having to display additional controls for accessing the information. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In accordance with a determination that the second input corresponds to a selection of the second user interface object (e.g., 640-2), displaying information (e.g., 650; 650-1; 650-2; 650-3; 650-4) corresponding to the second entity (e.g., the Public Air Quality Authority of Oregon) (e.g., a name of the second entity, an option to access an application associated with the second entity, an option to download an application associated with the second entity, an option to select the second entity as the active region, an option to view a consent document associated with the second entity, and/or an option to de-authorize the second entity; information not included in the notification management interface). Displaying information corresponding to the second entity when the second input corresponds to a selection of the second user interface object provides additional controls for viewing information corresponding to the second entity without having to display additional controls for accessing the information. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the information corresponding to the first entity (e.g., 646) includes a second selectable user interface object (e.g., 646-1) (e.g., a first affordance) that, when selected, initiates a process for transmitting, to the first entity (e.g., the Public Air Quality Authority of Nevada), data associated with a first event. Displaying a second selectable user interface object that, when selected, initiates a process for transmitting, to the first entity, data associated with a first event provides additional controls for transmitting data associated with the first event to the first entity without having to display additional controls for accessing the first entity to provide the data. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the process includes launching an application associated with the first entity and reporting, to the first entity, an occurrence of an event (e.g., exposure to negative air quality; diagnosis of an infectious disease).

In some embodiments, the information corresponding to the second entity (e.g., 650) includes a third selectable user interface object (e.g., 650-1) (e.g., a second affordance) that, when selected, initiates a process for transmitting, to the second entity, data associated with the first event. Displaying a third selectable user interface object that, when selected, initiates a process for transmitting, to the second entity, data associated with the first event provides additional controls for transmitting data associated with the first event to the first entity without having to display additional controls for accessing the first entity to provide the data. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the process includes launching an application (or downloading the application, then launching the application) associated with the second entity and reporting, to the second entity, an occurrence of an event (e.g., exposure to negative air quality; diagnosis of an infectious disease).

In some embodiments, the information corresponding to the first entity (e.g., 646) includes a fourth selectable user interface object (e.g., 646-3) (e.g., a third affordance) that, when selected, initiates a process for displaying, via the display generation component (e.g., 601), an authorization interface (e.g., similar to 614) (e.g., a consent form authorizing the first entity to send and/or receive data (e.g., the first data) to enable the first entity to provide notifications) associated with the first entity (e.g., the Public Air Quality Authority of Nevada). Displaying a fourth selectable user interface object that, when selected, initiates a process for displaying an authorization interface associated with the first entity provides additional controls for displaying the authorization interface associated with the first entity without having to display additional controls for accessing the authorization interface. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the information corresponding to the second entity (e.g., 650) includes a fifth selectable user interface object (e.g., 650-3) (e.g., a fourth affordance) that, when selected, initiates a process for displaying, via the display generation component, an authorization interface (e.g., similar to 614) (e.g., a consent form authorizing the second entity to send and/or receive data (e.g., the second data) to enable the second entity to provide notifications) associated with the second entity (e.g., the Public Air Quality Authority of Oregon). Displaying a fifth selectable user interface object that, when selected, initiates a process for displaying an authorization interface associated with the second entity provides additional controls for displaying the authorization interface associated with the second entity without having to display additional controls for accessing the authorization interface. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the information corresponding to the first entity (e.g., 646) includes a sixth selectable user interface object (e.g., 646-4) (e.g., a fifth affordance) that, when selected, initiates a process for disabling transmission of the first data to the first entity and disabling notifications from the first entity (e.g., the Public Air Quality Authority of Nevada) (e.g., without disabling transmission of the second data to the second entity and without disabling notifications from the second entity). Displaying a sixth selectable user interface object that, when selected, initiates a process for disabling transmission of the first data to the first entity and disabling notifications from the first entity provides additional controls for disabling the transmission of the first data to the first entity and disabling notifications from the first entity without having to display additional controls for each respective process. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to detecting selection of the sixth selectable user interface object, the computer system is configured to cease transmission of the first data to the first entity, while continuing to transmit second data to the second entity.

In some embodiments, the information corresponding to the second entity (e.g., 650) includes a seventh selectable user interface object (e.g., 650-4) (e.g., a sixth affordance) that, when selected, initiates a process for disabling transmission of the second data to the second entity (e.g., the Public Air Quality Authority of Oregon) and disabling notifications from the second entity (e.g., without disabling transmission of the first data to the first entity and without disabling notifications from the first entity). Displaying a seventh selectable user interface object that, when selected, initiates a process for disabling transmission of the second data to the second entity and disabling notifications from the second entity provides additional controls for disabling the transmission of the second data to the second entity and disabling notifications from the second entity without having to display additional controls for each respective process. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to detecting selection of the seventh selectable user interface object, the computer system is configured to cease transmission of the second data to the second entity, while continuing to transmit first data to the first entity.

In some embodiments, the computer system (e.g., 600) displays, via the display generation component (e.g., 601), a list (e.g., 665) that includes (e.g., as part of the notification management interface; separate from the notification management interface) an indication (e.g., 665-1) of a first notification provided by the first entity or the second entity, and an indication (e.g., 665-2) of a second notification provided by the first entity or the second entity.

Note that details of the processes described above with respect to method 800 (e.g., FIG. 8) are also applicable in an analogous manner to the methods described above and below. For example, method 700 optionally includes one or more of the characteristics of the various methods described above with reference to method 800. For example, exposure notifications can be displayed for different entities as the user travels among different locations and the computer system automatically adopts the exposure notification criteria established by the different entities based on the user's current location. Method 900 also optionally includes one or more of the characteristics of the various methods described above with reference to method 800. For example, region settings for a location selected in method 900 can be managed using one or more techniques discussed with respect to method 800. Method 1000 also optionally includes one or more of the characteristics of the various methods described above with reference to method 800. For example, region settings for a location associated with the notifications discussed with respect to method 1000 can be managed using one or more techniques discussed with respect to method 800. For brevity, these details are not repeated below.

FIG. 9 is a flow diagram illustrating a method for managing exposure notifications using an electronic device in accordance with some embodiments. Method 900 is performed at a computer system (e.g., 100, 300, 500, 600) that is in communication with a display generation component (e.g., display 601) (e.g., a display controller, a touch-sensitive display system) and one or more input devices (e.g., a touch-sensitive surface of display 601). Some operations in method 900 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 900 provides an intuitive way for managing exposure notifications. The method reduces the cognitive burden on a user for managing exposure notifications, thereby creating a more efficient human-machine interface. For battery-operated computing devices, enabling a user to manage exposure notifications faster and more efficiently conserves power and increases the time between battery charges.

In method 900, while a first location function is not active (e.g., a location tracking function; a function that reports the location of the system to an external device (e.g., to a location-tracking service); a function that provides information about the location of the system to an application operating on the system) (in some embodiments, a different, second location function is active, even while the first location function is not active), the computer system (e.g., 600) receives (902), via the one or more input devices (e.g., 601), a first input (e.g., 6102; 6108) (e.g., a tap on a "set up," "turn on," or "continue" graphical user interface object) corresponding to a request to enable a notification feature (e.g., an exposure notification feature that generates notifications based on exposure to one or more environmental conditions, devices, or individuals; an operating system provided feature; a feature provided by an application (e.g., a third party application provided by a party other than the developer of the operating system)).

In response to the first input, the computer system (e.g., 600) displays (904), via the display generation component (e.g., 601), a first interface of a set of user interfaces (e.g., 6106; 6112; 6118) (e.g., a plurality of interfaces for enabling the notification feature), wherein the set of user interfaces includes a region-selection interface (e.g., 6112; 6118) (e.g., a region-selection interface) (in some embodiments, the region-selection interface is the first interface of the set of user interfaces) that includes a region-selection graphical user interface object (e.g., 6114-1; 6120-1) (e.g., a text entry field; a first affordance that corresponds to a specific region that one of a plurality of affordances each corresponding to a specific region), for selecting a region (e.g., a geographic region (e.g., a country, a state, a municipality); a region associated with a user of the system (e.g., the user's residence or current region)). In some embodiments, a plurality of related of regions are selected. In some embodiments, the plurality of regions are related as a region and sub-region within the region (e.g., selection of the United States and selection of a specific state). In such embodiments, the region-selection graphical user interface object corresponds to the specific state. In some embodiments, the set of user interfaces includes a consent user interface (e.g., 6130) that is generated by the operating system of the computer system (e.g., and not generated by a third party, such as a party managing the first region).

While displaying the region-selection interface (e.g., 6112; 6118), the computer system (e.g., 600) receives (906) a first set of one or more inputs that includes a second input (e.g., 6116; 6122) corresponding to the region-selection graphical user interface object (e.g., 6114-1; 6120-1) (e.g., a tap on an affordance of a specific region; a input submitting a region inputted into text field). The second input identifies a first region (e.g., the United States; California).

At 908 of method 900, in response to receiving the first set of one or more inputs that includes the second input (e.g., 6116; 6122), the computer system (e.g., 600) performs the following items. In accordance with a determination that the first region (e.g., a characteristic of the first region (e.g., the region's identify) satisfies a first set of criteria, the computer system enables (910) the notification feature without requiring download (in some embodiments, without requiring installation) of a first application (e.g., a third party application; an application that is developed on behalf of an entity or organization that is different from an entity or organization on whose behalf the computer system and/or an operating system of the computer system is developed) that is associated with the first region. In some embodiments, the first set of criteria includes a criterion that is met when the first application is already operating on, installed on, and/or downloaded to the computer system. In some embodiments, the first set of criteria includes a criterion that is met when the notification feature can be enabled for the first region without requiring the first application to be operating on the computer system.

In accordance with a determination that the first region does not satisfy the first set of criteria, the computer system (e.g., 600) displays (912), via the display generation component (e.g., 601), an indication (e.g., 6124; 6126) of whether a second application (e.g., the first application; a third party application; an application that is developed on behalf of an entity or organization that is different from an entity or organization on whose behalf the computer system and/or an operating system of the computer system is developed) that is associated with the first region is available for operation (in some embodiments, available for download and/or for installation on the system) on the computer system. Displaying an indication of whether a second application that is associated with the first region is available for operation on the computer system, based on whether the first region does not satisfy the first set of criteria, provides the user with a relevant indication when certain conditions are met. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the indication is displayed without enabling the notification feature. In some embodiments, the notification feature is enabled in accordance with the determination that the first region does not satisfy the first set of criteria.

In some embodiments, the first set of criteria includes a first criterion that is satisfied when the first region permits (e.g., allows; has designated that notifications can be provided without requiring the first application) enabling of the notification feature without requiring download of the first application. Enabling a notification feature based on whether the first region permits the feature provides the user with a simplified notification process when it is available, without having to separately determine if the first region provides such an option. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of criteria includes a second criterion that is satisfied when a function (e.g., location services function; a function that authorizes the reporting of the system's associated location to one or more external devices (e.g., including reporting to the first region)) for reporting the current location associated with the computer system is (e.g., a geographical location of the computer system, or a geographical location of a user of the computer system) currently enabled. Enabling a notification feature based on whether a location reporting function is enabled, provides the user with the requested notifications without having to manually report their current location. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after receiving the second input identifying the first region (e.g., 6116; 6122), the computer system (e.g., 600) displays a set of one or more indications (e.g., 6124; 6126) of whether the first application or the second application is available for the first region. Displaying a set of one or more indications of whether the first application or the second application is available for the first region provides the user with feedback as to whether the application is available for the particular selected region and whether the system is capable of downloading the application. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the set of one or more indications includes displaying an application-download user interface object (e.g., 6126; 6128-1; 6128-2) (in some embodiments, when the first region does not support enabling notifications without requiring download of the first application or the second application). In some embodiments, the computer system (e.g., 600) receives a third user input corresponding to the application-download user interface object (e.g., an input on option 6128-1; an input on option 6128-2). In response to receiving the third user input corresponding to the application-download user interface object, the computer system initiates a process for downloading the second application.

In some embodiments, displaying the set of one or more indications includes displaying a download-prompt user interface object (e.g., 6124; 6125) (in some embodiments, when the first region does not support enabling notifications without requiring download of the first application or the second application and the first and/or second application is currently not available for download). In some embodiments, the computer system (e.g., 600) receives a fourth user input corresponding to the download-prompt user interface object (e.g., a selection of option 6125). In response to receiving the fourth user input corresponding to the download-prompt user interface object, the computer system enables a process for providing a notification when the second application associated with the first region becomes available for download. Providing the user with notifications when an application is available for the region provides the user with an automatic feature for receiving information and provides feedback to the user as to the status of application availability. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of user interfaces includes a symptoms (e.g., conditions) user interface (e.g., 6168) that includes a set of one or more symptom-related user interface objects (e.g., 6170; 6172; 6174; 6178) that includes a first symptom-related user interface object (e.g., 6172; 6174) that, when selected, inputs a system-related detail (e.g., information that symptoms have not been experienced; information that symptoms have been experienced; information that symptoms have been experienced as of a particular date). In some embodiments, the symptom user interface includes a set of one or more symptom indications (e.g., a list of symptoms; 6170) that is provided by a third party (e.g., a party managing the first region). In some embodiments, the system-related detail includes a start date when symptoms began to be experienced (e.g., by a user of the computer system). In some embodiments, the symptoms user interface includes a selectable user interface object for entering a start date of symptoms. In some embodiments, the symptoms start date is used to determine a start date of when to share device ID keys with parties (e.g., other devices) who may have been exposed to the same environmental conditions as the user of the computer system. In some embodiments, device ID keys are not shared with the parties unless the parties met exposure criteria (e.g., close proximity to the user of the computer system for a predetermined amount of time) on or after the date for which the user indicated symptoms began.

Note that details of the processes described above with respect to method 900 (e.g., FIG. 9) are also applicable in an analogous manner to the methods described above and below. For example, method 700 optionally includes one or more of the characteristics of the various methods described above with reference to method 900. For example, exposure notifications can be displayed for different entities (e.g., jurisdictions) selected using the interfaces discussed with respect to method 900 without requiring the device to download an application provided by a public air quality authority associated with the device's current location. Method 800 also optionally includes one or more of the characteristics of the various methods described above with reference to method 900. For example, the user interfaces discussed with respect to method 800 can be used to manage exposure notification settings for a jurisdiction that does not require download of an application provided by a public air quality authority associated with the device's current location. Method 1000 also optionally includes one or more of the characteristics of the various methods described above with reference to method 900. For example, the user interfaces discussed with respect to method 1000 can be used to enable sharing of data associated with exposure events without requiring the device to download an application provided by a public air quality authority associated with the device's current location. For brevity, these details are not repeated below.

Figure 10:
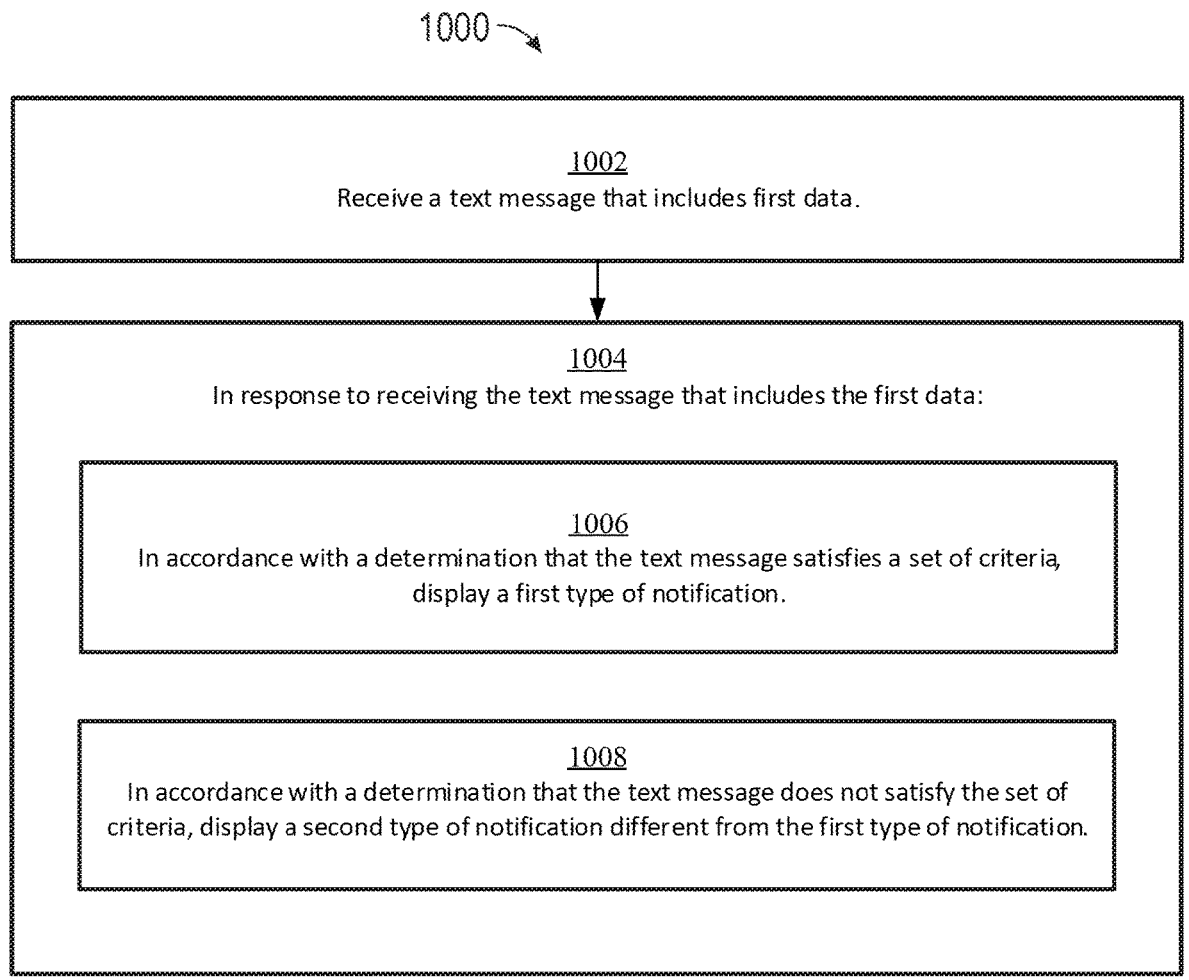
FIG. 10 is a flow diagram illustrating a method for managing exposure notifications, in accordance with some embodiments.

FIG. 10 is a flow diagram illustrating a method for managing exposure notifications using an electronic device in accordance with some embodiments. Method 1000 is performed at a computer system (e.g., 100, 300, 500, 600) (e.g., a smartphone; a tablet) that is in communication with a display generation component (e.g., display 601) (e.g., a display controller; a touch-sensitive display system) and one or more input devices (e.g., a touch-sensitive surface of display 601). Some operations in method 1000 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 1000 provides an intuitive way for managing exposure notifications. The method reduces the cognitive burden on a user for managing exposure notifications, thereby creating a more efficient human-machine interface. For battery-operated computing devices, enabling a user to manage exposure notifications faster and more efficiently conserves power and increases the time between battery charges.

In method 1000, the computer system (e.g., 600) receives (1002) a text message (e.g., represented by 6220, 6236, and/or 6250) (e.g., a Short Message Service (SMS) message; a message that includes text content (e.g., text content generated by a sender (e.g., an email))) that includes first data (e.g., represented by data 6220-2, 6236-2, and/or 6250-2) (e.g., a hash code; an authentication code; data that indicates a request to authorize sharing (e.g., with a third party) of identifying data (e.g., device keys)).

In response to receiving the text message (e.g., represented by 6220, 6236, and/or 6250), the computer system (e.g., 600) performs (1004) the items noted below.

In accordance with a determination that the text message (e.g., represented by 6220, 6236, and/or 6250) (e.g., the first data (e.g., 6220-2; 6236-2; 6250-2) satisfies a set of criteria (e.g., validation criteria; a set of criteria that includes a criterion that is met when the first data matches a stored, validated data set (e.g., the first data includes a public key of a public/private key pair)), the computer system (e.g., 600) displays (1006), via the display generation component (e.g., 601), a first type of notification (e.g., 6222; 6238; 6252) (e.g., a notification that includes a system-generated notification and, optionally, at least a portion of the text message). Displaying the first type of notification provides feedback to a user of the computer system that the text message is validated and provides controls for authorizing the computer system to share identification data without requiring the user to navigate away from the current user interface to authorize the computer system to share the identification data. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In accordance with a determination that the text message (e.g., represented by 6220, 6236, and/or 6250) (e.g., the first data (e.g., 6220-2; 6236-2; 6250-2) does not satisfy the set of criteria, the computer system (e.g., 600) displays (1008), via the display generation component (e.g., 601), a second type of notification (e.g., 6218; 6220; 6236; 6250) different from the first type of notification (e.g., a representation of the text message without the system-generated notification). In some embodiments, the first type of notification is not displayed in accordance with a determination that the text message does not satisfy the set of criteria (e.g., the second type of notification is displayed without displaying the first type of notification, as depicted in FIG. 6AV, for example).

In some embodiments, the first data includes a code (e.g., 6220-2; 6236-2; 6250-2) (e.g., hash code; authentication code; a public key) and the text message satisfies the set of criteria when the code meets validation criteria (e.g., a set of criteria that includes a criterion that is met when the first data matches a stored, validated data set (e.g., the first data includes a public key of a public/private key pair)). Displaying the first type of notification when the first data includes a code that meets validation criteria provides feedback to a user of the computer system that the text message is validated and provides controls for authorizing the computer system to share identification data without requiring the user to navigate away from the current user interface to authorize the computer system to share the identification data. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, as a part of displaying the first type of notification (e.g., 6222; 6238; 6252), the computer system (e.g., 600) displays (e.g., via display 601), concurrently with and separately from the first type of notification (e.g., 6222; 6238; 6252), the second type of notification (e.g., 6220; 6236; 6250) (e.g., the text message). Displaying the second type of notification concurrently with and separately from the first type of notification provides feedback to a user of the computer system that the text message is validated and provides controls for authorizing the computer system to share identification data without requiring the user to navigate away from the current user interface to authorize the computer system to share the identification data. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first type of notification (e.g., 6222; 6238; 6252) includes content (e.g., 6222-1; 6238-1; 6252-1) (e.g., text) that is not included in the text message (e.g., the first type of notification is a system-generated notification (e.g., without displaying the text message)) and that is not included in the second type of notification (e.g., 6220; 6236; 6250) (e.g., a representation of the text message). Displaying the first type of notification including content that is not included in the text message and that is not included in the second type of notification provides feedback to a user of the computer system that the first type of notification is distinct from the text message and the second type of notification and provides controls for authorizing the computer system to share identification data without requiring the user to navigate away from the current user interface to authorize the computer system to share the identification data. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first type of notification includes content (e.g., 6220-1; 6220-2; 6236-1; 6236-2; 6250-1; 6250-2) (e.g., text) that is included in the text message (e.g., displaying the first type of notification includes displaying at least a portion of the received text message concurrently with (e.g., and separate from) a system-generated notification). Displaying the first type of notification including content that is included in the text message provides feedback to a user of the computer system that the first type of notification is associated with the text message (e.g., by indicating that the text message is valid) and provides controls for authorizing the computer system to share identification data without requiring the user to navigate away from the current user interface to authorize the computer system to share the identification data. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) receives, via the one or more input devices (e.g., a touch-sensitive portion of display 601), a set of one or more inputs (e.g., 6224; 6232; 6240; 6244; 6254; 6260; 6268). In response to receiving the set of one or more inputs, and in accordance with a determination that the set of one or more inputs includes a first input directed to the first type of notification (e.g., input 6224 on notification 6222; input 6240 on notification 6238; input 6260 on notification 6252), the computer system initiates a process for performing a first task (e.g., a task for preauthorizing automatic, future sharing of identifying data (e.g., release of device keys) with a third party; a task for authorizing immediate sharing of identifying data with a third party). In response to receiving the set of one or more inputs, and in accordance with a determination that the set of one or more inputs includes a second input directed to the second type of notification (e.g., input 6244 on notification 6236; input 6254 on notification 6250), the computer system initiates a process for performing a second task different from the first task (e.g., open a messaging application). Performing the first task when the input is directed to the first type of notification, and performing the second task when the input is directed to the second type of notification, provides feedback to a user of the computer system that the first or second task is associated with the respective first or second type of notification and provides controls for performing the first or second tasks without requiring the user to navigate away from the current user interface to perform the tasks. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first task is an authorization task (e.g., if the computer system (e.g., 600) is not currently authorized (e.g., by a user of the computer system) to share the identifying data). For example, the text message (e.g., 6220) is received from a third party (e.g., a testing provider) before a test result has issued (e.g., when a test has been scheduled), and the first task is preauthorizing automatic, future sharing of the identifying data (e.g., see FIGS. 6AW and 6AW). As another example, the text message (e.g., 6250) is received from a third party (e.g., a testing provider) after a test result has been issued, and the first task is authorizing immediate sharing of the identifying data (e.g., see FIGS. 6BB and 6BD). In some embodiments, the first task is the sharing of the identifying data (e.g., if the computer system is currently authorized to share the identifying data). For example, the text message (e.g., 6236) is received from a third party after a test result has issued, and the first task is the automatic sharing of the identifying data (e.g., with the third party) (e.g., see FIGS. 6AY and 6AZ).

In some embodiments, as a part of displaying the first type of notification (e.g., 6222; 6238; 6252), and in accordance with a determination that a second set of criteria is met (e.g., the second set of criteria includes a first criterion that is met when the user has preauthorized the sharing of the identifying data; the second set of criteria includes a second criterion that is met when the text message includes an indication of a positive test result (e.g., 6236)), the computer system (e.g., 600) displays an indication (e.g., 6238-1) that the computer system has initiated (e.g., has initiated and completed) a process for automatically (e.g., without requiring further user interaction) performing a third task (e.g., see FIG. 6AY) (e.g., sharing the identifying data (e.g., sharing device keys); a task that is different than the first task and/or the second task). Displaying an indication that the computer system has initiated a process for automatically performing a third task when the second set of criteria is met provides feedback to a user of the computer system that the computer system has been authorized to perform the third task, thereby eliminating further input from the user to perform the third task. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the second set of criteria is met when both the first criterion and the second criterion are met.

In some embodiments, as a part of displaying the first type of notification (e.g., 6222; 6238; 6252), and in accordance with a determination that a third set of criteria is met (e.g., the third set of criteria includes a first criterion that is met when the user has not preauthorized the sharing of the identifying data; the third set of criteria includes a second criterion that is met when the text message includes an indication of a positive test result (e.g., 6250)), displaying a prompt (e.g., 6252; 6252-1) (e.g., a visual, audible, and/or tactile prompt) to authorize the computer system to perform a fourth task (e.g., the prompt includes a request to authorize immediate sharing of the identifying data). Displaying a prompt to authorize the computer system to perform a fourth task when the third set of criteria is met provides feedback to a user of the computer system instructing the user to authorize the computer system to perform the fourth task and provides controls for authorizing the computer system to perform the fourth task without requiring the user to navigate away from the current user interface to authorize the computer system to perform the fourth task. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the third set of criteria is met when both the first criterion and the second criterion are met. In some embodiments, receiving a set of one or more inputs (e.g., 6260; 6268) that includes an input corresponding to the prompt initiates a process to authorize the computer system to perform the fourth task.

In some embodiments, as a part of displaying the first type of notification (e.g., 6222; 6238; 6252), and in accordance with a determination that a fourth set of criteria is met (e.g., the fourth set of criteria includes a first criterion that is met when the user has not preauthorized the sharing of the identifying data; the fourth set of criteria includes a second criterion that is met when the text message includes an indication of a testing appointment (e.g., 6220; 6220-1), the computer system (e.g., 600) displays a prompt (e.g., 6222; 6222-1) (e.g., a visual, audible, and/or tactile prompt) to preauthorize the computer system to automatically (e.g., without further user interaction) perform a fifth task (e.g., the prompt includes a request to preauthorize automatic, future sharing of the identifying data). Displaying a prompt to preauthorize the computer system to automatically perform a fifth task when the fourth of criteria is met provides feedback to a user of the computer system instructing the user to preauthorize the computer system to perform the fifth task and provides controls for preauthorizing the computer system to perform the fifth task without requiring the user to navigate away from the current user interface to authorize the computer system to perform the fifth task. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the fourth set of criteria is met when both the first criterion and the second criterion are met. In some embodiments, receiving a set of one or more inputs (e.g., 6224; 6232) that includes an input corresponding to the prompt initiates a process to preauthorize the computer system to perform the fifth task.

In some embodiments, the computer system (e.g., 600) receives, via the one or more input devices (e.g., a touch-sensitive surface of display 601), a set of one or more inputs (e.g., 6224; 6232; 6260; 6268) corresponding to the prompt (e.g., 6222; 6222-1; 6252; 6252-1) to preauthorize (or authorize) the computer system to automatically perform the fifth task. In some embodiments, in response to receiving the set of one or more inputs corresponding to the prompt to preauthorize the computer system to automatically perform the fifth task, the computer system displays, via the display generation component (e.g., 601), an application interface (e.g., 6214) (e.g., an application interface that is not a default interface (e.g., launch interface) for the application; a specific interface in the settings interface that is not the default settings interface) that includes an affordance (e.g., 6216) (e.g., a toggle affordance) that is selectable to authorize the computer system to perform the fifth task. Displaying an application interface that includes an affordance that is selectable to authorize the computer system to perform the fifth task in response to receiving the set of one or more inputs corresponding to the prompt to preauthorize the computer system to automatically perform the fifth task provides feedback to a user of the computer system indicating that the computer system is now authorized to perform the fifth task and provides controls for preauthorizing the computer system to perform the fifth task without requiring the user to navigate away from the current user interface to authorize the computer system to perform the fifth task. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to receiving the set of one or more inputs corresponding to the prompt, the application interface is displayed with the affordance in a selected state (e.g., enabled) to authorize the computer system to perform the fifth task. In some embodiments, in response to receiving the set of one or more inputs corresponding to the prompt, the application interface is displayed with the affordance in an unselected state (e.g., disabled).

In some embodiments, while displaying the first type of notification (e.g., 6222; 6238; 6252), the computer system (e.g., 600) detects, via the one or more input devices (e.g., a touch-sensitive surface of display 601), an input (e.g., 6224; 6260) directed to the first type of notification. In response to detecting the input directed to the first type of notification, the computer system initiates a process for enabling the computer system to perform a sixth task (e.g., reporting occurrence of an event (e.g., exposure to a specific environmental condition, contaminant, and/or biological agent; being diagnosed with a specific health condition)). In some embodiments, as a part of enabling the computer system to perform the sixth task, and in accordance with a determination that a first application (e.g., a third party application; an application that is developed on behalf of an entity or organization that is different from an entity or organization on whose behalf the computer system and/or an operating system of the computer system is developed) is configured to execute (e.g., downloaded and, optionally, installed) on the computer system for performing the sixth task, the computer system enables the first application to perform the sixth task (e.g., activating/enabling a feature or setting of the first application to enable reporting occurrence of an event). Enabling the first application to perform the sixth task when the first application is configured to execute on the computer system provides feedback to a user of the computer system that an application is available for performing the sixth task and provides controls for performing the sixth task without requiring the user to navigate away from the current user interface to access the first application to perform the sixth task. This improves feedback and reduces the number of inputs at the computer system, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, as a part of enabling the computer system (e.g., 600) to perform the sixth task, and in accordance with a determination that the first application is not configured to execute on the computer system for performing the sixth task, the computer system enables the computer system to perform the sixth task (e.g., activating/enabling a feature or setting of the computer system (e.g., a system setting) to enable reporting occurrence of an event) without requiring use (in some embodiments, without requiring download and/or installation) of the first application. Enabling the computer system to perform the sixth task without requiring download of the first application when the first application is not configured to execute on the computer system provides feedback to a user of the computer system that the computer system is enabled to perform the sixth task without requiring use of the first application and provides controls for performing the sixth task without requiring the user to use the first application to perform the sixth task, thereby conserving computational resources by eliminating the need to download, install, and/or use the first application. This improves feedback, reduces the number of inputs at the computer system, and reduces computational workload, which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

Note that details of the processes described above with respect to method 1000 (e.g., FIG. 10) are also applicable in an analogous manner to the methods described above. For example, methods 700, 800, and/or 900 optionally include one or more of the characteristics of the various methods described above with reference to method 1000. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of exposure notifications. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to notify users of potential exposure to various conditions. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of exposure notifications, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, exposure notifications can be delivered to users based on non-personal information data or a bare minimum amount of personal information, such as the content being requested by the device associated with a user, other non-personal information available to the entity providing exposure notifications, or publicly available information.

What is claimed is:

1. A computer system that is configured to communicate with a display generation component and one or more input devices, the computer system comprising:
   one or more processors; and
   memory storing one or more programs configured to be executed by the one or more processors, the one or more programs including instructions for:
      after completion of a process in which one or more notifications are enabled for display, displaying, via the display generation component, a first notification, wherein the first notification is related to personal health;
      receiving, via the one or more input devices, an input directed to the first notification;
      in response to receiving the input directed to the first notification:
         in accordance with a determination that a first application associated with the first notification is configured to execute on the computer system, displaying, via the display generation component, a user interface of the first application; and
         in accordance with a determination that the first application associated with the first notification is not configured to execute on the computer system, displaying, via the display generation component, a user interface object associated with a process for configuring the first application for executing on the computer system;
      receiving, via the one or more input devices, a series of one or more inputs corresponding to a request to report an occurrence of an event, wherein the event is related to personal health; and
      in response to receiving the series of one or more inputs corresponding to the request to report the occurrence of the event:
         in accordance with a determination that the first application is configured to execute on the computer system, displaying, via the display generation component, the user interface of the first application for reporting the occurrence of the event; and in accordance with a determination that the first application is not configured to execute on the computer system, displaying, via the display generation component, a second user interface object associated with a process for configuring the first application for executing on the computer system.

2. The computer system of claim 1, wherein:
displaying the first notification includes displaying the first notification in response to a determination that a first set of criteria is met, and
the first set of criteria is determined by a provider of the application.

3. The computer system of claim 1:
wherein displaying the first notification includes displaying the first notification in response to a determination that a second set of criteria is met; and
wherein:
in accordance with the first application being a first respective application, the second set of criteria is a first respective set of criteria; and
in accordance with the first application being a second respective application, different from the first respective application, the second set of criteria is a second respective set of criteria, different from the first respective set of criteria.

4. The computer system of claim 1, wherein the first application is associated with a first entity, the one or more programs further including instructions for:
displaying, via the display generation component, a setup notification for a second application associated with a second entity different from the first entity, wherein the second application is different from the first application.

5. The computer system of claim 4, wherein the setup notification for the second application associated with the second entity is displayed in response to a determination that a current location associated with the computer system corresponds to a location associated with the second entity and/or the second application.

6. The computer system of claim 4, wherein:
a current location associated with the computer system corresponds to a location associated with the second entity; and
the setup notification for the second application associated with the second entity is displayed in response to a determination that the second application is available to be configured to execute at the computer system.

7. The computer system of claim 1, wherein the process in which one or more notifications are enabled for display includes enabling the computer system to transmit data to a third entity to enable display of the one or more notifications.

8. The computer system of claim 1, the one or more programs further including instructions for:
after completion of the process in which one or more notifications are enabled for display, receiving, via the one or more input devices, a request to pause display of the one or more notifications;
in response to receiving the request to pause display of the one or more notifications, temporarily disabling display of the one or more notifications for a predetermined amount of time; and
after expiration of the predetermined amount of time, re-enabling display of the one or more notifications.

9. The computer system of claim 1, wherein the first application is determined based on a current location associated with the computer system.

10. The computer system of claim 1, wherein displaying the first notification includes:
in accordance with the first application associated with the first notification being configured to execute on the computer system, displaying the first notification having one or more graphical objects representative of an entity associated with the first application; and
in accordance with the first application associated with the first notification not being configured to execute on the computer system, displaying the first notification having the one or more graphical objects representative of the entity associated with the first application.

11. The computer system of claim 1, the one or more programs further including instructions for:
after displaying the user interface of the first application for reporting the occurrence of the event, receiving a second series of one or more inputs, wherein the second series of one or more inputs includes one or more inputs corresponding to a verification code; and
in response to receiving the second series of one or more inputs, reporting the occurrence of the event via the first application.

12. The computer system of claim 1, the one or more programs further including instructions for:
receiving, via the one or more input devices, a second series of one or more inputs corresponding to a request to report an occurrence of an event; and
subsequent to receiving the second series of one or more inputs corresponding to the request to report the occurrence of the event:
in accordance with a determination that a location history of a user of the computer system satisfies a third set of criteria, displaying, via the display generation component, a user interface object associated with a process for reporting the occurrence of the event to a plurality of entities associated with the location history.

13. The computer system of claim 1, wherein:
the process in which one or more notifications are enabled for display includes enabling display of notifications associated with:
a fourth entity that corresponds to a first geographic area and a first set of notification criteria; and
a fifth entity that corresponds to a second geographic area, different from the first geographic area, and a second set of notification criteria, different than the first set of notification criteria; and
the one or more programs further including instructions for:
in accordance with a determination that a current location of the computer system corresponds to the first geographic area, configuring the computer system to receive notifications based on the first set of notification criteria; and
in accordance with a determination that the current location of the computer system corresponds to the second geographic area, configuring the computer system to receive notifications based on the second set of notification criteria.

14. The computer system of claim 1, the one or more programs further including instructions for:
displaying, via the display generation component, a user interface object for enabling automatic reporting of occurrences of a first type to a first set of external devices;
after displaying the user interface object for enabling automatic reporting of occurrences of a first type to a first set of external devices, detecting that an occurrence of the first type has occurred; and in response to detecting that the occurrence of the first type has occurred:
 in accordance with a determination that reporting the occurrence of the first type to the first set of external devices is currently enabled, reporting the occurrence of the first type to the first set of external devices, and
 in accordance with a determination that reporting the occurrence of the first type to the first set of external devices is currently not enabled, forgoing reporting the occurrence of the first type to the first set of external devices.

15. The computer system of claim 14, wherein enabling automatic reporting of occurrences of a first type to a first set of external devices occurs in response to a predetermined time period elapsing after displaying the user interface object for enabling automatic reporting of occurrences of a first type to a first set of external devices without receiving user input requesting that the automatic reporting of occurrences of a first type to a first set of external devices not be enabled.

16. The computer system of claim 15, the one or more programs further including instructions for:
 after displaying the user interface object for enabling automatic reporting of occurrences of a first type to a first set of external devices and prior to the predetermined time period elapsing, receiving a third series of one or more inputs; and
 in response to receiving the third series of one or more inputs, enabling automatic reporting of occurrences of a first type to a first set of external devices.

17. The computer system of claim 15, the one or more programs further including instructions for:
 after displaying the user interface object for enabling automatic reporting of occurrences of a first type to a first set of external devices and prior to the predetermined time period elapsing, receiving a fourth series of one or more inputs corresponding to a request to not enable automatic reporting of occurrences of a first type to a first set of external devices; and
 after receiving the fourth series of one or more inputs and after the predetermined time period has elapsed:
  forgoing enabling automatic reporting of occurrences of a first type to a first set of external devices; and
  forgoing reporting of the occurrence of the first type to the first set of external devices.

18. A non-transitory computer-readable storage medium storing one or more programs configured to be executed by one or more processors of a computer system that is in communication with a display generation component and one or more input devices, the one or more programs including instructions for:
 after completion of a process in which one or more notifications are enabled for display, displaying, via the display generation component, a first notification, wherein the first notification is related to personal health;
 receiving, via the one or more input devices, an input directed to the first notification;
 in response to receiving the input directed to the first notification:
  in accordance with a determination that a first application associated with the first notification is configured to execute on the computer system, displaying, via the display generation component, a user interface of the first application; and
  in accordance with a determination that the first application associated with the first notification is not configured to execute on the computer system, displaying, via the display generation component, a user interface object associated with a process for configuring the first application for executing on the computer system;
 receiving, via the one or more input devices, a series of one or more inputs corresponding to a request to report an occurrence of an event, wherein the event is related to personal health; and
 in response to receiving the series of one or more inputs corresponding to the request to report the occurrence of the event:
  in accordance with a determination that the first application is configured to execute on the computer system, displaying, via the display generation component, the user interface of the first application for reporting the occurrence of the event; and
  in accordance with a determination that the first application is not configured to execute on the computer system, displaying, via the display generation component, a second user interface object associated with a process for configuring the first application for executing on the computer system.

19. A method, comprising:
at a computer system that is in communication with a display generation component and one or more input devices:
 after completion of a process in which one or more notifications are enabled for display, displaying, via the display generation component, a first notification, wherein the first notification is related to personal health;
 receiving, via the one or more input devices, an input directed to the first notification;
 in response to receiving the input directed to the first notification:
  in accordance with a determination that a first application associated with the first notification is configured to execute on the computer system, displaying, via the display generation component, a user interface of the first application; and
  in accordance with a determination that the first application associated with the first notification is not configured to execute on the computer system, displaying, via the display generation component, a user interface object associated with a process for configuring the first application for executing on the computer system;
 receiving, via the one or more input devices, a series of one or more inputs corresponding to a request to report an occurrence of an event, wherein the event is related to personal health; and
 in response to receiving the series of one or more inputs corresponding to the request to report the occurrence of the event:
  in accordance with a determination that the first application is configured to execute on the computer system, displaying, via the display generation component, the user interface of the first application for reporting the occurrence of the event; and
  in accordance with a determination that the first application is not configured to execute on the computer system, displaying, via the display generation component, a second user interface object associated with a process for configuring the first application for executing on the computer system.

20. The non-transitory computer-readable storage medium of claim 18, wherein:
displaying the first notification includes displaying the first notification in response to a determination that a first set of criteria is met, and
the first set of criteria is determined by a provider of the application.

21. The non-transitory computer-readable storage medium of claim 18:
wherein displaying the first notification includes displaying the first notification in response to a determination that a second set of criteria is met; and
wherein:
in accordance with the first application being a first respective application, the second set of criteria is a first respective set of criteria; and
in accordance with the first application being a second respective application, different from the first respective application, the second set of criteria is a second respective set of criteria, different from the first respective set of criteria.

22. The non-transitory computer-readable storage medium of claim 18, wherein the first application is associated with a first entity, the one or more programs further including instructions for:
displaying, via the display generation component, a setup notification for a second application associated with a second entity different from the first entity, wherein the second application is different from the first application.

23. The non-transitory computer-readable storage medium of claim 22, wherein the setup notification for the second application associated with the second entity is displayed in response to a determination that a current location associated with the computer system corresponds to a location associated with the second entity and/or the second application.

24. The non-transitory computer-readable storage medium of claim 22, wherein:
a current location associated with the computer system corresponds to a location associated with the second entity; and
the setup notification for the second application associated with the second entity is displayed in response to a determination that the second application is available to be configured to execute at the computer system.

25. The non-transitory computer-readable storage medium of claim 18, wherein the process in which one or more notifications are enabled for display includes enabling the computer system to transmit data to a third entity to enable display of the one or more notifications.

26. The non-transitory computer-readable storage medium of claim 18, the one or more programs further including instructions for:
after completion of the process in which one or more notifications are enabled for display, receiving, via the one or more input devices, a request to pause display of the one or more notifications;
in response to receiving the request to pause display of the one or more notifications, temporarily disabling display of the one or more notifications for a predetermined amount of time; and
after expiration of the predetermined amount of time, re-enabling display of the one or more notifications.

27. The non-transitory computer-readable storage medium of claim 18, wherein the first application is determined based on a current location associated with the computer system.

28. The non-transitory computer-readable storage medium of claim 18, wherein displaying the first notification includes:
in accordance with the first application associated with the first notification being configured to execute on the computer system, displaying the first notification having one or more graphical objects representative of an entity associated with the first application; and
in accordance with the first application associated with the first notification not being configured to execute on the computer system, displaying the first notification having the one or more graphical objects representative of the entity associated with the first application.

29. The non-transitory computer-readable storage medium of claim 18, the one or more programs further including instructions for:
after displaying the user interface of the first application for reporting the occurrence of the event, receiving a second series of one or more inputs, wherein the second series of one or more inputs includes one or more inputs corresponding to a verification code; and
in response to receiving the second series of one or more inputs, reporting the occurrence of the event via the first application.

30. The non-transitory computer-readable storage medium of claim 18, the one or more programs further including instructions for:
receiving, via the one or more input devices, a second series of one or more inputs corresponding to a request to report an occurrence of an event; and
subsequent to receiving the second series of one or more inputs corresponding to the request to report the occurrence of the event:
in accordance with a determination that a location history of a user of the computer system satisfies a third set of criteria, displaying, via the display generation component, a user interface object associated with a process for reporting the occurrence of the event to a plurality of entities associated with the location history.

31. The non-transitory computer-readable storage medium of claim 18, wherein:
the process in which one or more notifications are enabled for display includes enabling display of notifications associated with:
a fourth entity that corresponds to a first geographic area and a first set of notification criteria; and
a fifth entity that corresponds to a second geographic area, different from the first geographic area, and a second set of notification criteria, different than the first set of notification criteria; and
the one or more programs further including instructions for:
in accordance with a determination that a current location of the computer system corresponds to the first geographic area, configuring the computer system to receive notifications based on the first set of notification criteria; and
in accordance with a determination that the current location of the computer system corresponds to the second geographic area, configuring the computer system to receive notifications based on the second set of notification criteria.

32. The non-transitory computer-readable storage medium of claim 18, the one or more programs further including instructions for:
displaying, via the display generation component, a user interface object for enabling automatic reporting of occurrences of a first type to a first set of external devices;
after displaying the user interface object for enabling automatic reporting of occurrences of a first type to a first set of external devices, detecting that an occurrence of the first type has occurred; and
in response to detecting that the occurrence of the first type has occurred:
in accordance with a determination that reporting the occurrence of the first type to the first set of external devices is currently enabled, reporting the occurrence of the first type to the first set of external devices, and
in accordance with a determination that reporting the occurrence of the first type to the first set of external devices is currently not enabled, forgoing reporting the occurrence of the first type to the first set of external devices.

33. The non-transitory computer-readable storage medium of claim 32, wherein enabling automatic reporting of occurrences of a first type to a first set of external devices occurs in response to a predetermined time period elapsing after displaying the user interface object for enabling automatic reporting of occurrences of a first type to a first set of external devices without receiving user input requesting that the automatic reporting of occurrences of a first type to a first set of external devices not be enabled.

34. The non-transitory computer-readable storage medium of claim 33, the one or more programs further including instructions for:
after displaying the user interface object for enabling automatic reporting of occurrences of a first type to a first set of external devices and prior to the predetermined time period elapsing, receiving a third series of one or more inputs; and
in response to receiving the third series of one or more inputs, enabling automatic reporting of occurrences of a first type to a first set of external devices.

35. The non-transitory computer-readable storage medium of claim 33, the one or more programs further including instructions for:
after displaying the user interface object for enabling automatic reporting of occurrences of a first type to a first set of external devices and prior to the predetermined time period elapsing, receiving a fourth series of one or more inputs corresponding to a request to not enable automatic reporting of occurrences of a first type to a first set of external devices; and
after receiving the fourth series of one or more inputs and after the predetermined time period has elapsed:
forgoing enabling automatic reporting of occurrences of a first type to a first set of external devices; and
forgoing reporting of the occurrence of the first type to the first set of external devices.

36. The method of claim 19, wherein:
displaying the first notification includes displaying the first notification in response to a determination that a first set of criteria is met, and
the first set of criteria is determined by a provider of the application.

37. The method of claim 19:
wherein displaying the first notification includes displaying the first notification in response to a determination that a second set of criteria is met; and
wherein:
in accordance with the first application being a first respective application, the second set of criteria is a first respective set of criteria; and
in accordance with the first application being a second respective application, different from the first respective application, the second set of criteria is a second respective set of criteria, different from the first respective set of criteria.

38. The method of claim 19, wherein the first application is associated with a first entity, the method further comprising:
displaying, via the display generation component, a setup notification for a second application associated with a second entity different from the first entity, wherein the second application is different from the first application.

39. The method of claim 38, wherein the setup notification for the second application associated with the second entity is displayed in response to a determination that a current location associated with the computer system corresponds to a location associated with the second entity and/or the second application.

40. The method of claim 38, wherein:
a current location associated with the computer system corresponds to a location associated with the second entity; and
the setup notification for the second application associated with the second entity is displayed in response to a determination that the second application is available to be configured to execute at the computer system.

41. The method of claim 19, wherein the process in which one or more notifications are enabled for display includes enabling the computer system to transmit data to a third entity to enable display of the one or more notifications.

42. The method of claim 19, further comprising:
after completion of the process in which one or more notifications are enabled for display, receiving, via the one or more input devices, a request to pause display of the one or more notifications;
in response to receiving the request to pause display of the one or more notifications, temporarily disabling display of the one or more notifications for a predetermined amount of time; and
after expiration of the predetermined amount of time, re-enabling display of the one or more notifications.

43. The method of claim 19, wherein the first application is determined based on a current location associated with the computer system.

44. The method of claim 19, wherein displaying the first notification includes:
in accordance with the first application associated with the first notification being configured to execute on the computer system, displaying the first notification having one or more graphical objects representative of an entity associated with the first application; and
in accordance with the first application associated with the first notification not being configured to execute on the computer system, displaying the first notification having the one or more graphical objects representative of the entity associated with the first application.

45. The method of claim 19, further comprising:
after displaying the user interface of the first application for reporting the occurrence of the event, receiving a second series of one or more inputs, wherein the second series of one or more inputs includes one or more inputs corresponding to a verification code; and
in response to receiving the second series of one or more inputs, reporting the occurrence of the event via the first application.

46. The method of claim 19, further comprising:
receiving, via the one or more input devices, a second series of one or more inputs corresponding to a request to report an occurrence of an event; and
subsequent to receiving the second series of one or more inputs corresponding to the request to report the occurrence of the event:
in accordance with a determination that a location history of a user of the computer system satisfies a third set of criteria, displaying, via the display generation component, a user interface object associated with a process for reporting the occurrence of the event to a plurality of entities associated with the location history.

47. The method of claim 19, wherein:
the process in which one or more notifications are enabled for display includes enabling display of notifications associated with:
a fourth entity that corresponds to a first geographic area and a first set of notification criteria; and
a fifth entity that corresponds to a second geographic area, different from the first geographic area, and a second set of notification criteria, different than the first set of notification criteria; and
the method further comprising:
in accordance with a determination that a current location of the computer system corresponds to the first geographic area, configuring the computer system to receive notifications based on the first set of notification criteria; and
in accordance with a determination that the current location of the computer system corresponds to the second geographic area, configuring the computer system to receive notifications based on the second set of notification criteria.

48. The method of claim 19, further comprising:
displaying, via the display generation component, a user interface object for enabling automatic reporting of occurrences of a first type to a first set of external devices;
after displaying the user interface object for enabling automatic reporting of occurrences of a first type to a first set of external devices, detecting that an occurrence of the first type has occurred; and
in response to detecting that the occurrence of the first type has occurred:
in accordance with a determination that reporting the occurrence of the first type to the first set of external devices is currently enabled, reporting the occurrence of the first type to the first set of external devices, and
in accordance with a determination that reporting the occurrence of the first type to the first set of external devices is currently not enabled, forgoing reporting the occurrence of the first type to the first set of external devices.

49. The method of claim 48, wherein enabling automatic reporting of occurrences of a first type to a first set of external devices occurs in response to a predetermined time period elapsing after displaying the user interface object for enabling automatic reporting of occurrences of a first type to a first set of external devices without receiving user input requesting that the automatic reporting of occurrences of a first type to a first set of external devices not be enabled.

50. The method of claim 49, further comprising:
after displaying the user interface object for enabling automatic reporting of occurrences of a first type to a first set of external devices and prior to the predetermined time period elapsing, receiving a third series of one or more inputs; and
in response to receiving the third series of one or more inputs, enabling automatic reporting of occurrences of a first type to a first set of external devices.

51. The method of claim 49, further comprising:
after displaying the user interface object for enabling automatic reporting of occurrences of a first type to a first set of external devices and prior to the predetermined time period elapsing, receiving a fourth series of one or more inputs corresponding to a request to not enable automatic reporting of occurrences of a first type to a first set of external devices; and
after receiving the fourth series of one or more inputs and after the predetermined time period has elapsed:
forgoing enabling automatic reporting of occurrences of a first type to a first set of external devices; and
forgoing reporting of the occurrence of the first type to the first set of external devices.

\* \* \* \* \*

UNITED STATES PATENT AND TRADEMARK OFFICE
CERTIFICATE OF CORRECTION

PATENT NO.        : 11,567,650 B1
APPLICATION NO.   : 17/326952
DATED             : January 31, 2023
INVENTOR(S)       : Matthew W. Crowley et al.

It is certified that error appears in the above-identified patent and that said Letters Patent is hereby corrected as shown below:

On the Title Page

In the Related U.S. Application Data (60): Delete "63/014,959," and insert -- 63/041,959, --.

Signed and Sealed this
Twenty-fourth Day of October, 2023

Katherine Kelly Vidal
*Director of the United States Patent and Trademark Office*